United States Patent
Hirasawa

(10) Patent No.: US 9,869,434 B2
(45) Date of Patent: Jan. 16, 2018

(54) VEHICLE LIGHTING FIXTURE

(71) Applicant: Stanley Electric Co., Ltd., Tokyo (JP)

(72) Inventor: Hiroshi Hirasawa, Tokyo (JP)

(73) Assignee: STANLEY ELECTRIC CO., LTD, Tokyo (JP)

(*) Notice: Subject to any disclaimer, the term of this patent is extended or adjusted under 35 U.S.C. 154(b) by 275 days.

(21) Appl. No.: 14/919,128

(22) Filed: Oct. 21, 2015

(65) Prior Publication Data

US 2016/0109074 A1   Apr. 21, 2016

(30) Foreign Application Priority Data

Oct. 21, 2014 (JP) .................................. 2014-214589

(51) Int. Cl.
*F21K 9/64* (2016.01)
*B60Q 1/00* (2006.01)
(Continued)

(52) U.S. Cl.
CPC .............. *F21K 9/64* (2016.08); *B60Q 1/0041* (2013.01); *F21S 48/1145* (2013.01);
(Continued)

(58) Field of Classification Search
CPC ..... F21K 9/64; F21S 48/1145; F21S 48/1275; F21S 48/1388; F21S 48/1747; F21S 48/1757; F21Y 2115/10; B60Q 1/0041
(Continued)

(56) References Cited

U.S. PATENT DOCUMENTS

2009/0046474 A1   2/2009 Sato et al.
2011/0249460 A1   10/2011 Kushimoto
(Continued)

FOREIGN PATENT DOCUMENTS

DE   10 2010 028 949 A1   11/2011
DE   10 2012 223 610 A1   6/2014
(Continued)

OTHER PUBLICATIONS

The extended European search report for the related European Patent Application No. 15190841.5 dated Apr. 13, 2016.

*Primary Examiner* — Laura Tso
(74) *Attorney, Agent, or Firm* — Kenealy Vaidya LLP

(57) ABSTRACT

A vehicle lighting fixture can utilize a plurality of optical deflectors configured to two-dimensionally scan with excitation light. The vehicle lighting fixture can form a predetermined light distribution pattern and have at least one first lighting unit and at least one second lighting unit. The first lighting unit can include: excitation light sources; optical deflectors corresponding to the excitation light sources, each including a mirror part that can two-dimensionally scan with excitation light in horizontal and vertical directions; a first wavelength conversion member configured to include scanning regions corresponding to the optical deflectors, forming a light intensity distribution image; and a first optical system configured to project the light intensity distribution images formed in the respective scanning regions to form a first light distribution pattern. At least one scanning region can overlap another scanning region in part to relatively increase a light intensity in the overlapped scanning region.

26 Claims, 50 Drawing Sheets

(51) Int. Cl.
*F21S 8/10* (2006.01)
*F21Y 115/10* (2016.01)

(52) U.S. Cl.
CPC ....... *F21S 48/1275* (2013.01); *F21S 48/1388* (2013.01); *F21S 48/1747* (2013.01); *F21S 48/1757* (2013.01); *F21Y 2115/10* (2016.08)

(58) Field of Classification Search
USPC .................................................. 362/511, 521
See application file for complete search history.

(56) References Cited

U.S. PATENT DOCUMENTS

| | | | |
|---|---|---|---|
| 2012/0243065 A1 | 9/2012 | Koyama | |
| 2013/0003400 A1* | 1/2013 | Kijima | F21S 48/1159 362/517 |
| 2013/0058114 A1* | 3/2013 | Reiners | F21S 48/1136 362/510 |
| 2014/0029282 A1 | 1/2014 | Ravier et al. | |
| 2014/0168940 A1 | 6/2014 | Shiomi et al. | |
| 2015/0124468 A1 | 5/2015 | Reiners | |
| 2015/0285457 A1* | 10/2015 | Erdl | F21S 48/1145 362/510 |
| 2015/0369437 A1* | 12/2015 | Reinprecht | F21S 48/1154 362/510 |
| 2016/0109627 A1* | 4/2016 | Yamanaka | G03B 21/2013 362/84 |

FOREIGN PATENT DOCUMENTS

| | | |
|---|---|---|
| JP | 2013-16277 A | 1/2013 |
| JP | 2013-26094 A | 2/2013 |
| JP | 2013-526759 A | 6/2013 |
| JP | 2013-232390 A | 11/2013 |
| JP | 2015-43346 A | 3/2015 |
| WO | 2014/121315 A1 | 8/2014 |

* cited by examiner

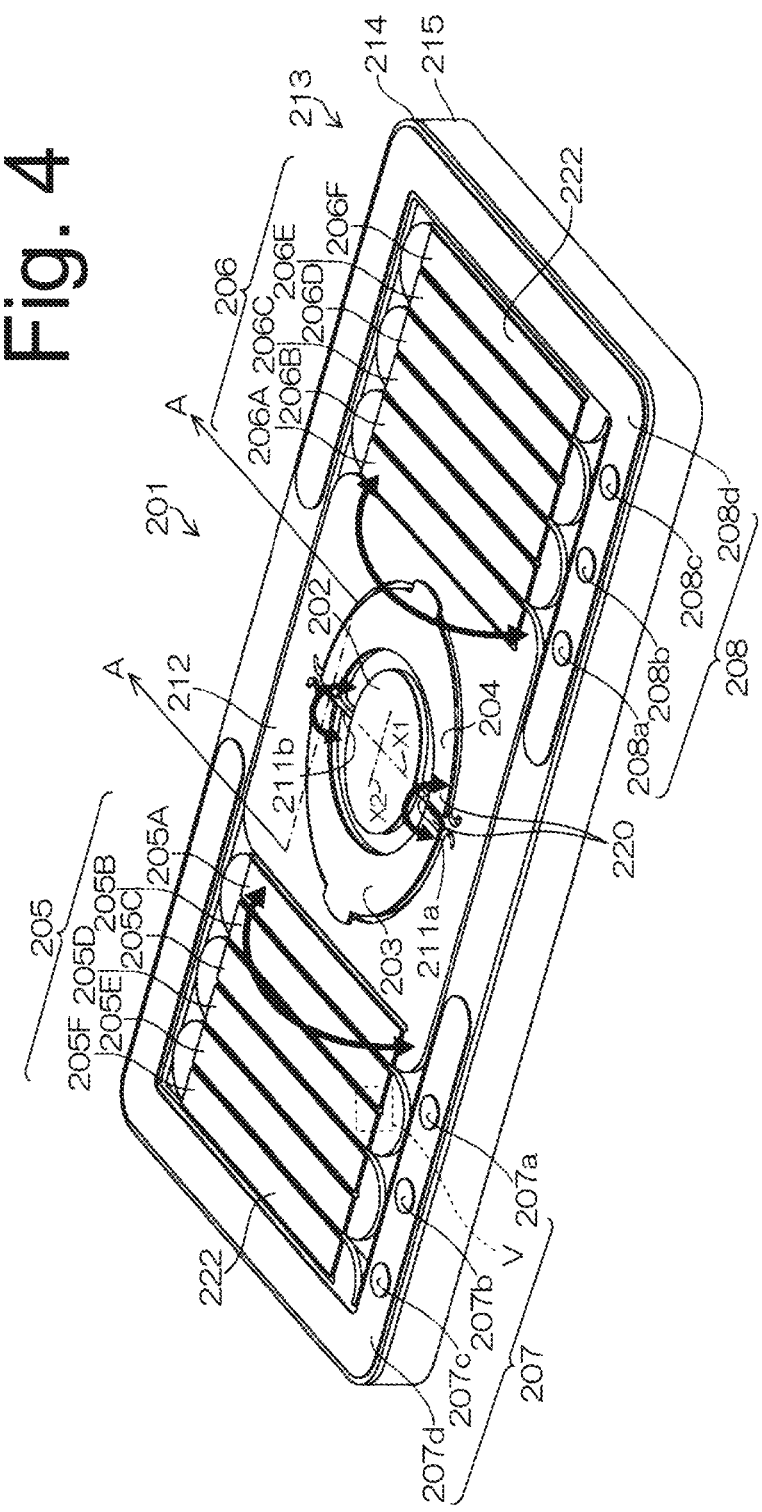

FIG. 14A  (Resonance Axis)
Horizontal Direction
Bidiractional Lighting
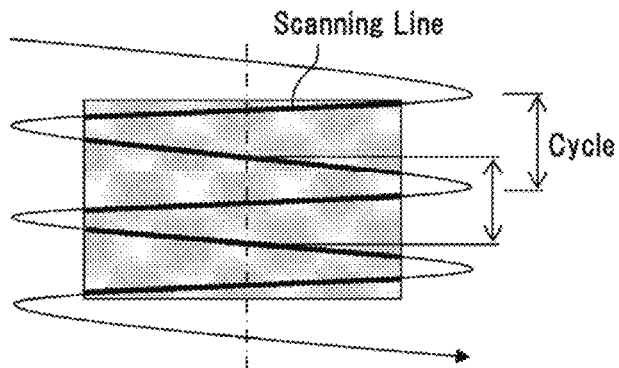
FIG. 14B  (Resonance Axis)
Horizontal Direction
One-Way Lighting
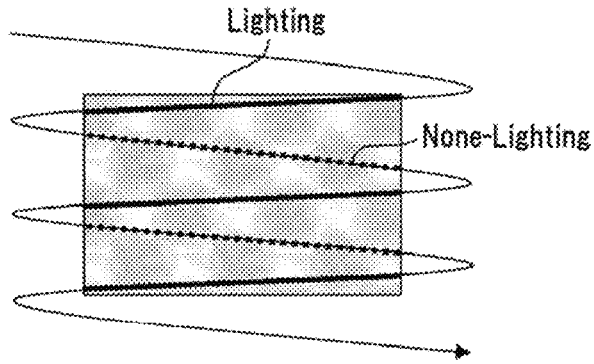
FIG. 14C  (Resonance Axis)
Horizontal Direction
Interlace Lighting
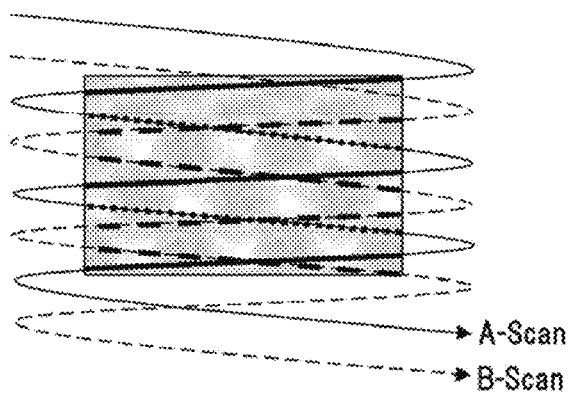

FIG. 29

| (a) | Projection Angle (αh) | Scanning Range on Wavelength Conversion Member (L) | Deflection Angle of Mirror (β h_max) | Mechanical Swing Half Angle of Mirror (γ h_max) | Load Voltage |
|---|---|---|---|---|---|
| WIDE | ± 15 deg. | ± 8.57 mm | ± 19.7 deg. | ± 9.8 deg. | 5.41 Vpp |
| MID | ± 8.5 deg. | ± 4.78 mm | ± 11.3 deg. | ± 5.3 deg. | 2.31 Vpp |
| HOT | ± 3.5 deg. | ± 1.96 mm | ± 4.7 deg. | ± 2.3 deg. | 0.93 Vpp |

| (b) | Projection Angle (αv) | Scanning Range on Wavelength Conversion Member (S) | Deflection Angle of Mirror (β v_max) | Mechanical Swing Half Angle of Mirror (γ v_max) | Control Voltage |
|---|---|---|---|---|---|
| WIDE | ± 6.5 deg. | ± 3.65 mm | ± 8.6 deg. | ± 4.3 deg. | 41.2 Vpp |
| MID | ± 3.5 deg. | ± 1.96 mm | ± 4.7 deg. | ± 2.3 deg. | 24.4 Vpp |
| HOT | ± 1.5 deg. | ± 0.84 mm | ± 2.0 deg. | ± 1.0 deg. | 13.3 Vpp |

[Resonance] Maximum Deflection Angle in H direction
(Half Angle: βh_max=10.3 degrees)

[Nonresonance] Maximum Deflection Angle in V direction
(Half Angle: βv_max=5.3 degrees)

FIG. 32

| (a) | Projection Angle (αh) | Scanning Range on Wavelength Conversion Member (L) | Deflection Angle of Mirror (β h_max) | Mechanical Swing Half Angle of Mirror (γ h_max) | Distance between Mirror and Wavelength Conversion Member |
|---|---|---|---|---|---|
| WIDE | ± 15 deg. | ± 8.57 mm | ± 19.7 deg. | ± 9.8 deg. | 24.0 mm |
| MID | ± 8.5 deg. | ± 4.78 mm | ± 19.7 deg. | ± 9.8 deg. | 13.4 mm |
| HOT | ± 3.5 deg. | ± 1.96 mm | ± 19.7 deg. | ± 9.8 deg. | 5.5 mm |

| (b) | Projection Angle (αv) | Scanning Range on Wavelength Conversion Member (S) | Deflection Angle of Mirror (β v_max) | Mechanical Swing Half Angle of Mirror (γ v_max) | Distance between Mirror and Wavelength Conversion Member |
|---|---|---|---|---|---|
| WIDE | ± 6.5 deg. | ± 3.65 mm | ± 8.6 deg. | ± 4.3 deg. | 24.0 mm |
| MID | ± 3.6 deg. | ± 1.96 mm | ± 8.6 deg. | ± 4.3 deg. | 13.4 mm |
| HOT | ± 1.5 deg. | ± 0.84 mm | ± 8.6 deg. | ± 4.3 deg. | 5.5 mm |

FIG. 38
(a)
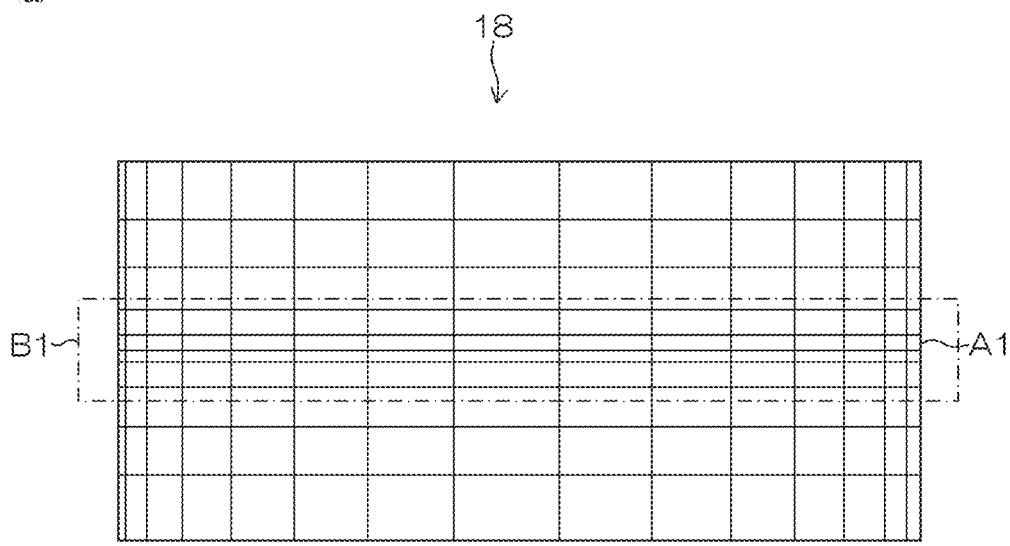
(b)
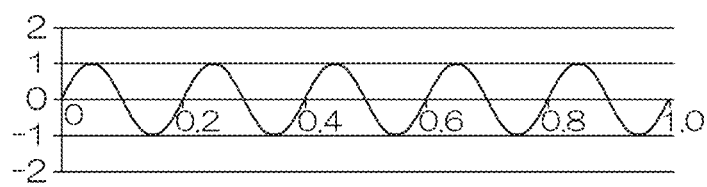
(c)
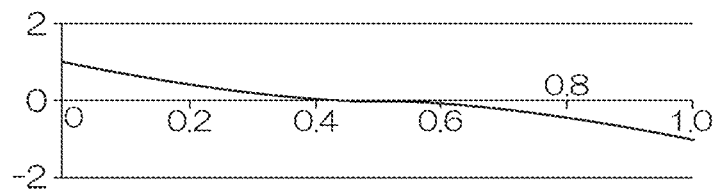

FIG. 39
(a)
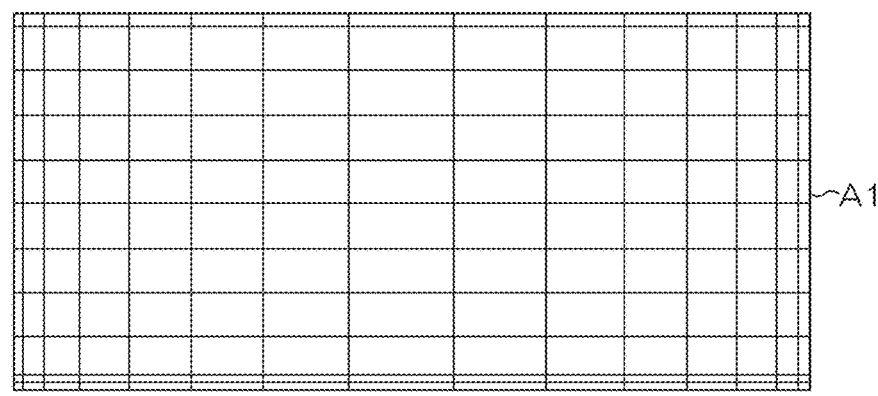
(b) 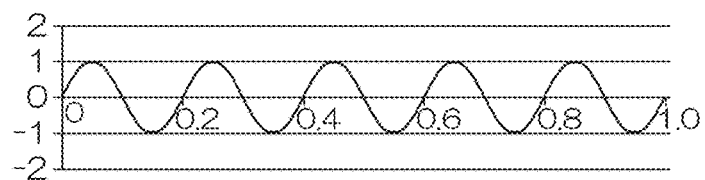
(c) 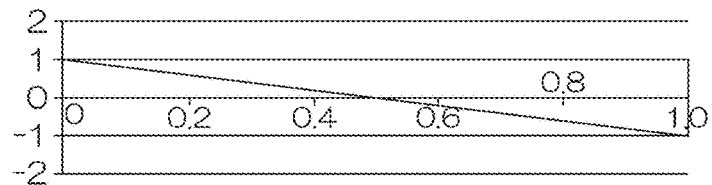

FIG. 41
(a)
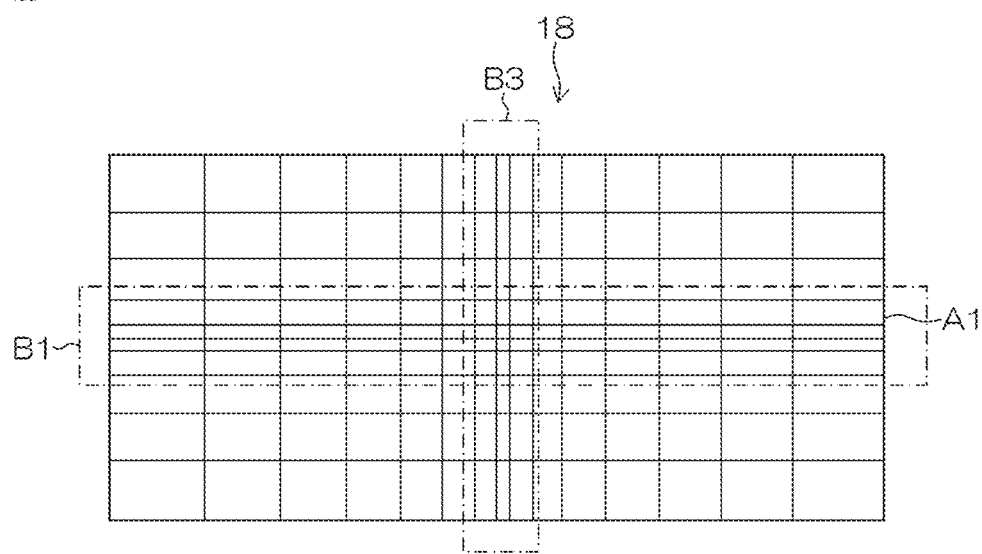
(b)
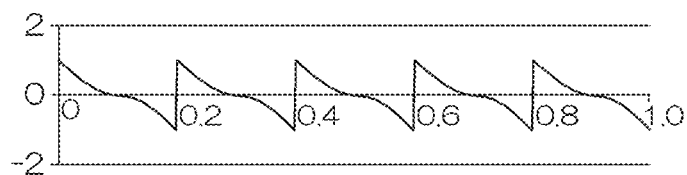
(c)
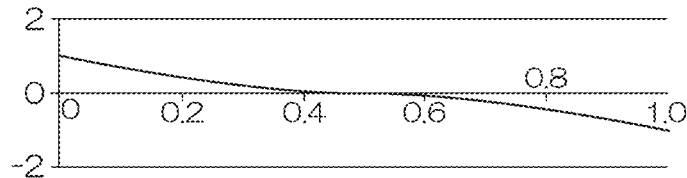

FIG. 42
(a)
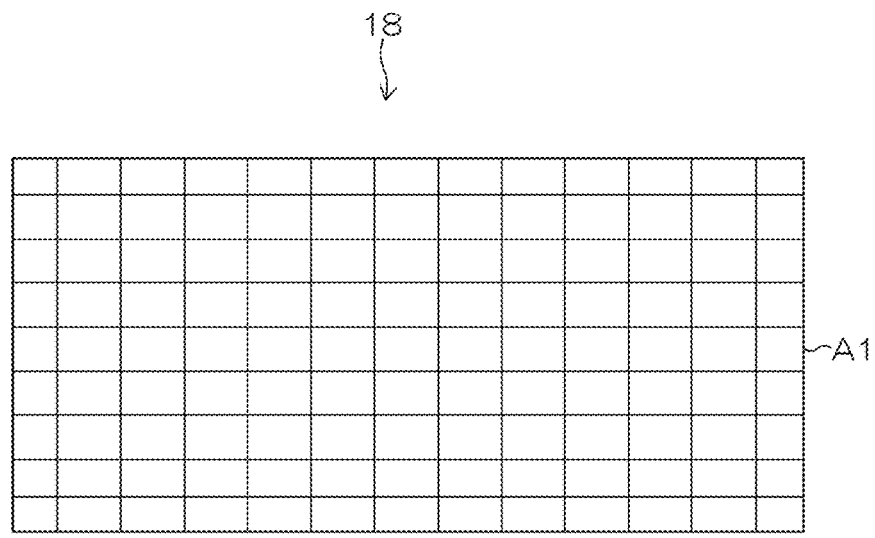
(b)
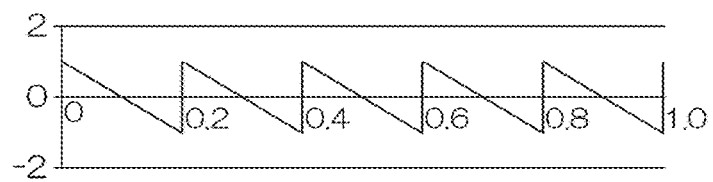
(c)
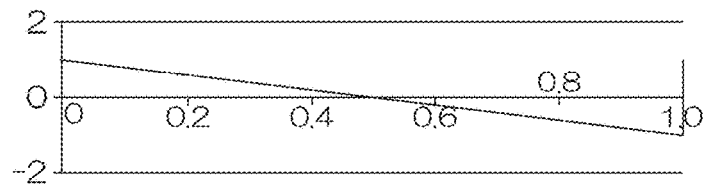

FIG. 43
(a)
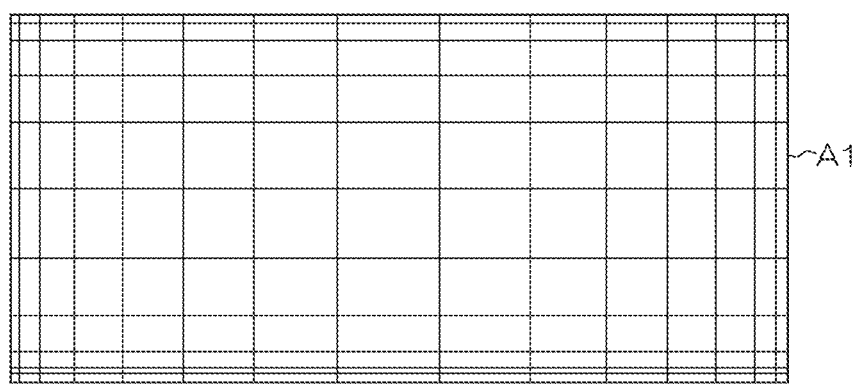
(b)
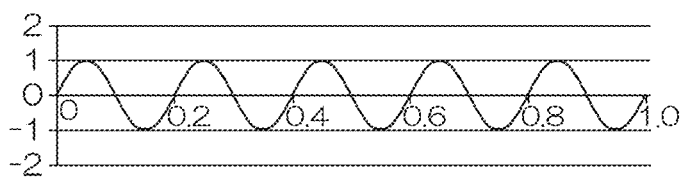
(c)
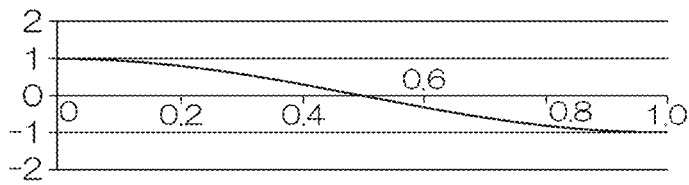

VEHICLE LIGHTING FIXTURE

This application claims the priority benefit under 35 U.S.C. §119 of Japanese Patent Application No. 2014-214589 filed on Oct. 21, 2014, which is hereby incorporated in its entirety by reference.

TECHNICAL FIELD

The presently disclosed subject matter relates to vehicle lighting fixtures, and in particular, to a vehicle lighting fixture utilizing a plurality of optical deflectors configured to scan by excitation light in a two-dimensional manner.

BACKGROUND ART

FIG. 1 is a schematic diagram illustrating a conventional vehicle lighting fixture.

As illustrated in FIG. 1, the vehicle lighting fixture can include a plurality of optical deflectors 514a, 514b, and 514c each configured to scan by excitation light in a two-dimensional manner; a plurality of phosphor substances (wavelength conversion members) 520a, 520b, and 520c configured to be scanned by the excitation light in the two-dimensional manner by the plurality of optical deflectors to be excited, thereby forming a light intensity distribution by the drawn two-dimensional images; and a plurality of projection lenses 524a, 524b, and 524c disposed corresponding to the phosphor substances 520a, 520b, and 520c, configured to project images of the light intensity distributions formed by the corresponding phosphor substances 520a, 520b, and 520c so as to form a predetermined light distribution pattern 526. Such a vehicle lighting fixture has been proposed in Japanese Patent Application Laid-Open No. 2013-526759, for example. The vehicle lighting fixture in the conventional art employs the plurality of phosphor substances 520a, 520b, and 520c and the plurality of projection lenses 524a, 524b, and 524c, resulting in increase in parts number. Furthermore, this makes it difficult to miniaturize the vehicle lighting fixture as well as to increase the entire cost.

SUMMARY

The presently disclosed subject matter was devised in view of these and other problems and features and in association with the conventional art. According to an aspect of the presently disclosed subject matter, a vehicle lighting fixture can utilize a plurality of optical deflectors configured to two-dimensionally scan with excitation light, the vehicle lighting fixture enabling to miniaturize its size and reduce the parts number, which has been a cause for cost increase.

According to another aspect of the presently disclosed subject matter, a vehicle lighting fixture can be configured to form a predetermined light distribution pattern and have at least one first lighting unit and at least one second lighting unit. The first lighting unit can include: a plurality of excitation light sources; a plurality of optical deflectors provided to correspond to the plurality of excitation light sources, the optical deflector configured to include a mirror part that can two-dimensionally scan with excitation light from a corresponding one of the excitation light sources in a horizontal direction and a vertical direction; a first wavelength conversion member configured to include a plurality of scanning regions provided to correspond to the plurality of optical deflectors such that the plurality of scanning regions can be two-dimensionally scanned by the excitation light in the horizontal direction and the vertical direction to draw a two-dimensional image in a corresponding one among the plurality of scanning regions, thereby forming a light intensity distribution image in each of the plurality of scanning regions; and a first optical system configured to project the light intensity distribution images formed in the respective scanning regions to form a first light distribution pattern. In the first wavelength conversion member, at least one scanning region among the plurality of scanning regions can be configured to overlap another scanning region in part to relatively increase a light intensity of the light intensity distribution formed in the overlapped scanning region. The second lighting unit can include: a single excitation light source; a single optical deflector provided to correspond to the single excitation light source, the single optical deflector configured to include a mirror part that can two-dimensionally scan with excitation light from the single excitation light source in a horizontal direction and a vertical direction; a second wavelength conversion member configured to include a single scanning region provided to correspond to the single optical deflector such that the single scanning region can be two-dimensionally scanned by the excitation light in the horizontal direction and the vertical direction to draw a two-dimensional image in the single scanning region, thereby forming a light intensity distribution image in the single scanning region; and a second optical system configured to project the light intensity distribution image to form a second light distribution pattern. The predetermined light distribution pattern can be formed by overlaying the first light distribution pattern and the second light distribution pattern on each other.

With the vehicle lighting fixture having the above-described configuration, which utilizes a plurality of optical deflectors configured to scan with excitation light in a two-dimensional manner, it is possible to miniaturize its size and reduce the parts number, which has been a cause for cost increase. This is because the single wavelength conversion member and the single optical system are used corresponding to the plurality of optical deflectors, in particular, in the first lighting unit.

Furthermore, with the above-described configuration, the vehicle lighting fixture that utilizes a plurality of optical deflectors configured to scan with excitation light in a two-dimensional manner can form a predetermined light distribution pattern with a portion having a relatively higher light intensity, for example, a light distribution pattern having a higher center light intensity for improving faraway visibility.

According to another aspect of the presently disclosed subject matter, the vehicle lighting fixture according to the above-mentioned aspect can be configured such that at least one of the plurality of scanning regions included in the first wavelength conversion member can overlap part of another scanning region included in the first wavelength conversion member at a position shifted from a center portion of the another scanning region.

With this configuration, occurrence of temperature quenching can be suppressed.

According to still another aspect of the presently disclosed subject matter, a vehicle lighting fixture can be configured to form a predetermined light distribution pattern and have at least one first lighting unit and at least one second lighting unit. The first lighting unit can include: a plurality of excitation light sources; a plurality of optical deflectors provided to correspond to the plurality of excitation light sources, the optical deflector configured to include a mirror part that can two-dimensionally scan with excitation light from a corresponding one of the excitation light sources in a horizontal direction and a vertical direction; a first wavelength conversion member configured to include a plurality of scanning regions provided to correspond to the plurality of optical deflectors such that the plurality of scanning regions can be two-dimensionally scanned by the excitation light in the horizontal direction and the vertical direction to draw a two-dimensional image in a corresponding one among the plurality of scanning regions, thereby forming a light intensity distribution image in each of the plurality of scanning regions; and a first optical system configured to project the light intensity distribution images formed in the respective scanning regions to form a first light distribution pattern. In the first wavelength conversion member, at least one scanning region among the plurality of scanning regions can be configured to overlap another scanning region in part to relatively increase a light intensity of the light intensity distribution formed in the overlapped scanning region. The second lighting unit can include: a plurality of excitation light sources; a plurality of optical deflectors provided to correspond to the plurality of excitation light sources, the optical deflector configured to include a mirror part that can two-dimensionally scan with excitation light from a corresponding one of the excitation light sources in a horizontal direction and a vertical direction; a second wavelength conversion member configured to include a plurality of scanning regions provided to correspond to the plurality of optical deflectors such that the plurality of scanning regions can be two-dimensionally scanned by the excitation light in the horizontal direction and the vertical direction to draw a two-dimensional image in a corresponding scanning region among the plurality of scanning regions, thereby forming a light intensity distribution image in each of the plurality of scanning regions; and a second optical system configured to project the light intensity distribution images formed in the respective scanning regions to form a second light distribution pattern. In the second wavelength conversion member, at least one scanning region among the plurality of scanning regions can be configured to overlap another scanning region in part to relatively increase a light intensity of the light intensity distribution formed in the overlapped scanning region. The predetermined light distribution pattern can be formed by overlaying the first light distribution pattern and the second light distribution pattern on each other.

With the vehicle lighting fixture having the above-described configuration, which utilizes a plurality of optical deflectors configured to scan with excitation light in a two-dimensional manner, it is possible to miniaturize its size and reduce the parts number, which has been a cause for cost increase. This is because the single wavelength conversion member and the single optical system are used corresponding to the plurality of optical deflectors, in particular, in both the first and second lighting units.

Furthermore, with the above-described configuration, the vehicle lighting fixture that utilizes a plurality of optical deflectors configured to scan with excitation light in a two-dimensional manner can form a predetermined light distribution pattern with a portion having a relatively higher light intensity, for example, a light distribution pattern having a higher center light intensity for improving faraway visibility.

According to further another aspect of the presently disclosed subject matter, the vehicle lighting fixture according to the above-mentioned aspect can be configured such that at least one of the plurality of scanning regions included in the first wavelength conversion member can overlap part of another scanning region included in the first wavelength conversion member at a position shifted from a center portion of the other scanning region, and that at least one of the plurality of scanning regions included in the second wavelength conversion member can overlap part of another scanning region included in the second wavelength conversion member at a position shifted from a center portion of the other scanning region.

With this configuration, occurrence of temperature quenching can be suppressed.

According to further another aspect of the presently disclosed subject matter, the vehicle lighting fixture according to the above-mentioned aspect can be configured such that the excitation light source is a semiconductor light emitting element that can emit excitation light and the excitation light from the semiconductor light emitting element is directly used or indirectly used via an output end face of an optical fiber guiding and outputting excitation light emitted from the semiconductor light emitting element.

In particular, when the output end face of an optical fiber guiding and outputting excitation light is used as each of a plurality of excitation light sources, the excitation light source, such as a semiconductor light emitting element, can be disposed at a position away from the main body of the vehicle lighting fixture. This configuration can make it possible to further miniaturize the vehicle lighting fixture and reduce its weight.

According to still another aspect of the presently disclosed subject matter, the vehicle lighting fixture according to any of the above-mentioned aspects can be configured such that the vehicle lighting fixture can have a reference axis, and the first optical system, the first wavelength conversion member, and the plurality of optical deflectors of the first lighting unit can be disposed along the reference axis in this order, that the plurality of excitation light sources of the first lighting unit can be disposed to surround the reference axis while being inclined such that the excitation light emitted therefrom is directed rearward and toward the reference axis, and that the plurality of optical deflectors of the first lighting unit can be disposed to surround the reference axis while being closer to the reference axis than the plurality of excitation light sources such that the excitation light from the corresponding excitation light source can be incident on the mirror part of the corresponding optical deflector and reflected by the same to a corresponding scanning region among the plurality of scanning regions.

With the vehicle lighting fixture having the above-described configuration, which utilizes a plurality of optical deflectors configured to scan with excitation light in a two-dimensional manner, it is possible to miniaturize its size and reduce the parts number, which has been a cause for cost increase.

According to still another aspect of the presently disclosed subject matter, the vehicle lighting fixture according to any of the above-mentioned aspects can be configured such that the vehicle lighting fixture can further include a plurality of reflection surfaces provided to correspond to the plurality of excitation light sources of the first lighting unit, that the vehicle lighting fixture can have a reference axis, and the first optical system, the first wavelength conversion member, and the plurality of optical deflectors of the first lighting unit can be disposed along the reference axis in this order, that the plurality of excitation light sources of the first lighting unit can be disposed to surround the reference axis while being inclined such that the excitation light emitted therefrom is directed rearward and toward the reference axis, that the plurality of reflection surfaces can be disposed to surround the reference axis while being closer to the reference axis than the plurality of excitation light sources such that the excitation light from the corresponding excitation light source can be incident on the reflection surface and reflected by the same while the plurality of reflection surfaces can be inclined such that the excitation light reflected therefrom is directed rearward and toward the reference axis, and that the plurality of optical deflectors of the first lighting unit can be disposed to surround the reference axis while being closer to the reference axis than the plurality of reflection surfaces such that the excitation light from the corresponding reflection surface can be incident on the mirror part of the corresponding optical deflector and reflected by the same to a corresponding scanning region among the plurality of scanning regions in the first wavelength conversion member.

With the vehicle lighting fixture having the above-described configuration, which utilizes a plurality of optical deflectors configured to scan with excitation light in a two-dimensional manner, it is possible to miniaturize its size and reduce the parts number, which has been a cause for cost increase.

According to still another aspect of the presently disclosed subject matter, the vehicle lighting fixture according to any of the above-mentioned aspects can be configured such that the first optical system can include a first projection lens that is constituted by a plurality of lenses such that an aberration is compensated so that an imaging plane is planar, and that the first wavelength conversion member is planar and can be disposed along the imaging plane of the first projection lens.

This configuration can properly eliminate the adverse effects of aberration on the first light distribution pattern. In addition, since the wavelength conversion member is planar, it can be produced easily as compared with the case of a curved wavelength conversion member. Furthermore, since the wavelength conversion member is planar, the drawing of a two-dimensional image is facilitated as compared with the case of a curved wavelength conversion member.

According to still another aspect of the presently disclosed subject matter, the vehicle lighting fixture according to any of the above-mentioned aspects can be configured such that the second optical system can include a second projection lens that is constituted by a plurality of lenses such that an aberration is compensated so that an imaging plane is planar, and that the second wavelength conversion member is planar and can be disposed along the imaging plane of the second projection lens.

This configuration can properly eliminate the adverse effects of aberration on the second light distribution pattern. In addition, since the wavelength conversion member is planar, it can be produced easily as compared with the case of a curved wavelength conversion member. Furthermore, since the wavelength conversion member is planar, the drawing of a two-dimensional image is facilitated as compared with the case of a curved wavelength conversion member.

According to still another aspect of the presently disclosed subject matter, the vehicle lighting fixture according to any of the above-mentioned aspects can be configured such that the optical deflector can be of a one-dimensional nonresonance/one-dimensional resonance type (2-D optical scanner (fast resonant and slow static combination)), including the mirror part; a movable frame disposed to surround the mirror part while supporting the mirror part so as to allow the mirror part to be reciprocately swung around a first axis; a base disposed to surround the movable frame while supporting the movable frame so as to allow the movable frame to be reciprocately swung around a second axis perpendicular to the first axis; a first piezoelectric actuator configured to cause the mirror part to be reciprocally swung around the first axis with respect to the movable frame due to resonance driving; and a second piezoelectric actuator configured to cause the movable frame and the mirror part supported by the movable frame to be reciprocally swung around the second axis with respect to the base due to nonresonance driving. Further, the vehicle lighting fixture can be configured such that the optical deflector can be disposed such that the first axis is contained in a vertical plane and the second axis is contained in a horizontal plane.

When each of the optical reflectors is disposed according to this configuration, a predetermined light distribution pattern wide in the horizontal direction and thin in the vertical direction that is a required pattern for a vehicle headlamp (or a two-dimensional image corresponding to the predetermined light distribution pattern) can be easily formed (drawn).

BRIEF DESCRIPTION OF DRAWINGS

These and other characteristics, features, and advantages of the presently disclosed subject matter will become clear from the following description with reference to the accompanying drawings, wherein:

FIG. 4 is a perspective view illustrating an optical deflector 201 of a 2-D optical scanner (fast resonant and slow static combination) (of a one-dimensional nonresonance/one-dimensional resonance type);

FIGS. 14A, 14B, and 14C illustrate examples of scanning patterns of laser light (spot-shaped laser light) with which the optical deflector 201 can two-dimensionally scan (in the horizontal direction and the vertical direction);

FIG. 29 is a table summarizing the conditions to be satisfied in order to change the scanning regions $A_{Wide}$, $A_{Mid}$, and $A_{Hot}$ when the distances between each of the optical deflectors $201_{Wide}$, $201_{Mid}$, and $201_{Hot}$ (the center of the mirror part 202) and the wavelength conversion member 18 are the same (or substantially the same) as each other;

FIG. 32 is a table summarizing the conditions to be satisfied in order to change the scanning regions $A_{Wide}$, $A_{Mid}$, and $A_{Hot}$ when the distances between each of the optical deflectors $201_{Wide}$, $201_{Mid}$, and $201_{Hot}$ (the center of the mirror part 202) and the wavelength conversion member 18 are the same (or substantially the same) as each other;

FIG. 38 includes graphs showing (a) an example of a light intensity distribution in which the light intensity at a region B1 in the vicinity of its center is relatively high, (b) an example of a drive signal (sinusoidal wave) in order to form the light intensity distribution of (a), and (c) an example of a drive signal (sawtooth wave or rectangular wave) including a nonlinear region in order to form the light intensity distribution of (a);

FIG. 39 includes graphs showing (a) an example of a light intensity distribution (reference example), (b) an example of a drive signal (sinusoidal wave) in order to form the light intensity distribution of (a), and (c) an example of a drive signal (sawtooth wave or rectangular wave) including a linear region in order to form the light intensity distribution of (a);

FIG. 41 includes graphs showing (a) an example of a light intensity distribution in which the light intensities at regions B1 and B2 near its center are relatively high, (b) an example of a drive signal (sawtooth wave or rectangular wave) in order to form the light intensity distribution of (a), and (c) an example of a drive signal (sawtooth wave or rectangular wave) including a nonlinear region in order to form the light intensity distribution of (a);

FIG. 42 includes graphs showing (a) an example of a light intensity distribution (reference example), (b) an example of a drive signal (sawtooth wave or rectangular wave) including a linear region in order to form the light intensity distribution of (a), and (c) an example of a drive signal (sawtooth wave or rectangular wave) including a linear region in order to form the light intensity distribution of (a);

FIG. 43 includes graphs showing (a) an example of a light intensity distribution (reference example), (b) an example of a drive signal (sinusoidal wave) in order to form the light intensity distribution of (a), and (c) an example of a drive signal (sinusoidal wave) in order to form the light intensity distribution of (a);

DESCRIPTION OF EXEMPLARY EMBODIMENTS

A description will now be made below to vehicle lighting fixtures of the presently disclosed subject matter with reference to the accompanying drawings in accordance with exemplary embodiments. The definition relating to directions is based on the irradiation direction of the vehicle lighting fixture that can form a light distribution pattern in front of a vehicle body on which the vehicle lighting fixture is installed.

Before discussing the presently disclosed subject matter in accordance with exemplary embodiments, the basic configuration that can be adopted by the presently disclosed subject matter will be described as several reference examples with the use of a simple system configuration.

Figure 1:
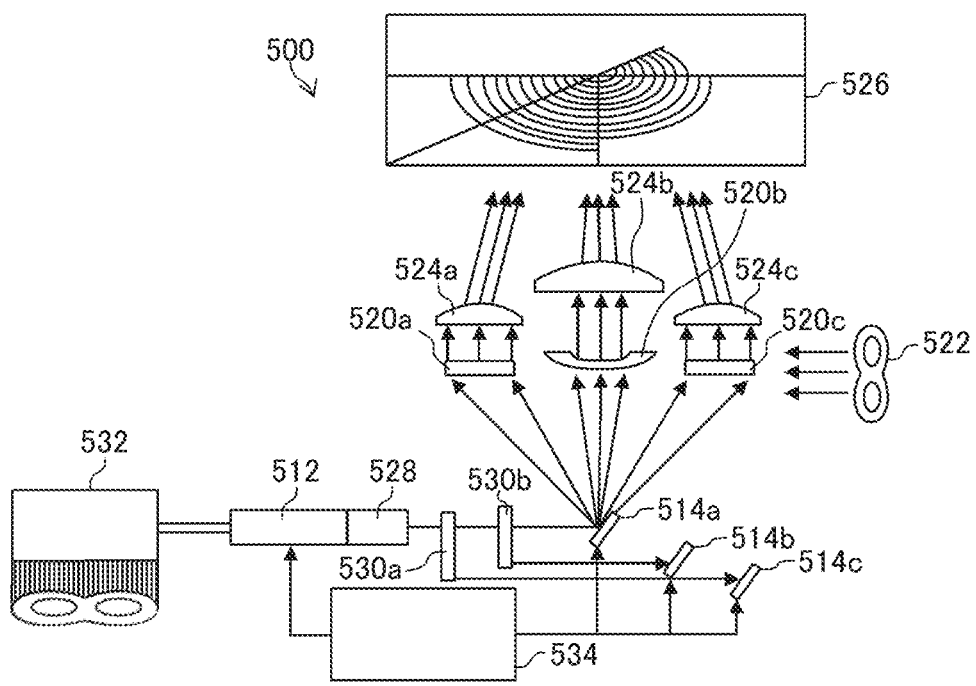
FIG. 1 is a schematic diagram illustrating a conventional vehicle lighting fixture 500.
Figure 2:
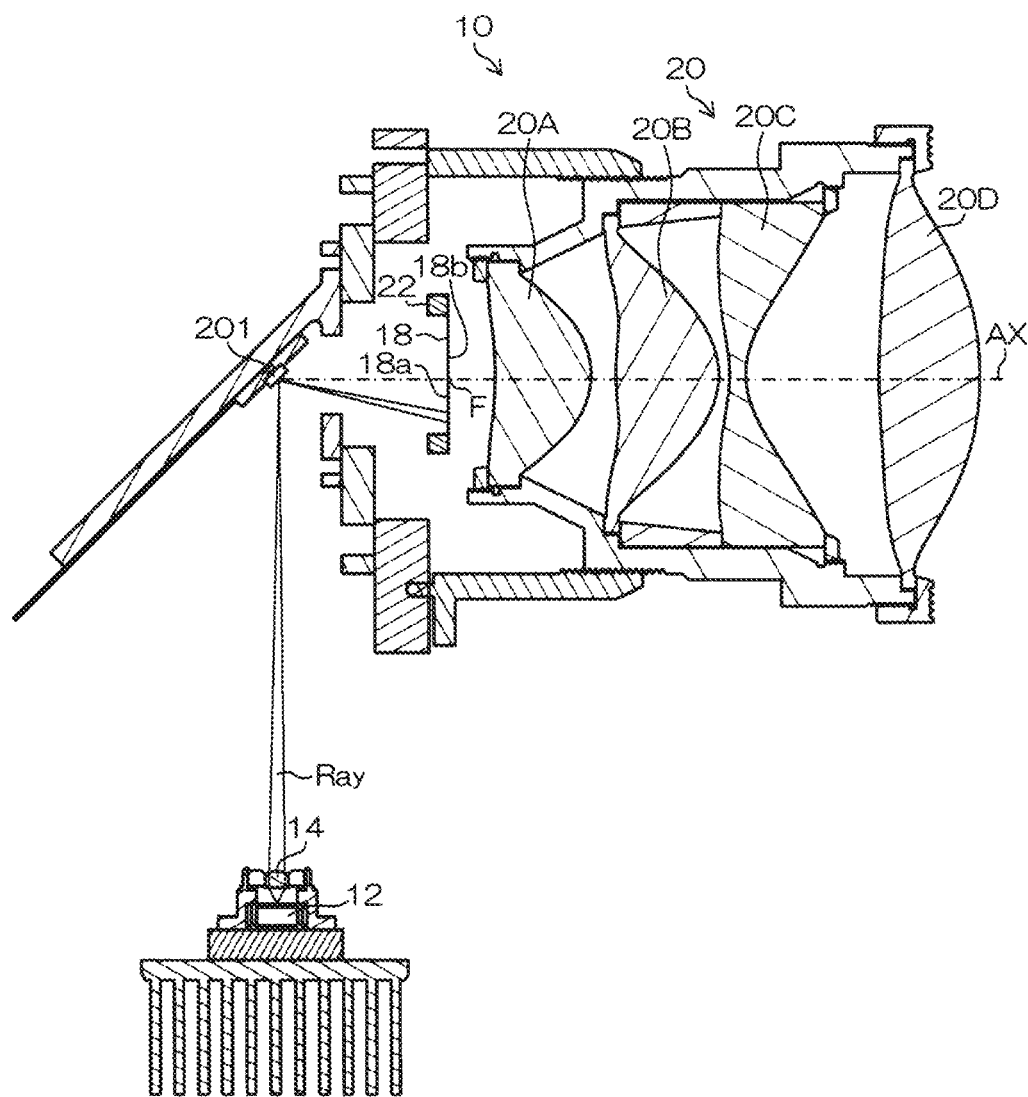
FIG. 2 is a vertical cross-sectional view illustrating a vehicle lighting fixture 10 of a reference example.

FIG. 2 is a vertical cross-sectional view illustrating a vehicle lighting fixture 10 of a reference example.

As illustrated in FIG. 2, the vehicle lighting fixture 10 according to the reference example is configured as a vehicle headlamp and can include: an excitation light source 12; a condenser lens 14 configured to condense excitation light rays Ray from the excitation light source 12; an optical deflector 201 configured to scan with the excitation light rays Ray, which are condensed by the condenser lens 14, in a two-dimensional manner in a horizontal direction and a vertical direction; a wavelength conversion member 18 configured to form a two-dimensional image corresponding to a predetermined light distribution pattern drawn by the excitation light rays Ray with which the wavelength conversion member is scanned in the two-dimensional manner in the horizontal and vertical directions by the optical deflector 201; and a projection lens assembly 20 configured to project the two-dimensional image drawn on the wavelength conversion member 18 forward.

The optical deflector 201, the wavelength conversion member 18, and the projection lens assembly 20 can be disposed, as illustrated in FIG. 2, so that the excitation light rays Ray emitted from the excitation light source 12 and with which the optical deflector 201 scan in the two-dimensional manner (in the horizontal and vertical directions) can be incident on a rear face 18a of the wavelength conversion member 18 and pass therethrough to exit a front face 18b thereof. Specifically, the optical deflector 201 can be disposed on the rear side with respect to the wavelength conversion member 18 while the projection lens assembly 20 can be disposed on the front side with respect to the wavelength conversion member 18. This type of arrangement is called as a transmission type. In this case, the excitation light source 12 may be disposed either on the front side or on the rear side with respect to the wavelength conversion member 18. In FIG. 2, the projection lens assembly 20 can be configured to include four lenses 20A to 20D, but the presently disclosed subject matter is not limited thereto. The projection lens assembly can be configured to include a single aspheric lens.

Figure 3:
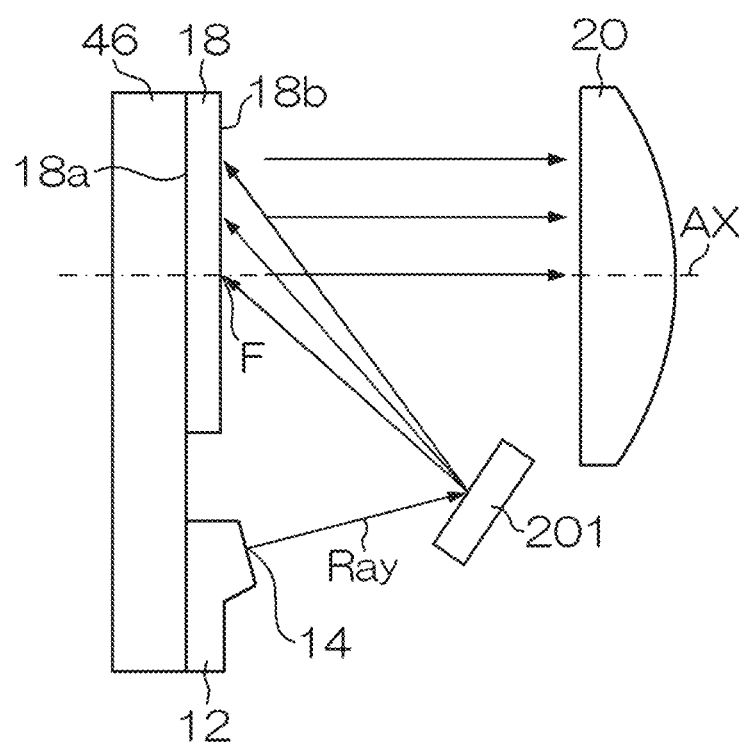
FIG. 3 is a schematic view illustrating a variation of a vehicle lighting fixture 10.

The optical deflector 201, the wavelength conversion member 18, and the projection lens assembly 20 may be disposed, as illustrated in FIG. 3, so that the excitation light rays Ray emitted from the excitation light source 12 and with which the optical deflector 201 scan in the two-dimensional manner (in the horizontal and vertical directions) can be incident on the front face 18b of the wavelength conversion member 18. In this case, the optical deflector 201 and the projection lens assembly 20 may be disposed on the front side with respect to the wavelength conversion member 18. This type of arrangement is called as a reflective type. In this case, the excitation light source 12 may be disposed either on the front side or on the rear side with respect to the wavelength conversion member 18. The reflective type arrangement as illustrated in FIG. 3, when compared with the transmission type arrangement as illustrated in FIG. 2, is advantageous in terms of the dimension of the vehicle lighting fixture 10 in a reference axis Ax direction being shorter. In FIG. 3, the projection lens assembly 20 is configured to include a single aspheric lens, but the presently disclosed subject matter is not limited thereto. The projection lens assembly can be configured to include a lens group composed of a plurality of lenses.

The excitation light source 12 can be a semiconductor light emitting element such as a laser diode (LD) that can emit laser light rays of blue color (for example, having an emission wavelength of 450 nm). But the presently disclosed subject matter is not limited thereto. The excitation light source 12 can be a semiconductor light emitting element such as a laser diode (LD) that can emit laser light rays of near ultraviolet light (for example, having an emission wavelength of 405 nm) or an LED. The excitation light rays emitted from the excitation light source 12 can be converged by the condenser lens 14 (for example, collimated) and be incident on the optical deflector 201 (in particular, on a mirror part thereof).

The wavelength conversion member 18 can be a plate-shaped or laminate-type wavelength conversion member having a rectangular outer shape. The wavelength conversion member 18 can be scanned with the laser light rays as the excitation light rays by the optical deflector 201 in a two-dimensional manner (in the horizontal and vertical directions) to thereby convert at least part of the excitation light rays to light rays with different wavelength. In the case of FIG. 2, the wavelength conversion member 18 can be fixed to a frame body 22 at its outer periphery of the rear face 18a and disposed at or near the focal point F of the projection lens assembly 20. In the case of FIG. 3, the wavelength conversion member 18 can be fixed to a support 46 at its rear face 18a and disposed at or near the focal point F of the projection lens assembly 20.

Specifically, when the excitation light source 12 is a blue laser diode for emitting blue laser light rays, the wavelength conversion member 18 can employ a plate-shaped or laminate-type phosphor that can be excited by the blue laser light rays to emit yellow light rays. With this configuration, the optical deflector 201 can scan the wavelength conversion member 18 with the blue laser light rays in a two-dimensional manner (in the horizontal and vertical directions), whereby a two-dimensional white image can be drawn on the wavelength conversion member 18 corresponding to a predetermined light distribution pattern. Specifically, when the blue laser light rays are irradiated on the wavelength conversion member 18, the passing blue laser light rays and the yellow light rays emitted from the wavelength conversion member 18 can be mixed to draw the two-dimensional white image (pseudo white light).

Further, when the excitation light source 12 is a near UV laser diode for emitting blue laser light rays, the wavelength conversion member 18 can employ a plate-shaped or laminate-type phosphor that can be excited by the near UV laser light rays to emit three types of light rays, i.e., red, green, and blue light rays. With this configuration, the optical deflector 201 can scan the wavelength conversion member 18 with the near UV laser light rays in a two-dimensional manner (in the horizontal and vertical directions), whereby a two-dimensional white image can be drawn on the wavelength conversion member 18 corresponding to a predetermined light distribution pattern. Specifically, when the near UV laser light rays are irradiated on the wavelength conversion member 18, the red, green, and blue light rays emitted from the wavelength conversion member 18 due to the excitation by the near UV laser light rays can be mixed to draw the two-dimensional white image (pseudo white light).

The projection lens assembly 20 can be composed of a group of four lenses 20A to 20D that have been aberration-corrected (have been corrected in terms of the field curvature) to provide a planar image formed, as illustrated in FIG. 2. The lenses may also be color aberration-corrected. Then, the planar wavelength conversion member 18 can be disposed in alignment with the image plane. The focal point F of the projection lens assembly 20 can be located at or near the wavelength conversion member 18. When the projection lens assembly 20 is a group of plural lenses, the projection lens assembly 20 can remove the adverse effect of the aberration on the predetermined light distribution pattern more than a single convex lens used. With this projection lens assembly 20, the planar wavelength conversion member 18 can be employed. This is advantageous because the planar wavelength conversion member 18 can be produced easier than a curved wavelength conversion member. Furthermore, this is advantageous because the planar wavelength conversion member 18 can facilitate the drawing of a two-dimensional image thereon easier than a curved wavelength conversion member.

Further, the projection lens assembly 20 composed of a group of plural lenses is not limitative, and may be composed of a single aspheric lens without aberration correction (correction of the field curvature) to form a planar image. In this case, the wavelength conversion member 18 should be a curved one corresponding to the field curvature and disposed along the field curvature. In this case, also the focal point F of the projection lens assembly 20 can be located at or near the wavelength conversion member 18.

The projection lens assembly 20 can project the two-dimensional image drawn on the wavelength conversion member 18 corresponding to the predetermined light distribution pattern forward to form the predetermined light distribution pattern (low-beam light distribution pattern or high-beam light distribution pattern) on a virtual vertical screen in front of the vehicle lighting fixture 10 (assumed to be disposed in front of the vehicle lighting fixture approximately 25 m away from the vehicle body).

Next, a description will be given of the optical deflector 201. The optical deflector 201 can scan the wavelength conversion member 18 with the excitation light rays Ray emitted from the excitation light source 12 and converged by the condenser lens 14 (for example, collimated) in a two-dimensional manner (in the horizontal and vertical direction).

The optical deflectors 201 can be configured by, for example, an MEMS scanner. The driving system of the optical deflectors is not limited to a particular system, and examples thereof may include a piezoelectric system, an electrostatic system, and an electromagnetic system.

In the present reference example, a description will be given of an optical deflector driven by a piezoelectric system as a representative example.

The piezoelectric system used in the optical deflector is not limited to a particular system, and examples thereof may include a one-dimensional nonresonance/one-dimensional resonance type, a two-dimensional nonresonance type, and a two-dimensional resonance type.

The following reference example may employ the one-dimensional nonresonance/one-dimensional resonance type (2-D optical scanner (fast resonant and slow static combination)) of optical deflector 201 using the piezoelectric system, as one example.

<One-Dimensional Nonresonance/One-Dimensional Resonance Type (2-D Optical Scanner (Fast Resonant and Slow Static Combination))>

FIG. 4 is a perspective view illustrating the optical deflector 201 utilizing a 2-D optical scanner (fast resonant and slow static combination).

As illustrated in FIG. 4, the optical deflector 201 can include the mirror part 202 (also called as MEMS mirror), first piezoelectric actuators 203 and 204, a movable frame 212, second piezoelectric actuators 205 and 206, and a base 215. The first piezoelectric actuators 203 and 204 can drive the mirror part 202 via torsion bars 211a and 211b. The movable frame 212 can support the first piezoelectric actuators 203 and 204. The second piezoelectric actuators 205 and 206 can drive the movable frame 212. The base 215 can support the second piezoelectric actuators 205 and 206.

The mirror part 202 can be formed in a circle shape and the torsion bars 211a and 211b can be connected to the mirror part 202 so as to extend outward from both ends of the mirror part 202. The first piezoelectric actuators 203 and 204 can be formed in a semi-circle shape so as to surround the mirror part 202 while disposed with a gap between them. Furthermore, the first piezoelectric actuators 203 and 204 can be coupled to each other with the torsion bars 211a and 211b interposed therebetween at their respective ends. The movable frame 212 can be disposed to surround the mirror part 202 and the first piezoelectric actuators 203 and 204. The first piezoelectric actuators 203 and 204 can be coupled to and supported by the movable frame 212 at respective outer central portions of the semi-circle (arc) shape.

The movable frame 212 can have a rectangular shape and include a pair of sides disposed in a direction perpendicular to the directions of the torsion bars 211a and 211b, at which the movable frame 212 can be coupled to the respective tip ends of the second piezoelectric actuators 205 and 206 opposite to each other with the movable frame 212 interposed therebetween. The base 215 can include a supporting base part 214 formed thereon so as to surround the movable frame 212 and the second piezoelectric actuators 205 and 206. In this configuration, the second piezoelectric actuators 205 and 206 can be coupled to and supported at respective base ends thereof by the supporting base part 214.

Figure 5A:
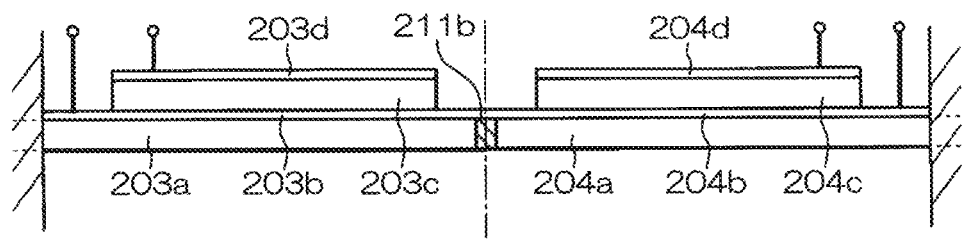
FIG. 5A is a schematic diagram illustrating the state in which first piezoelectric actuators 203 and 204 are not applied with a voltage.

The first piezoelectric actuators 203 and 204 each can include a single piezoelectric cantilever composed of a support 203a, 204a, a lower electrode 203b, 204b, a piezoelectric body 203c, 204c, and an upper electrode 203d, 204d, as illustrated in FIG. 5A.

Further, as illustrated in FIG. 4, the second piezoelectric actuators 205 and 206 each can include six piezoelectric cantilevers 205A to 205F, 206A to 206F, which are coupled to adjacent ones thereof so as to be folded back at its end. As a result, the second piezoelectric actuators 205 and 206 can be formed in an accordion shape as a whole. Each of the piezoelectric cantilevers 205A to 205F and 206A to 206F can have the same configuration as those of the piezoelectric cantilevers of the first piezoelectric actuators 203 and 204.

A description will now be given of the action of the mirror part 202 (swing motion around the first axis X1).

Figure 5B:
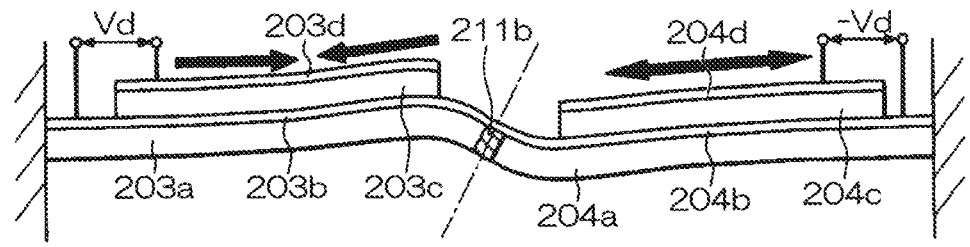
FIG. 5B is a schematic diagram illustrating the state in which they are applied with a voltage.

FIGS. 5A and 5B each show the cross-sectional view of the part where the first piezoelectric actuators 203 and 204 are provided, while taken along line A-A in FIG. 4. Specifically, FIG. 5A is a schematic diagram illustrating the state in which the first piezoelectric actuators 203 and 204 are not applied with a voltage, and FIG. 5B is a schematic diagram illustrating the state in which they are applied with a voltage.

As illustrated in FIG. 5B, voltages of +Vd and −Vd, which have respective reversed polarity, can be applied to between the upper electrode 203d and the lower electrode 203b of the first piezoelectric actuator 203 and between the upper electrode 204d and the lower electrode 204b of the first piezoelectric actuator 204, respectively. As a result, they can be deformed while being bent in respective opposite directions.

This bent deformation can rotate the torsion bar 211b in such a state as illustrated in FIG. 5B. The torsion bar 211a can receive the same rotation. Upon rotation of the torsion bars 211a and 211b, the mirror part 201 can be swung around the first axis X1 with respect to the movable frame 212.

A description will now be given of the action of the mirror part 202 (swing motion around a second axis X2). Note that the second axis X2 is perpendicular to the first axis X1 at the center (center of gravity) of the mirror part 202.

Figure 6A:
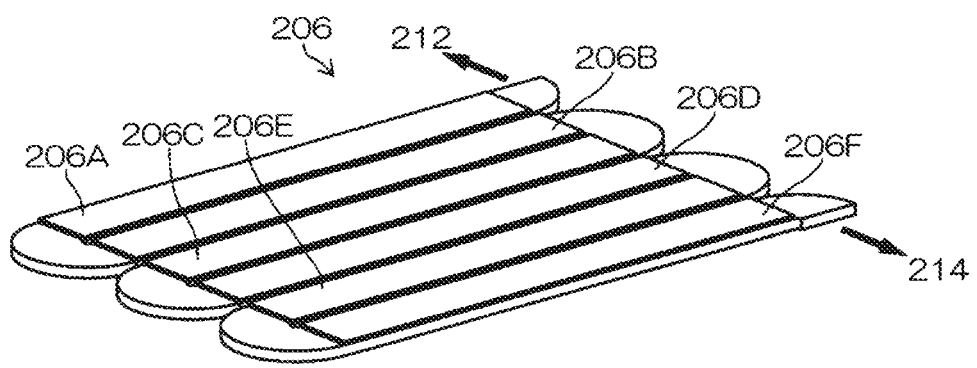
FIG. 6A is a schematic diagram illustrating the state in which second piezoelectric actuators 205 and 206 are not applied with a voltage.
Figure 6B:
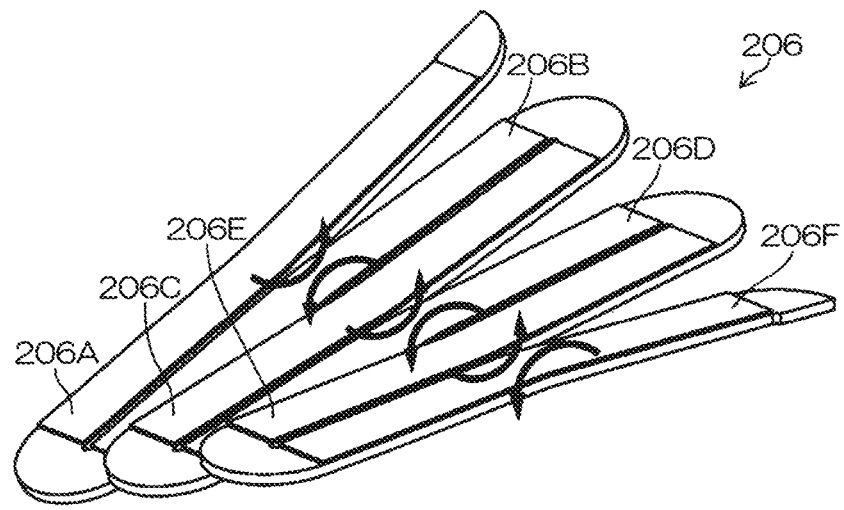
FIG. 6B is a schematic diagram illustrating the state in which they are applied with a voltage.

FIG. 6A is a schematic diagram illustrating the state in which the second piezoelectric actuators 205 and 206 are not applied with a voltage, and FIG. 6B is a schematic diagram illustrating the state in which they are applied with a voltage.

As illustrated in FIG. 6B, when the second piezoelectric actuator 206 is applied with a voltage, the odd-numbered piezoelectric cantilevers 206A, 206C, and 206E from the movable frame 212 side can be deformed and bent upward while the even-numbered piezoelectric cantilevers 206B, 206D, and 206F can be deformed and bent downward. As a result, the piezoelectric actuator 206 as a whole can be deformed with a larger angle (angular variation) accumulated by the magnitudes of the respective bent deformation of the piezoelectric cantilevers 206A to 206F. The second piezoelectric actuator 205 can also be driven in the same manner. This angular variation of the second piezoelectric actuators 205 and 206 can cause the movable frame 212 (and the mirror part 202 supported by the movable frame 212) to rotate with respect to the base 215 around the second axis X2 perpendicular to the first axis X1.

A single support formed by processing a silicon substrate can constitute a mirror part support for the mirror part 202, the torsion bars 211a and 211b, supports for the first piezoelectric actuators 203 and 204, the movable frame 212, supports for the second piezoelectric actuators 205 and 206, and the supporting base part 214 on the base 215. Furthermore, the base 215 can be formed from a silicon substrate, and therefore, it can be integrally formed from the above single support by processing a silicon substrate. The technique of processing such a silicon substrate can employ those described in, for example, Japanese Patent Application Laid-Open No. 2008-040240, which is hereby incorporated in its entirety by reference. There can be a gap between the mirror part 202 and the movable frame 212, so that the mirror part 202 can be swung around the first axis X1 with respect to the movable frame 212 within a predestined angle range. Furthermore, there can be a gap between the movable frame 212 and the base 215, so that the movable frame 212 (and together with the mirror part 202 supported by the movable frame 212) can be swung around the second axis X2 with respect to the base 215 within a predetermined angle range.

The optical deflector 201 can include electrode sets 207 and 208 to apply a drive voltage to the respective piezoelectric actuators 203 to 206.

The electrode set 207 can include an upper electrode pad 207a, a first upper electrode pad 207b, a second upper electrode pad 207c, and a common lower electrode 207d. The upper electrode pad 207a can be configured to apply a drive voltage to the first piezoelectric actuator 203. The first upper electrode pad 207b can be configured to apply a drive voltage to the odd-numbered piezoelectric cantilevers 205A, 205C, and 205E of the second piezoelectric actuator 205. The second upper electrode pad 207c can be configured to apply a drive voltage to the even-numbered piezoelectric cantilevers 205B, 205D, and 205F of the second piezoelectric actuator 205. The common lower electrode 207d can be used as a lower electrode common to the upper electrode pads 207a to 207c.

Similarly thereto, the electrode set 208 can include an upper electrode pad 208a, a first upper electrode pad 208b, a second upper electrode pad 208c, and a common lower electrode 208d. The upper electrode pad 208a can be configured to apply a drive voltage to the first piezoelectric actuator 204. The first upper electrode pad 208b can be configured to apply a drive voltage to the odd-numbered piezoelectric cantilevers 206A, 206C, and 206E of the second piezoelectric actuator 206. The second upper electrode pad 208c can be configured to apply a drive voltage to the even-numbered piezoelectric cantilevers 206B, 206D, and 206F of the second piezoelectric actuator 206. The common lower electrode 208d can be used as a lower electrode common to the upper electrode pads 208a to 208c.

In the present reference example, the first piezoelectric actuator 203 can be applied with a first AC voltage as a drive voltage, while the first piezoelectric actuator 204 can be applied with a second AC voltage as a drive voltage, wherein the first AC voltage and the second AC voltage can be different from each other in phase, such as a sinusoidal wave with an opposite phase or shifted phase. In this case, an AC voltage with a frequency close to a mechanical resonance frequency (first resonance point) of the mirror part 202 including the torsion bars 211a and 211b can be applied to resonantly drive the first piezoelectric actuators 203 and 204. This can cause the mirror part 202 to be reciprocately swung around the first axis X1 with respect to the movable frame 212, so that the laser light rays from the excitation light source 12 and incident on the mirror part 202 can scan in a first direction (for example, horizontal direction).

A third AC voltage can be applied to each of the second piezoelectric actuators 205 and 206 as a drive voltage. In this case, an AC voltage with a frequency equal to or lower than a predetermined value that is smaller than a mechanical resonance frequency (first resonance point) of the movable frame 212 including the mirror part 202, the torsion bars 211a and 211b, and the first piezoelectric actuators 203 and 204 can be applied to nonresonantly drive the second piezoelectric actuators 205 and 206. This can cause the mirror part 202 to be reciprocately swung around the second axis X2 with respect to the base 215, so that the laser light rays as excitation light rays from the excitation light source 12 and incident on the mirror part 202 can scan in a second direction (for example, vertical direction).

The optical deflector 201 utilizing a 2-D optical scanner (fast resonant and slow static combination) can be arranged so that the first axis X1 is contained in a vertical plane and the second axis X2 is contained in a horizontal plane. With this arrangement, a predetermined light distribution pattern (two-dimensional image corresponding to the required predetermined light distribution pattern) being wide in the horizontal direction and narrow in the vertical direction for use in a vehicular headlamp can be easily formed (drawn).

Figure 7A:
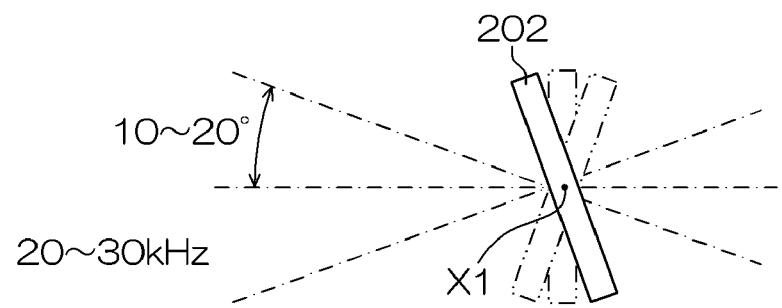
FIG. 7A is a diagram illustrating the maximum swing angle of a mirror part 202 around a first axis X1.
Figure 7B:
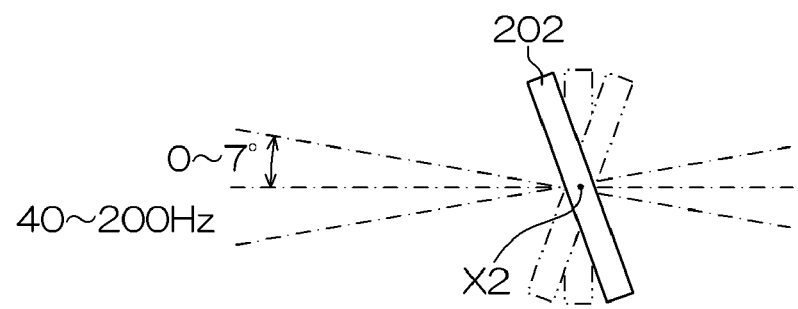
FIG. 7B is a diagram illustrating the maximum swing angle of the mirror part 202 around a second axis X2.

Specifically, the optical deflector 201 utilizing a 2-D optical scanner (fast resonant and slow static combination) can be configured such that the maximum swing angle of the mirror part 202 around the first axis X1 is larger than the maximum swing angle of the mirror part 202 around the second axis X2. For example, since the reciprocal swing of the mirror part 202 around the first axis X1 is caused due to the resonance driving, the maximum swing angle of the mirror part 202 around the first axis X1 ranges from 10 degrees to 20 degrees as illustrated in FIG. 7A. On the contrary, since the reciprocal swing of the mirror part 202 around the second axis X2 is caused due to the nonresonance driving, the maximum swing angle of the mirror part 202 around the second axis X2 becomes about 7 degrees as illustrated in FIG. 7B. As a result, the above-described arrangement of the optical deflector 201 utilizing a 2-D optical scanner (fast resonant and slow static combination) can easily form (draw) a predetermined light distribution pattern (two-dimensional image corresponding to the required predetermined light distribution pattern) being wide in the horizontal direction and narrow in the vertical direction for use in a vehicular headlight.

As described above, by driving the respective piezoelectric actuators 203 to 206, the laser light rays from the excitation light source 12 as the excitation light rays can scan in a two dimensional manner (for example, in the horizontal and vertical directions).

As illustrated in FIG. 4, the optical deflector 201 can include an H sensor 220 and a V sensor 222. The H sensor 220 can be disposed at the tip end of the torsion bar 211a on the mirror part 202 side. The V sensor 222 can be disposed to the base end sides of the second piezoelectric actuators 205 and 206, for example, at the piezoelectric cantilevers 205F and 206F.

The H sensor 220 can be formed from a piezoelectric element (PZT) similar to the piezoelectric cantilever in the first piezoelectric actuators 203 and 204 and can be configured to general a voltage in accordance with the bent deformation (amount of displacement) of the first piezoelectric actuators 203 and 204. The H sensor 220 can be formed from a piezoelectric element (PZT) similar to the piezoelectric cantilever in the first piezoelectric actuators 203 and 204 and can be configured to general a voltage in accordance with the bent deformation (amount of displacement) of the first piezoelectric actuators 203 and 204.

Figure 20:
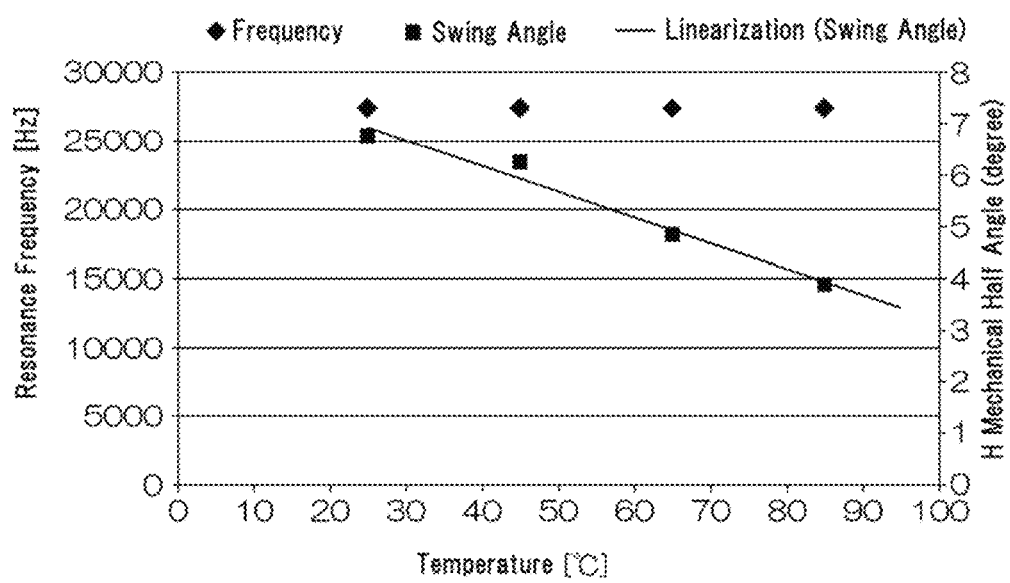
FIG. 20 is a graph showing the relationship among the temperature change, the resonance frequency, and the mechanical swing angle (half angle) of a mirror part 202 around the first axis X1 as a center.

In the optical deflector 201, the mechanical swing angle (half angle) of the mirror 202 around the first axis X1 is varied, as illustrated in FIG. 20, due to the change in natural vibration frequency of a material constituting the optical deflector 201 by temperature change. This can be suppressed by the following method. Specifically, on the basis of the drive signal (the first AC voltage and the second AC voltage to be applied to the first piezoelectric actuators 203 and 204) and the sensor signal (output of the H sensor 220), the frequencies of the first AC voltage and the second AC voltage to be applied to the first piezoelectric actuators 203 and 204 (or alternatively, the first AC voltage and the second AC voltage themselves) can be feed-back controlled so that the mechanical swing angle (half angle) of the mirror part 202 around the first axis becomes a target value. As a result, the fluctuation can be suppressed.

A description will next be give of the desired frequencies of the first AC voltage and the second AC voltage to be applied to the first piezoelectric actuators 203 and 204 and the desired frequency of the third AC voltage to be applied to the second piezoelectric actuators 205 and 206.

The inventors of the subject application have conducted experiments and examined the test results thereof to find out that the frequencies (hereinafter, referred to as a horizontal scanning frequency $f_H$) of the first AC voltage and the second AC voltage to be applied to the first piezoelectric actuators 203 and 204 in the optical deflector 201 utilizing a 2-D optical scanner (fast resonant and slow static combination) with the above configuration can be desirably about 4 to 30 kHz (sinusoidal wave), and more desirably 27 kHz±3 kHz (sinusoidal wave).

Furthermore, the inventors of the subject application have found out that the horizontal resolution (number of pixels) is desirably set to 300 (or more) in consideration of the high-beam light distribution pattern so that the turning ON/OFF (lit or not lit) can be controlled at an interval of 0.1 degrees (or less) within the angular range of −15 degrees (left) to +15 degrees with respect to the vertical axis V.

The inventors of the subject application have further conducted experiments and examined the test results thereof to find out that the frequency (hereinafter, referred to as a vertical scanning frequency $f_V$) of the third AC voltage to be applied to the second piezoelectric actuator 205 and 206 in the optical deflector 201 utilizing a 2-D optical scanner (fast resonant and slow static combination) with the above configuration can be desirably 55 Hz or higher (sawtooth wave), more desirably 55 Hz to 120 Hz (sawtooth wave), still more desirably 55 Hz to 100 Hz (sawtooth wave), and particularly desirably 70 Hz±10 Hz (sawtooth wave).

Furthermore, the inventors of the subject application have found out that the frequency (the vertical scanning frequency $f_V$) of the third AC voltage to be applied to the second piezoelectric actuator 205 and 206 is set to desirably 50 Hz or higher (sawtooth wave), more desirably 50 Hz to 120 Hz (sawtooth wave), still more desirably 50 Hz to 100 Hz (sawtooth wave), and particularly desirably 70 Hz±10 Hz (sawtooth wave) in consideration of normal travelling speeds (for example, 0 km/h to 150 km/h). Since the frame rate depends on the vertical scanning frequency $f_V$, when the vertical scanning frequency $f_V$ is 70 Hz, the frame rate is 70 fps.

When the vertical scanning frequency $f_V$ is 55 Hz or higher, the predetermined light distribution pattern can be formed on the virtual vertical screen as an image (considered as a moving picture or movie) with a frame rate of 55 fps or more. Similarly, when the vertical scanning frequency $f_V$ is 55 Hz to 120 Hz, the predetermined light distribution pattern can be formed on the virtual vertical screen as an image (considered as a moving picture or movie) with a frame rate of 55 fps or more and 120 fps or less. Similarly, when the vertical scanning frequency $f_V$ is 55 Hz to 100 Hz, the predetermined light distribution pattern can be formed on the virtual vertical screen as an image (considered as a moving picture or movie) with a frame rate of 55 fps or more and 100 fps or less. Similarly, when the vertical scanning frequency $f_V$ is 70 Hz±10 Hz, the predetermined light distribution pattern can be formed on the virtual vertical screen as an image (considered as a moving picture or movie) with a frame rate of 70 fps±10 fps. The same correspondence as above can be applied to the cases when the vertical scanning frequency $f_V$ is 50 Hz or more, 50 Hz to 120 Hz, 50 Hz to 100 Hz, and 70 Hz±10 Hz.

The resolution (the number of vertical scanning lines) in the vertical direction can be determined by the following formula.

The resolution in the vertical direction(the number of vertical scanning lines)=2×(Utility time coefficient of vertical scanning: $K_V$)×$f_H/f_V$.

On the basis of this formula, if the horizontal scanning frequency $f_H$=25 kHz, the vertical scanning frequency $f_V$=70 Hz, and the utility time coefficient Kv=0.9 to 0.8, then the number of vertical scanning lines is about 600 (lines)=2×25 kHz/70 Hz×(0.9 to 0.85).

The above-described desirable vertical scanning frequency $f_V$ have never been used in vehicle lighting fixtures such as vehicle headlamps, and the inventors of the present application have found it for the first time as a result of various experiments conducted by the inventors. Specifically, in the conventional art, in order to suppress the flickering in the general illumination field (other than the vehicle lighting fixtures such as an automobile headlamp), it is a technical common knowledge to use a frequency of 100 Hz or higher. Furthermore, in order to suppress the flickering in the technical field of vehicle lighting fixtures, it is a technical common knowledge to use a frequency of 220 Hz or higher. Therefore, the above-described desirable vertical scanning frequency $f_V$ have never been used in vehicle lighting fixtures such as vehicle headlamps.

Next, a description will now be given of why the technical common knowledge is to use a frequency of 100 Hz or higher in order to suppress the flickering in the general illumination field (other than the vehicle lighting fixtures such as an automobile headlamp).

For example, the Ordinance Concerning Technical Requirements for Electrical Appliances and Materials (Ordinance of the Ministry of International Trade and Industry No. 85 of 37th year of Showa) describes that "the light output should be no flickering," and "it is interpreted as to be no flickering when the light output has a repeated frequency of 100 Hz or higher without missing parts or has a repeated frequency of 500 Hz or higher." It should be noted that the Ordinance is not intended to vehicle lighting fixtures such as automobile headlamps.

Furthermore, the report in Nihon Keizai Shimbun (The Nikkei dated Aug. 26, 2010) also said that "the alternating current has a frequency of 50 Hz. The voltage having passed through a rectifier is repeatedly changed between ON and OFF at a frequency of 100 times per second. The fluctuation in voltage may affect the fluctuation in luminance of fluorescent lamps. An LED illumination has no afterglow time like the fluorescent lamps, but instantaneously changes in its luminance, whereby flickering is more noticeable," meaning that the flickering is more noticeable when the frequency if 100 Hz or higher.

In general, the blinking frequency of fluorescent lamps that cannot cause flickering is said to be 100 Hz to 120 Hz (50 Hz to 60 Hz in terms of the power source phase).

Next, a description will be given of why the technical common knowledge is to use a frequency of 220 Hz or higher (or a frame rate of 220 fps or more) in order to suppress the flickering in vehicle lighting fixtures such as an automobile headlamp.

In general, an HID (metal halide lamp) used for an automobile headlamp can be lit in a condition of applying a voltage with a frequency of 350 to 500 Hz (rectangular wave). This is because a frequency of 800 Hz or more may cause a noise while a lower frequency may deteriorate the light emission efficiency of HIDs. When a frequency of 150

Hz or lower is employed, the HID life may be lowered due to the adverse effect to heating wearing of electrodes. Furthermore, a frequency of 250 Hz or higher is said to be preferable.

The report of "Glare-free High Beam with Beam-scanning," ISAL 2013, pp. 340 to 347 says that the frequency for use in a vehicle lighting fixture such as an automobile headlamp is 220 Hz or higher, and the recommended frequency is 300 to 400 Hz or higher. Similarly, the report "Flickering effects of vehicle exterior light systems and consequences," ISAL 2013, pp. 262 to 266 says that the frequency for use in a vehicle lighting fixture such as an automobile headlamp is approximately 400 Hz.

Therefore, it has never been known in the conventional art that the use of frequency of 55 Hz or higher (55 Hz to 120 Hz) as a vertical scanning frequency $f_V$ in a vehicle lighting fixture such as an automobile headlamp can suppress flickering.

A description will now be given of the experiments conducted by the inventors of the present application in order to study the above-described desirable vertical scanning frequency $f_V$.

EXPERIMENT

The inventors conducted experiments using a test system simulating a vehicle headlamp during driving to evaluate the degree of flickering sensed by test subjects.

Figure 8:
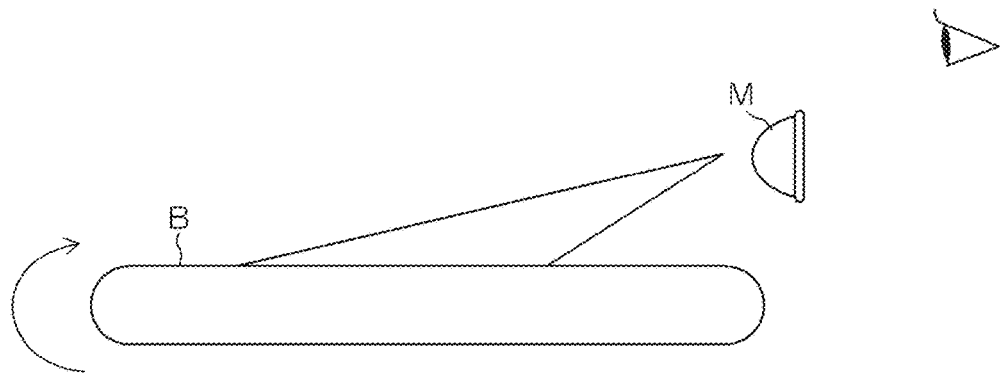
FIG. 8 is a schematic diagram of a test system.

FIG. 8 is a schematic diagram of a test system used.

As illustrated in FIG. 8, the test system can include a movable road model using a rotary belt B that can be varied in rotational speed and a lighting fixture model M similar to those used in a vehicle lighting fixture 10. The movable road model is made with a scale size of ⅕, and white lines and the like simulating an actual road surface are drawn on the surface of the rotary belt B. The lighting fixture model M can change the output of an excitation light source similar to the excitation light source 12 (scanning illuminance).

First, experiments were performed to confirm whether the flickering sensed by a test subject is different between a case where the lighting fixture model M having an LED excitation light source is used for illuminating the surface of the rotary belt B and a case where the lighting fixture model M having an LD excitation light source is used for illuminating the surface of the rotary belt B. As a result, it has been confirmed that if the vertical scanning frequency $f_V$ is the same, the degree of flickering sensed by test subjects is not different between the case where the lighting fixture model M having an LED excitation light source is used for illuminating the surface of the rotary belt B and the case where the lighting fixture model M having an LD excitation light source is used for illuminating the surface of the rotary belt B.

Figure 9:
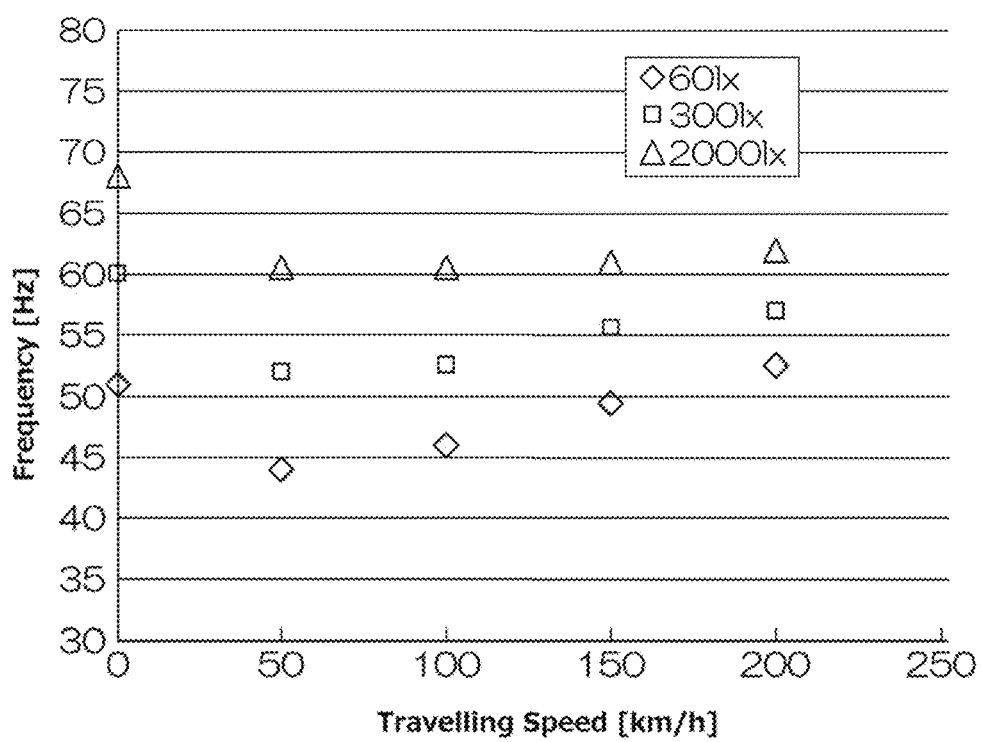
FIG. 9 is a graph obtained by plotting test results (measurement results)

Next, the vertical scanning frequency $f_V$ was measured at the time when a test subject does not sense the flickering while the rotary belt B is rotated at different rotational speed corresponding to each of actual travelling speeds, 0 km/h, 50 km/h, 100 km/h, 150 km/h, and 200 km/h. In particular, the test experiment was performed in such a manner that a test subject changes the vertical scanning frequency $f_V$ by dial operation and stop the dial operation when he/she does not sense the flickering. The vertical scanning frequency measured at that time was regarded as the vertical scanning frequency $f_V$. The measurement was performed at some levels of illuminance. They are: illuminance of 60 lx being the comparable level of road illumination in front of a vehicle body 30 to 40 m away from the vehicle body (at a region which a driver watches during driving); illuminance of 300 lx being the comparable level of road illumination in front of the vehicle body approximately 10 m away from the vehicle body (at a region just in front of the vehicle body); and illuminance of 2000 lx being the comparable level of reflection light from a leading vehicle or a guard rail close to the vehicle body. FIG. 9 is a graph obtained by plotting test results (measurement results), showing the relationship between the travelling speed and the flickering. The vertical axis represents the vertical scanning frequency $f_V$ and the horizontal axis represents the travelling speed (per hour).

With reference to FIG. 9, the following facts can be found.

Firstly, when the road illuminance is 60 lx and the travelling speed is 0 km/h to 200 km/h, the vertical scanning frequency $f_V$ at which a person does not sense flickering is 55 kHz or higher. In consideration of the road illuminance of 60 lx at a region which a driver watches during driving, it is desirable to set the vertical scanning frequency $f_V$ at 55 kH or higher in order to suppress the flickering occurring in a vehicle lighting fixture such as an automobile headlamp.

Secondly, when the road illuminance is 60 lx and the travelling speed is 0 km/h to 150 km/h, the vertical scanning frequency $f_V$ at which a person does not sense flickering is 50 kHz or higher. In consideration of the road illuminance of 60 lx at a region which a driver watches during driving, it is desirable to set the vertical scanning frequency $f_V$ at 50 kH or higher in order to suppress the flickering occurring in a vehicle lighting fixture such as an automobile headlamp.

Thirdly, when the travelling speed is increased, the vertical scanning frequency $f_V$ at which a person does not sense flickering tends to increase. Taking it into consideration, it is desirable to make the vertical scanning frequency $f_V$ variable in order to suppress the occurrence of flickering in a vehicle lighting fixture such as an automobile headlamp. For example, it is desirable to increase the vertical scanning frequency $f_V$ as the travelling speed is increased.

Fourthly, when the illuminance is increased, the vertical scanning frequency $f_V$ at which a person does not sense flickering tends to increase. Taking it into consideration, it is desirable to make the vertical scanning frequency $f_V$ variable in order to suppress the occurrence of flickering in a vehicle lighting fixture such as an automobile headlamp. For example, it is desirable to increase the vertical scanning frequency $f_V$ as the travelling speed is increased.

Fifthly, the vertical scanning frequency $f_V$ at which a person does not sense flickering is higher at the time of stopping (0 km/h) than at the time of travelling (50 km/h to 150 km/h). Taking it into consideration, it is desirable to make the vertical scanning frequency $f_V$ variable in order to suppress the occurrence of flickering in a vehicle lighting fixture such as an automobile headlamp. For example, it is desirable to make the relationship between the vertical scanning frequency $f_V 1$ and the vertical scanning frequency $f_V 2$ $f_V 1 > f_V 2$.

Sixthly, the vertical scanning frequency $f_V$ at which a person does not sense flickering is not higher than 70 kHz at illuminance of 60 lx, 300 lx, or 2000 lx and at the time of travelling (0 km/h to 150 km/h). Taking it into consideration, it is desirable to set the vertical scanning frequency $f_V$ to 70 kHz or higher or 70 Hz±10 Hz in order to suppress the occurrence of flickering in a vehicle lighting fixture such as an automobile headlamp.

Furthermore, the inventors of the present application has found that the frequency (the vertical scanning frequency $f_V$) of the third AC voltage to be applied to the second piezoelectric actuator 205 and 206 is set to desirably 120 Hz or lower (sawtooth wave), and more desirably 100 Hz or lower (sawtooth wave), when taking the mechanical resonance point (hereinafter referred to as V-side resonance point) of the movable frame 212 including the mirror part 202, the torsion bars 211a and 211b, and the first piezoelectric actuators 203 and 204 into consideration. The reason is as follows.

Figure 10:
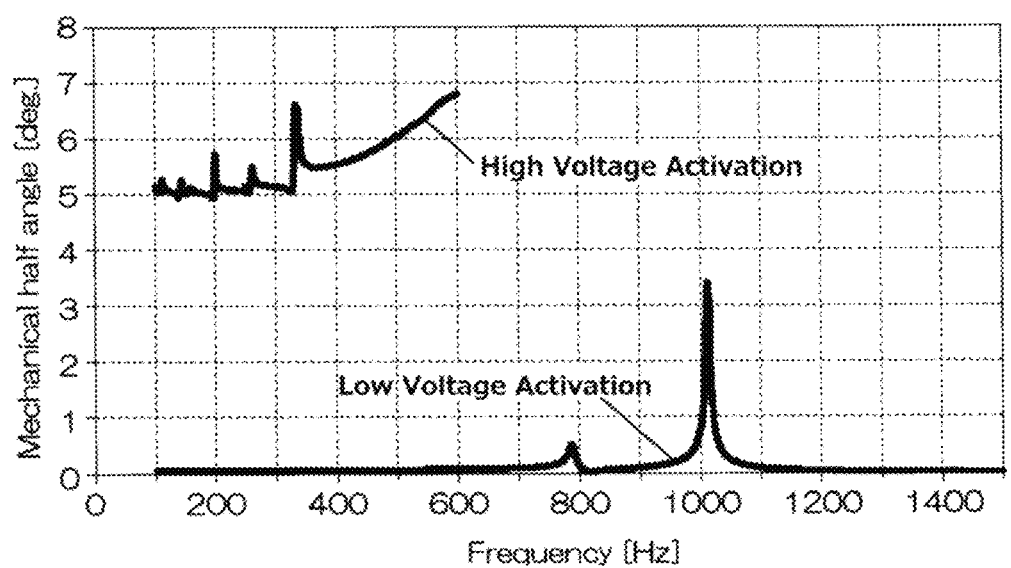
FIG. 10 is a graph showing the relationship between the swing angle and frequency of the mirror part 202.

FIG. 10 is a graph showing the relationship between the swing angle and frequency of the mirror part 202, and the vertical axis represents the swing angle and the horizontal axis is the frequency of the applied voltage (for example, sinusoidal wave or triangle wave).

For example, when a voltage of about 2 V is applied to the second piezoelectric actuators 205 and 206 (low voltage activation), as illustrated in FIG. 10, the V-side resonance point exists near 1000 Hz and 800 Hz. On the other hand, when a high voltage of about 45 V is applied to the second piezoelectric actuators 205 and 206 (high voltage activation), the V-side resonance point exists near 350 Hz and 200 Hz at the maximum swing angle. In order to achieve the stable angular control while it periodically vibrates (swings), it is necessary to set the vertical scanning frequency $f_V$ at points other than the V-side resonance point.

In view of this, the frequency of the third AC voltage to be applied to the second piezoelectric actuators 205 and 206 (the vertical scanning frequency $f_V$) is desirably 120 Hz or lower (sawtooth wave), and more desirably 100 Hz or lower (sawtooth wave). Further, when the frequency of the third AC voltage to be applied to the second piezoelectric actuators 205 and 206 (the vertical scanning frequency $f_V$) exceeds 120 Hz, the reliability, durability, life time, etc. of the optical deflector 201 deteriorate. Also in terms of this point, the frequency of the third AC voltage to be applied to the second piezoelectric actuators 205 and 206 (the vertical scanning frequency $f_V$) is desirably 120 Hz or lower (sawtooth wave), and more desirably 100 Hz or lower (sawtooth wave).

The above desirable vertical scanning frequencies $f_V$ have been derived for the first time by the inventors on the basis of the aforementioned findings.

Figure 11:
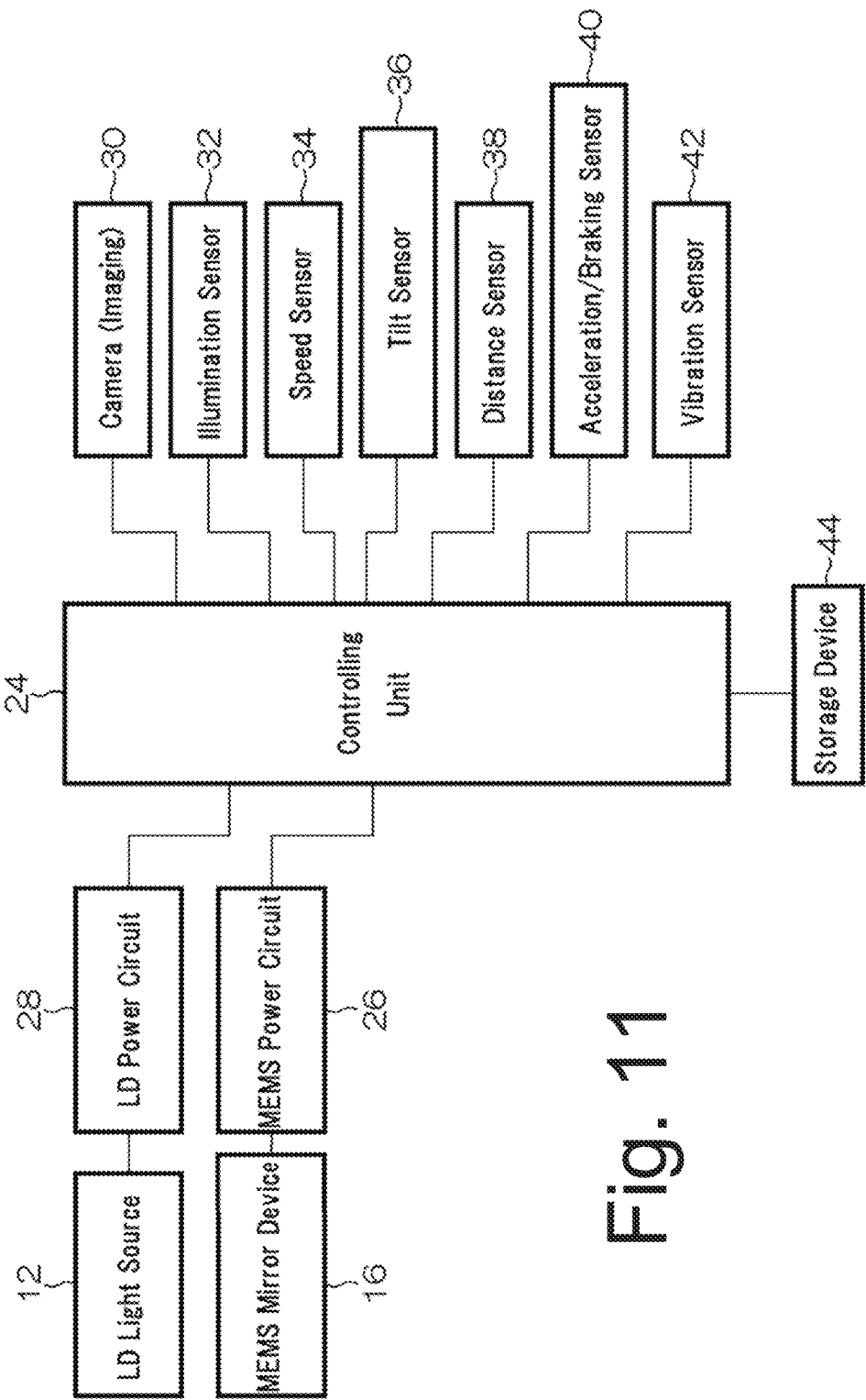
FIG. 11 is a block diagram illustrating an example of a configuration of a control system for controlling an excitation light source 12 and the optical deflector 201.

A description will next be give of the configuration example of a controlling system configured to control the excitation light source 12 and the optical deflector 201, which is illustrated in FIG. 11.

As illustrated in FIG. 11, the control system can be configured to include a controlling unit 24, and a MEMS power circuit 26, an LD power circuit 28, an imaging device 30, an illuminance sensor 32, a speed sensor 34, a tilt sensor 36, a distance sensor 38, an acceleration/braking sensor 40, a vibration sensor 42, a storage device 44, etc., which are electrically connected to the controlling unit 24.

The MEMS power circuit 26 can function as a piezoelectric actuator controlling unit (or mirror part controlling unit) in accordance with the control from the controlling unit 24. The MEMS power circuit 26 can be configured to apply the first and second AC voltages (for example, sinusoidal wave of 25 MHz) to the first piezoelectric actuators 203 and 204 to resonantly drive the first piezoelectric actuators 203 and 204, so that the mirror part 202 can be reciprocally swung around the first axis X1. The MEMS power circuit 26 can be further configured to apply the third AC voltage (for example, sawtooth wave of 55 Hz) to the second piezoelectric actuators 205 and 206 to none-resonantly drive the second piezoelectric actuators 205 and 206, so that the mirror part 202 can be reciprocally swung around the second axis X2.

Figure 12:
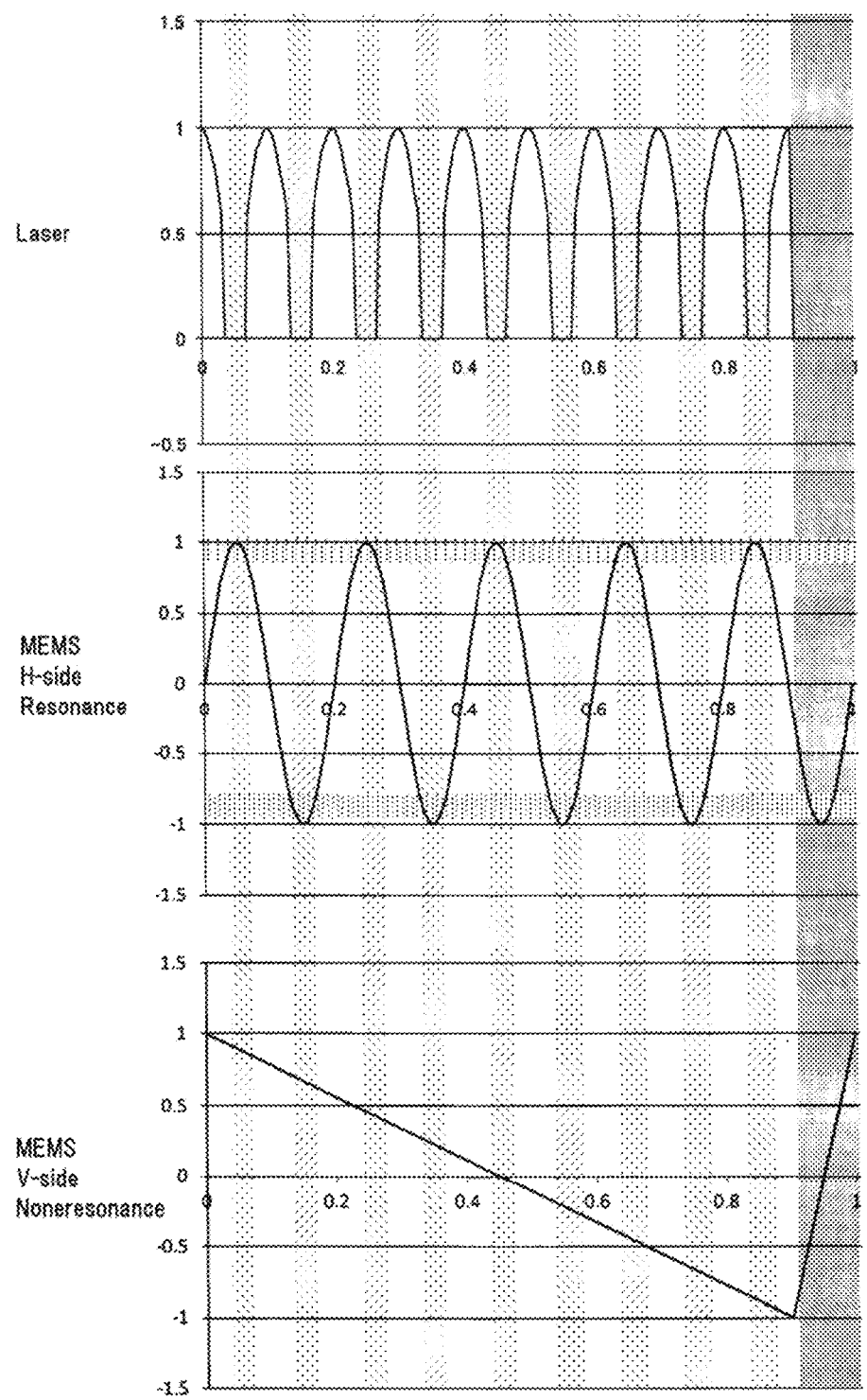
FIG. 12 includes graphs showing a state in which the excitation light source 12 (laser light) is modulated at a modulation frequency $f_L$, (25 MHz) in synchronization with the reciprocal swing of the mirror part 202 (upper graph), showing a state in which the first piezoelectric actuators 203 and 204 are applied with first and second alternating voltages (for example, sinusoidal wave of 25 MHz) (middle graph), and showing a state in which the second piezoelectric actuators 205 and 206 are applied with third alternating voltage (for example, sawtooth wave of 55 MHz) (lower graph)

In FIG. 12, the graph at the center represents the state where the first and second AC voltages (for example, sinusoidal wave of 25 MHz) are applied to the first piezoelectric actuators 203 and 204, while the graph at the bottom represents the state where the third AC voltage (for example, sawtooth wave of 55 Hz) is applied to the second piezoelectric actuators 205 and 206. Also, in FIG. 12, the graph at the top represents the state where the excitation light source 12 emitting laser light rays is modulated at the modulation frequency $f_L$ (25 MHz) in synchronization with the reciprocating swing of the mirror part 202. Note that the shaded areas in FIG. 12 show that the excitation light source 12 is not lit.

Figure 13A:
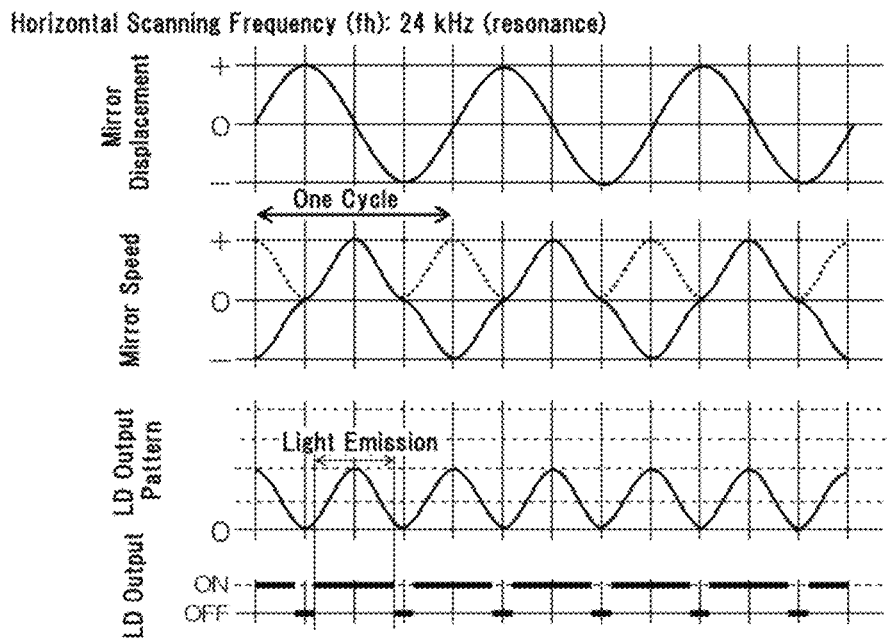
FIG. 13A includes graphs showing details of the first and second alternating voltages (for example, sinusoidal wave of 24 kHz) to be applied to the first piezoelectric actuator 203 and 204, an output pattern of the excitation light source 12 (laser light), etc., and FIG. 13B includes graphs showing details of the third alternating voltage (for example, sawtooth wave of 60 Hz) to be applied to the second piezoelectric actuator 205 and 206, an output pattern of the excitation light source 12 (laser light), etc.
Figure 13B:
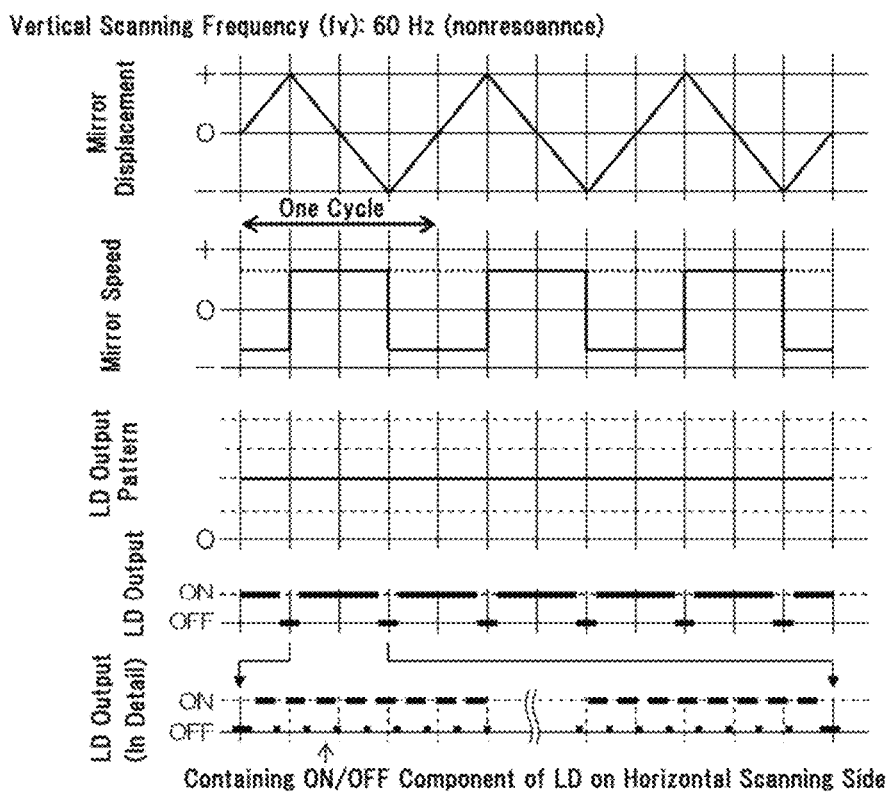

FIG. 13A includes graphs showing details of the first and second AC voltages (for example, sinusoidal wave of 24 kHz) to be applied to the first piezoelectric actuator 203 and 204, an output pattern of the excitation light source 12 (laser light), etc., and FIG. 13B includes graphs showing details of the third AC voltage (for example, sawtooth wave of 60 Hz) to be applied to the second piezoelectric actuator 205 and 206, an output pattern of the excitation light source 12 (laser light), etc.

The LD power circuit 28 can be function as a modulation unit configured to modulate the excitation light source 12 (laser light rays) in synchronization with the reciprocating swing of the mirror part 202 in accordance with the control from the controlling unit 24.

The modulation frequency (modulation rate) of the excitation light source 12 (laser light rays) can be determined by the following formula.

Modulation Frequency $f_L$=(number of pixels)(frame rate;$f_V$)/(ratio of blanking time: $Br$).

On the basis of this formula, if the number of pixels is 300×600, $f_V$=70, and Br=0.5, then the modulation frequency $f_L$ is approximately 25 MHz=300×600×70/0.5. If the modulation frequency $f_L$ is approximately 25 MHz, the output of the excitation light source 12 can be controlled to turn ON/OFF the light source or emit light rays with various intensities in plural stepped degrees per 1/25 MHz seconds (for example, zero is minimum and a plurality of stepwisely increased intensities).

The LD power circuit 28 can modulate the excitation light source 12 (laser light trays) on the basis of a predetermined light distribution pattern (digital data) stored in the storage device 44 so that a two-dimensional image corresponding to the predetermined light distribution pattern is drawn on the wavelength conversion member 18 by means of laser light rays as excitation light with which the optical deflector 201 two-dimensionally scan (in the horizontal and vertical directions).

Examples of the predetermined light distribution pattern (digital data) may include a low-beam light distribution pattern (digital data), a high-beam distribution pattern (digital data), a highway driving light distribution pattern (digital data), and a town-area driving light distribution pattern (digital data). The predetermined light distribution patterns (digital data) can include the outer shapes of respective light distribution pattern, light intensity distribution (illuminance distribution), and the like. As a result, the two-dimensional image drawn on the wavelength conversion member 18 by means of laser light rays as excitation light with which the optical deflector 201 two-dimensionally scan (in the horizontal and vertical directions) can have the outer shape corresponding to the defined light distribution pattern (for example, high-beam light distribution pattern) and the light intensity distribution (for example, the light intensity distribution with a maximum value at its center required for such a high-beam light distribution pattern. Note that the switching between various predetermined light distribution patterns (digital data) can be performed by operating a selector switch to be provided within a vehicle interior.

FIGS. 14A, 14B, and 14C illustrate examples of scanning patterns of laser light (spot-shaped laser light) with which the optical deflector 201 two-dimensionally scan (in the horizontal direction and the vertical direction).

Examples of the scanning patterns in the horizontal direction of laser light (spot-shaped laser light) scanned by the optical deflector 201 in a two-dimensional manner (in the horizontal direction and the vertical direction) may include the pattern with bidirectional scanning (reciprocating scanning) as illustrated in FIG. 14A and the pattern with one-way scanning (forward scanning or return scanning only) as illustrated in FIG. 14B.

Furthermore, examples of the scanning patterns in the vertical direction of laser light (spot-shaped laser light) scanned by the optical deflector 201 in a two-dimensional manner (in the horizontal direction and the vertical direction) may include the pattern densely scanned one line by one line, and the pattern scanned every other line similar to the interlace scheme as illustrated in FIG. 14C.

Figure 15A:
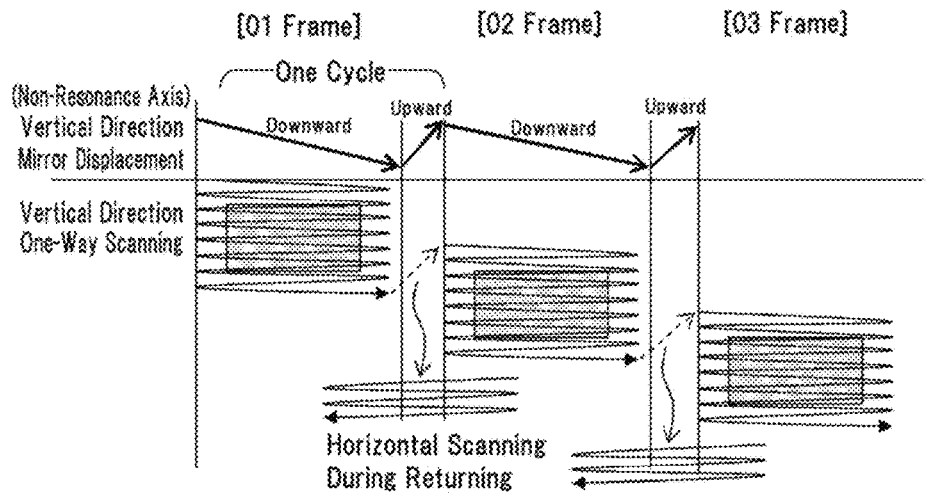
FIGS. 15A and 15B illustrate examples of scanning patterns of laser light (spot-shaped laser light) two-dimensionally scanning (in the horizontal direction and the vertical direction) by the optical deflector 201.
Figure 15B:
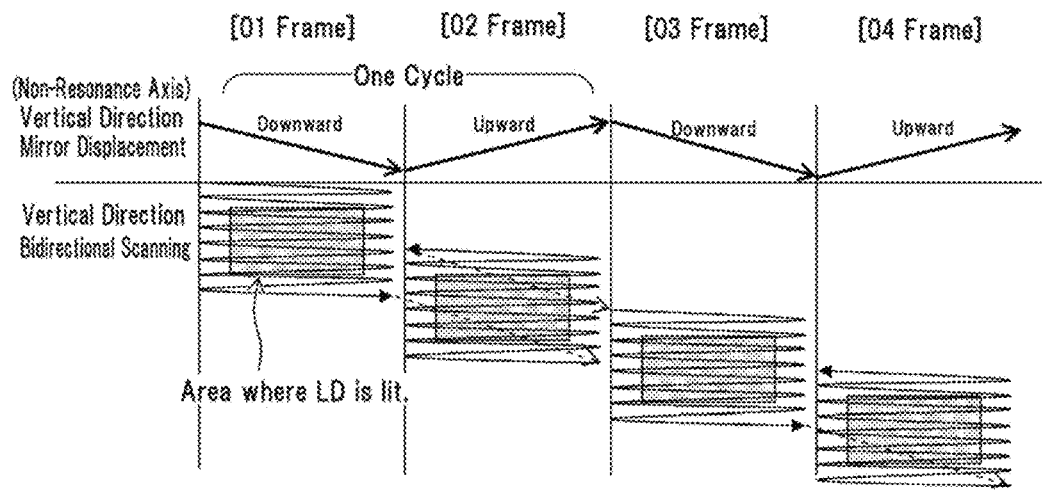

Furthermore, examples of the scanning patterns in the vertical direction of laser light (spot-shaped laser light) scanned by the optical deflector 201 in a two-dimensional manner (in the horizontal direction and the vertical direction) may include the pattern in which the optical deflector scan from the upper end to the lower end repeatedly, as illustrated in FIG. 15A, and the pattern in which the optical deflector scan from the upper end to the lower end and then from the lower end to the upper end repeatedly, as illustrated in FIG. 15B.

Incidentally, when the scanning reaches the left, right, upper, or lower end of the wavelength conversion member 18 (screen), the scanning light should be returned to the original starting point. This time period is called as blanking, during which the excitation light source 12 is not lit.

A description will next be given of other examples of control by the control system illustrated in FIG. 11.

The control system illustrated in FIG. 11 can various types of control other than the above-described exemplary control. For example, the control system can achieve a variable light-distribution vehicle headlamp (ADB: Adaptive Driving Beam). For example, the controlling unit 28 can determine whether an object which is prohibited from being irradiated with light (such as pedestrians and oncoming vehicles) exists within a predetermined light distribution pattern formed on a virtual vertical screen on the basis of detection results of the imaging device 30 functioning as a detector for detecting an object present in front of its vehicle body. If it is determined that the object exists within the pattern, the controlling unit 28 can control the excitation light source 12 in such a manner that the output of the excitation light source 12 is stopped or lowered during the time when a region on the wavelength conversion member 18 corresponding to a region of the light distribution pattern where the object exists is being scanned with the laser light rays as the excitation light.

Furthermore, on the basis of the finding by the inventors of the present application, i.e., on the basis of the fact where when the travelling speed is increased, the vertical scanning frequency $f_V$ at which a person does not sense flickering tends to increase, the driving frequency (vertical scanning frequency $f_V$) for nonresonantly driving the second piezoelectric actuators 205 and 206 can be changed on the basis of the travelling speed as a result of detection by the speed sensor 34 provided to the vehicle body. For example, it is possible to increase the vertical scanning frequency $f_V$ as the traveling speed increases. When doing so, the correspondence between the vertical scanning frequencies $f_V$ and the traveling speeds (or ranges of traveling speed) is stored in the storage device 44 in advance (meaning that the relationship of the increased vertical scanning frequency $f_V$ corresponding to the increased travelling speed or range is confirmed in advance). Then, the vertical scanning frequency $f_V$ is read out from the storage device 44 on the basis of the detected vehicle traveling speed detected by the speed sensor 34. After that, the MEMS power circuit 26 can apply the third AC voltage (with the read-out vertical scanning frequency) to the second piezoelectric actuators 205 and 206 to thereby nonresonantly drive the second piezoelectric actuators 205 and 206.

Furthermore, on the basis of the finding by the inventors of the present application, i.e. on the basis of the fact where the vertical scanning frequency $f_V$ at which a person does not sense flickering is higher at the time of stopping (0 km/h) than at the time of travelling (50 km/h to 150 km/h), the vertical scanning frequency $f_V$ at the time of stopping (0 km/h) can be increased as compared with that at the time of travelling (50 km/h to 150 km/h). This can be achieved by the following method. That is, for example, the vertical scanning frequency $f_V 1$ at the time of stopping and the vertical scanning frequency $f_V 2$ at the time of traveling are stored in the storage device 44 in advance ($f_V 1 > f_V 2$), and it is determined that the vehicle body is stopped or not on the basis of the detection results from the speed sensor 34. When it is determined that the vehicle body is traveling, the vertical scanning frequency $f_V 2$ at the time of traveling is read out from the storage device 44. After that, the MEMS power circuit 26 can apply the third AC voltage (with the read-out vertical scanning frequency $f_V 2$ at the time of traveling) to the second piezoelectric actuators 205 and 206 to thereby nonresonantly drive the second piezoelectric actuators 205 and 206.

On the other hand, when it is determined that the vehicle body is stopped, the vertical scanning frequency $f_V 1$ at the time of stopping is read out from the storage device 44. After that, the MEMS power circuit 26 can apply the third AC voltage (with the read-out vertical scanning frequency $f_V 1$ at the time of stopping) to the second piezoelectric actuators 205 and 206 to thereby nonresonantly drive the second piezoelectric actuators 205 and 206.

Furthermore, on the basis of the finding by the inventors of the present application, i.e. on the basis of the fact where when the illuminance is increased, the vertical scanning frequency $f_V$ at which a person does not sense flickering tends to increase, the driving frequency (vertical scanning frequency $f_V$) for nonresonantly driving the second piezoelectric actuators 205 and 206 can be changed on the basis of the illuminance detected by the illumination sensor 32 provided to the vehicle body (for example, the illuminance sensed by a driver). For example, it is possible to increase the vertical scanning frequency $f_V$ as the illuminance increases. When doing so, the correspondence between the vertical scanning frequencies $f_V$ and the illuminances (or ranges of illuminance) is stored in the storage device 44 in advance (meaning that the relationship of the increased vertical scanning frequency $f_V$ corresponding to the increased illuminance or range is confirmed in advance). Then, the vertical scanning frequency $f_V$ is read out from the storage device 44 on the basis of the detected illuminance value detected by the illuminance sensor 32. After that, the MEMS power circuit 26 can apply the third AC voltage (with the read-out vertical scanning frequency) to the second piezoelectric actuators 205 and 206 to thereby nonresonantly drive the second piezoelectric actuators 205 and 206.

In the same manner, the driving frequency (vertical scanning frequency $f_V$) for nonresonantly driving the second piezoelectric actuators 205 and 206 can be changed on the basis of the distance between the vehicle body and an object to be irradiated with light detected by the distance sensor 38 provided to the vehicle body.

In the same manner, the driving frequency (vertical scanning frequency $f_V$) for nonresonantly driving the second piezoelectric actuators 205 and 206 can be changed on the basis of the detection results by the vibration sensor 42 provided to the vehicle body.

In the same manner, the driving frequency (vertical scanning frequency $f_V$) for nonresonantly driving the second piezoelectric actuators 205 and 206 can be changed according to a predetermined light distribution pattern. For example, the driving frequency (vertical scanning frequency $f_V$) for nonresonantly driving the second piezoelectric actuators 205 and 206 can be changed between the highway driving light distribution pattern and the town-area driving light distribution pattern.

By making the vertical scanning frequency $f_V$ variable as described above, the optical deflector 201 can be improved in terms of the reliability, durability, life time, etc. when compared with the case where the driving frequency for nonresonantly driving the second piezoelectric actuators 205 and 206 is made constant.

In place of the one-dimensional nonresonance/one-dimensional resonance type (2-D optical scanner (fast resonant and slow static combination)) of optical deflector with the above-described configuration, a two-dimensional nonresonance type optical deflector 161 can be utilized.

<Two-Dimensional Nonresonance Type>

Figure 16:
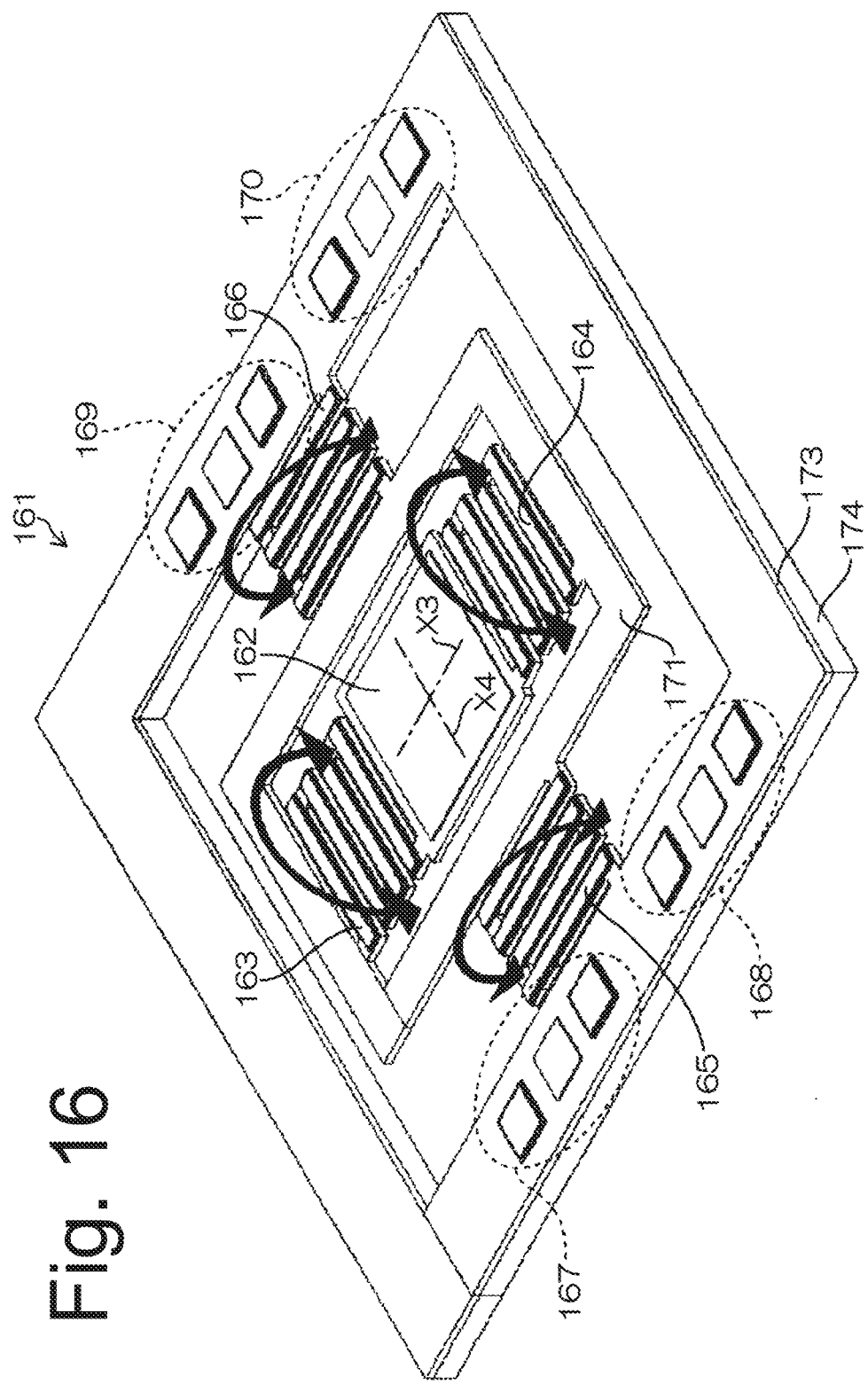
FIG. 16 is a perspective view of an optical deflector 161 of a two-dimensional nonresonance type.

FIG. 16 is a perspective view of an optical deflector 161 of a two-dimensional nonresonance type.

As illustrated in FIG. 16, the optical deflector 161 of the two-dimensional nonresonance type can be configured to include a mirror part 162 (referred to as a MEMS mirror), piezoelectric actuators 163 to 166 configured to drive the mirror part 162, a movable frame 171 configured to support the piezoelectric actuators 163 to 166, and a base 174.

The configuration and action of the piezoelectric actuators 163 to 166 can be the same as those of the second piezoelectric actuators 205 and 206 of the optical deflector 201 of the one-dimensional nonresonance/one-dimensional resonance type.

In the present reference example, each of first piezoelectric actuators 163 and 164 out of the piezoelectric actuators 163 to 166 can be applied with a first AC voltage as its driving voltage. At this time, the applied voltage can be an alternating voltage with a frequency equal to or lower than a predetermined value smaller than the mechanical resonance frequency (first resonance point) of the mirror part 162 to thereby nonresonantly drive the first piezoelectric actuators 163 and 164. This can cause the mirror part 162 to be reciprocately swung around the third axis X3 with respect to the movable frame 171, so that the excitation light rays from the excitation light source 12 and incident on the mirror part 162 can scan in a first direction (for example, horizontal direction).

Furthermore, a second AC voltage can be applied to each of the second piezoelectric actuators 165 and 166 as a drive voltage. At this time, the applied voltage can be an alternating voltage with a frequency equal to or lower than a predetermined value smaller than the mechanical resonance frequency (first resonance point) of the movable frame 171 including the mirror part 162 and the first piezoelectric actuators 165 and 166 to thereby nonresonantly drive the movable frame 171. This can cause the mirror part 162 to be reciprocately swung around the fourth axis X4 with respect to the base 174, so that the excitation light rays from the excitation light source 12 and incident on the mirror part 162 can scan in a second direction (for example, vertical direction).

Figure 17A:
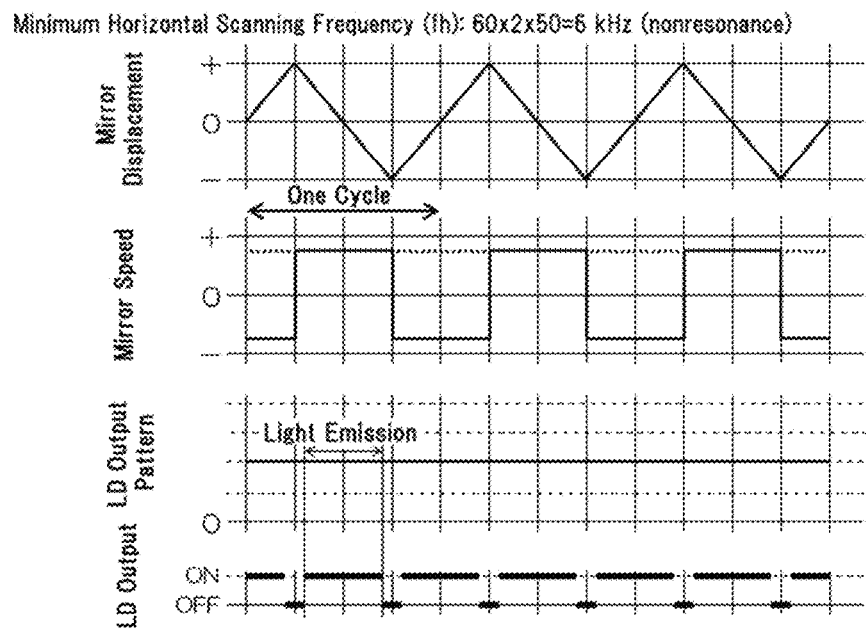
FIG. 17A includes graphs showing details of the first alternating voltage (for example, sawtooth wave of 6 kHz) to be applied to first piezoelectric actuator 163 and 164, an output pattern of the excitation light source 12 (laser light), etc., and FIG. 17B includes graphs showing details of the third alternating voltage (for example, sawtooth wave of 60 Hz) to be applied to second piezoelectric actuator 165 and 166, an output pattern of the excitation light source 12 (laser light), etc.
Figure 17B:
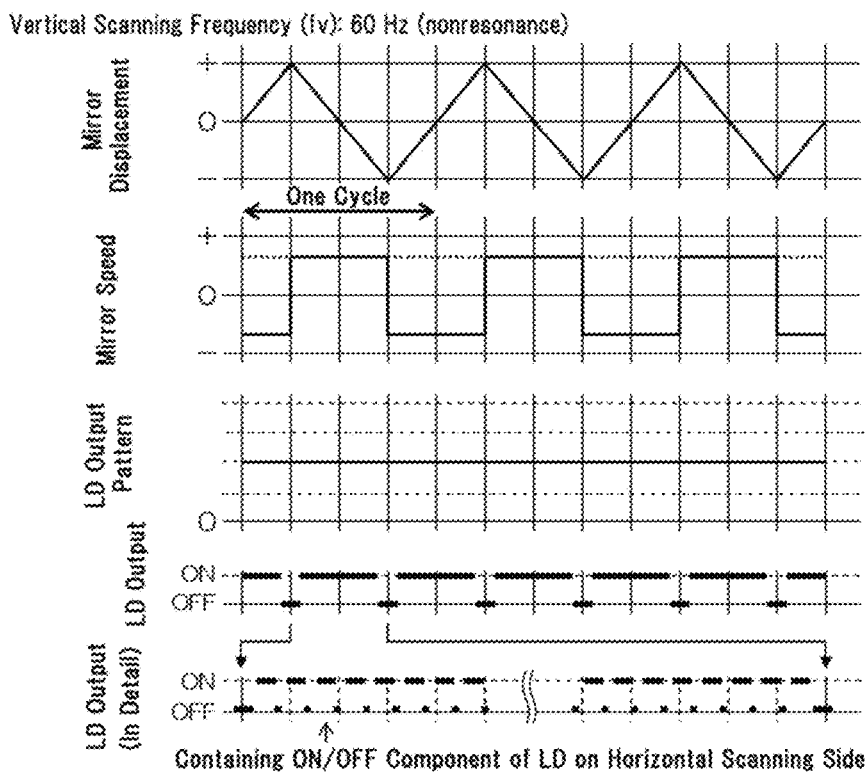

FIG. 17A includes graphs showing details of the first alternating voltage (for example, sawtooth wave of 6 kHz) to be applied to the first piezoelectric actuator 163 and 164, an output pattern of the excitation light source 12 (laser light), etc., and FIG. 17B includes graphs showing details of the third alternating voltage (for example, sawtooth wave of 60 Hz) to be applied to the second piezoelectric actuator 165 and 166, an output pattern of the excitation light source 12 (laser light), etc.

The respective piezoelectric actuators 163 to 166 can be driven, so that the laser light as the excitation light rays from the excitation light source 12 can scan two-dimensionally (in the horizontal and vertical directions).

In place of the one-dimensional nonresonance/one-dimensional resonance type (2-D optical scanner (fast resonant and slow static combination)) of optical deflector with the above-described configuration, a two-dimensional resonance type optical deflector 201A can be utilized.

<Two-Dimensional Resonance Type>

Figure 18:
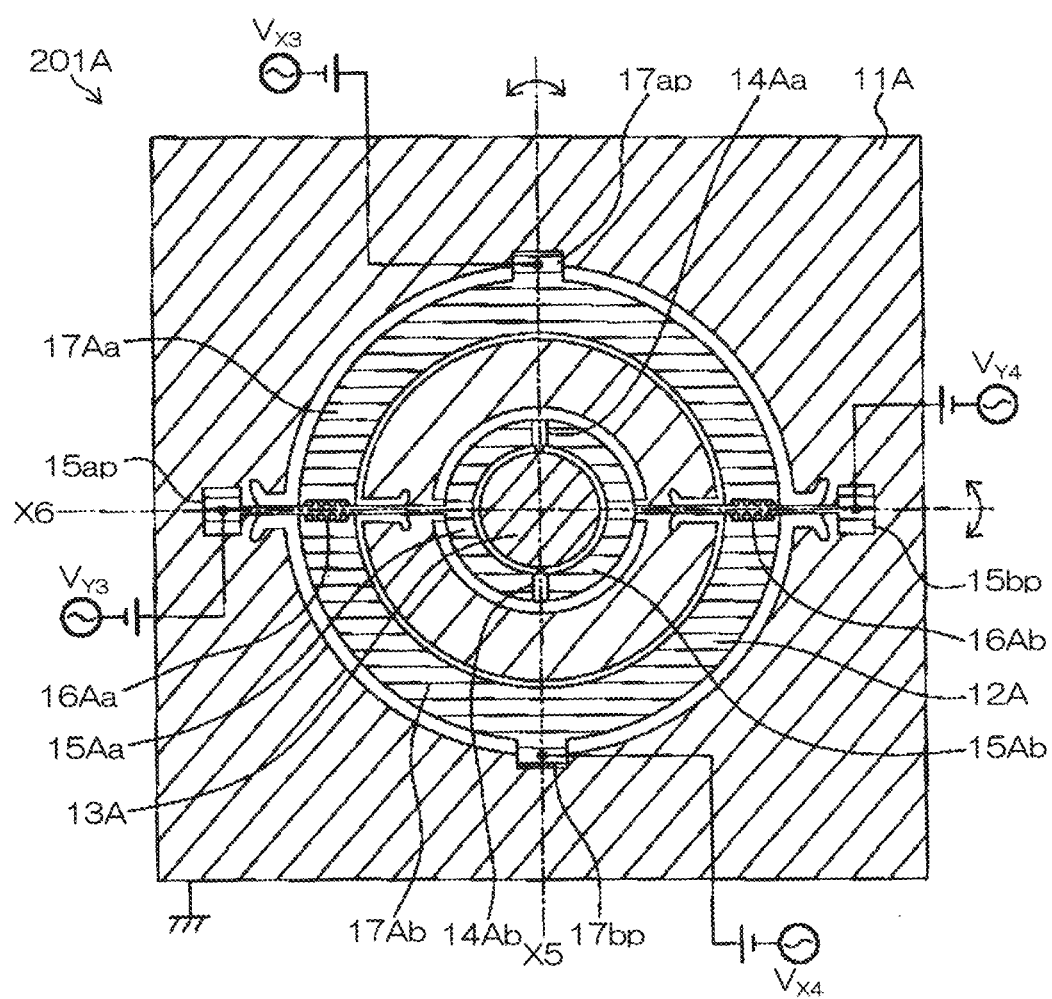
FIG. 18 is a plan view illustrating an optical deflector 201A of a two-dimensional resonance type.

FIG. 18 is a perspective view of an optical deflector 201A of a two-dimensional resonance type.

As illustrated in FIG. 18, the optical deflector 201A of the two-dimensional resonance type can be configured to include a mirror part 13A (referred to as a MEMS mirror), first piezoelectric actuators 15Aa and 15Ab configured to drive the mirror part 13A via torsion bars 14Aa and 14Ab, a movable frame 12A configured to support the first piezoelectric actuators 15Aa and 15Ab, second piezoelectric actuators 17Aa and 17Ab configured to drive the movable frame 12A, and a base 174 configured to support the second piezoelectric actuators 17Aa and 17Ab.

The configuration and action of the piezoelectric actuators 15Aa, 15Ab, 17Aa, and 17Ab can be the same as those of the first piezoelectric actuators 203 and 204 of the optical deflector 201 of the one-dimensional nonresonance/one-dimensional resonance type.

In the present reference example, the first piezoelectric actuator 15Aa can be applied with a first AC voltage as its driving voltage while the other first piezoelectric actuator 15Ab can be applied with a second AC voltage as its driving voltage. Here, the first AC voltage and the second AC voltage can be different from each other in phase, such as a sinusoidal wave with an opposite phase or shifted phase. In this case, an AC voltage with a frequency close to a mechanical resonance frequency (first resonance point) of the mirror part 13A including the torsion bars 14Aa and 14Ab can be applied to resonantly drive the first piezoelectric actuators 15Aa and 15Ab. This can cause the mirror part 13A to be reciprocately swung around the fifth axis X5 with respect to the movable frame 12A, so that the laser light rays from the excitation light source 12 and incident on the mirror part 13A can scan in a first direction (for example, horizontal direction).

A third AC voltage can be applied to the second piezoelectric actuator 17Aa as a drive voltage while a fourth AC voltage can be applied to the other second piezoelectric actuator 17Ab as a drive voltage.

Here, the third AC voltage and the fourth AC voltage can be different from each other in phase, such as a sinusoidal wave with an opposite phase or shifted phase. In this case, an AC voltage with a frequency near the mechanical resonance frequency (first resonance point) of the movable frame 12A including the mirror part 13A and the first piezoelectric actuators 15Aa and 15Ab can be applied to resonantly drive the first piezoelectric actuators 17Aa and 17Ab. This can cause the mirror part 13A to be reciprocately swung around the sixth axis X6 with respect to the base 11A, so that the laser light rays as excitation light rays from the excitation light source 12 and incident on the mirror part 13A can scan in a second direction (for example, vertical direction).

Figure 19A:
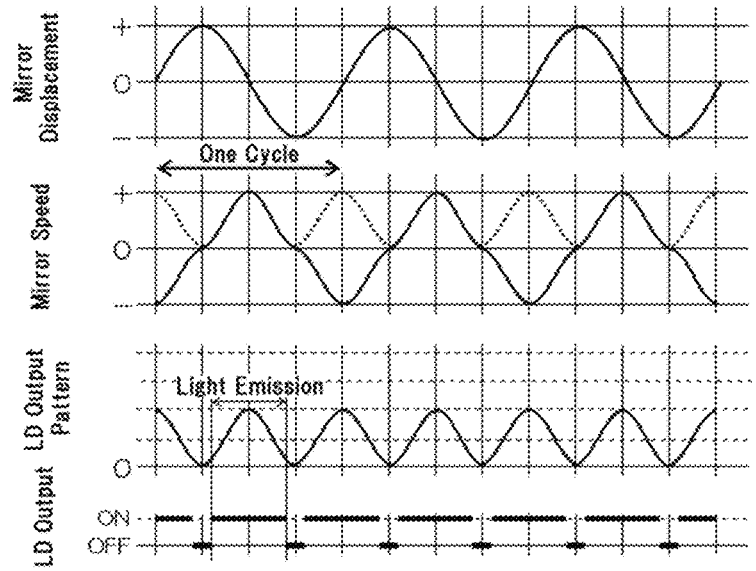
FIG. 19A includes graphs showing details of the first alternating voltage (for example, sinusoidal wave of 24 kHz) to be applied to first piezoelectric actuators 15Aa and 15Ab, an output pattern of the excitation light source 12 (laser light), etc., and FIG. 19B includes graphs showing details of the third alternating voltage (for example, sinusoidal wave of 12 Hz) to be applied to second piezoelectric actuators 17Aa and 17Ab, an output pattern of the excitation light source 12 (laser light), etc.
Figure 19B:
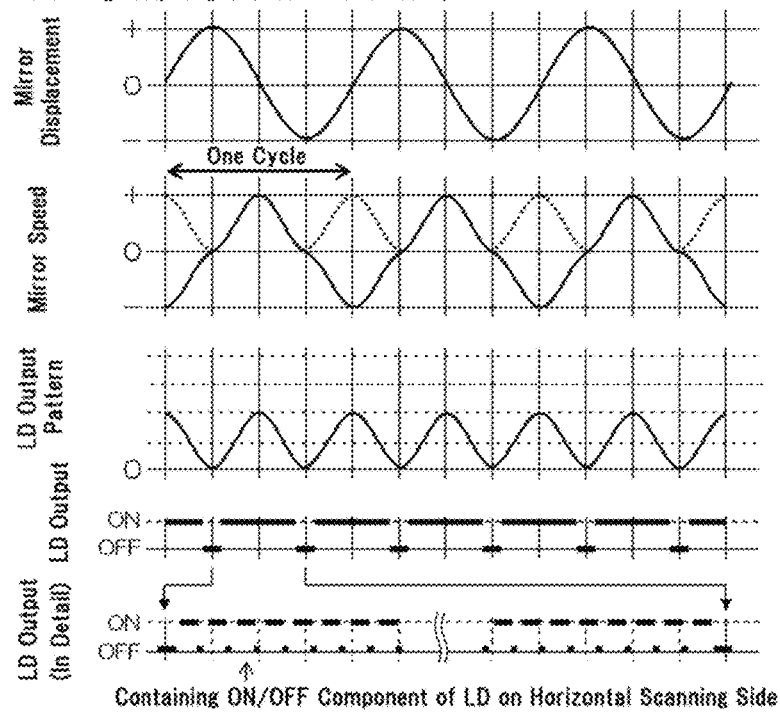

FIG. 19A includes graphs showing details of the first AC voltage (for example, sinusoidal wave of 24 kHz) to be applied to the first piezoelectric actuators 15Aa and 15Ab, an output pattern of the excitation light source 12 (laser light), etc., and FIG. 19B includes graphs showing details of the third AC voltage (for example, sinusoidal wave of 12 Hz) to be applied to the second piezoelectric actuators 17Aa and 17Ab, an output pattern of the excitation light source 12 (laser light), etc.

The respective piezoelectric actuators 15Aa, 15Ab, 17Aa, and 17Ab can be driven, so that the laser light as the excitation light rays from the excitation light source 12 can scan two-dimensionally (in the horizontal and vertical directions).

As described above, according to the present reference example, even when frequencies remarkably lower than 220 Hz that is considered to cancel the occurrence of flickering in vehicle lighting fixtures such as an automobile headlamp are utilized, or frame rates remarkably lower than 220 fps, i.e., "55 fps or more," "55 fps to 120 fps," "55 fpf to 100 fps," or "70 fps±10 fps" are utilized, the occurrence of flickering can be suppressed.

Furthermore, according to the present reference example, frequencies remarkably lower than 220 Hz are utilized (or frame rates remarkably lower than 220 fps), i.e., "55 fps or more," "55 fps to 120 fps," "55 fpf to 100 fps," or "70 fps±10 fps" are utilized are utilized, it is possible to improve the reliability, durability, and life time of the optical deflector 201 when compared with the case where the frequency of 220 Hz or higher or frame rates of 220 fps or more are used.

Furthermore, according to the present reference example, the drive frequency used for nonresonantly driving the second piezoelectric actuators 205 and 206 can be made variable, and therefore, the reliability, durability, and life time of the optical deflector 201 can be improved when compared with the case where the drive frequency used for nonresonantly driving the second piezoelectric actuators 205 and 206 are constant.

A description will now be given of a vehicle lighting unit using three optical deflectors 201 of one-dimensional nonresonance/one-dimensional resonance type (2-D optical scanner (fast resonant and slow static combination)) with reference to the associated drawings as a first exemplary embodiment. It is appreciated that the aforementioned various types of optical deflectors discussed in the above reference example can be used in place of the one-dimensional nonresonance/one-dimensional resonance type optical deflector 201.

Figure 21:
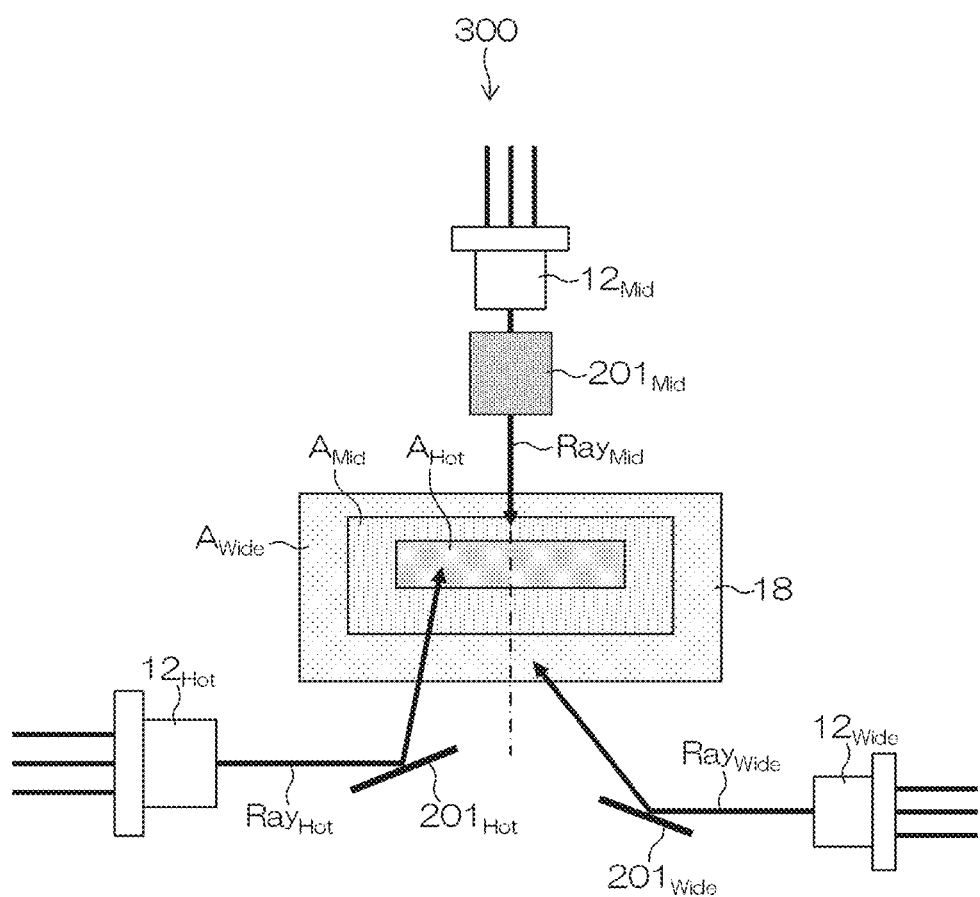
FIG. 21 is a schematic diagram illustrating a vehicle lighting fixture 300 according to a first exemplary embodiment made in accordance with the principles of the presently disclosed subject matter.
Figure 22:
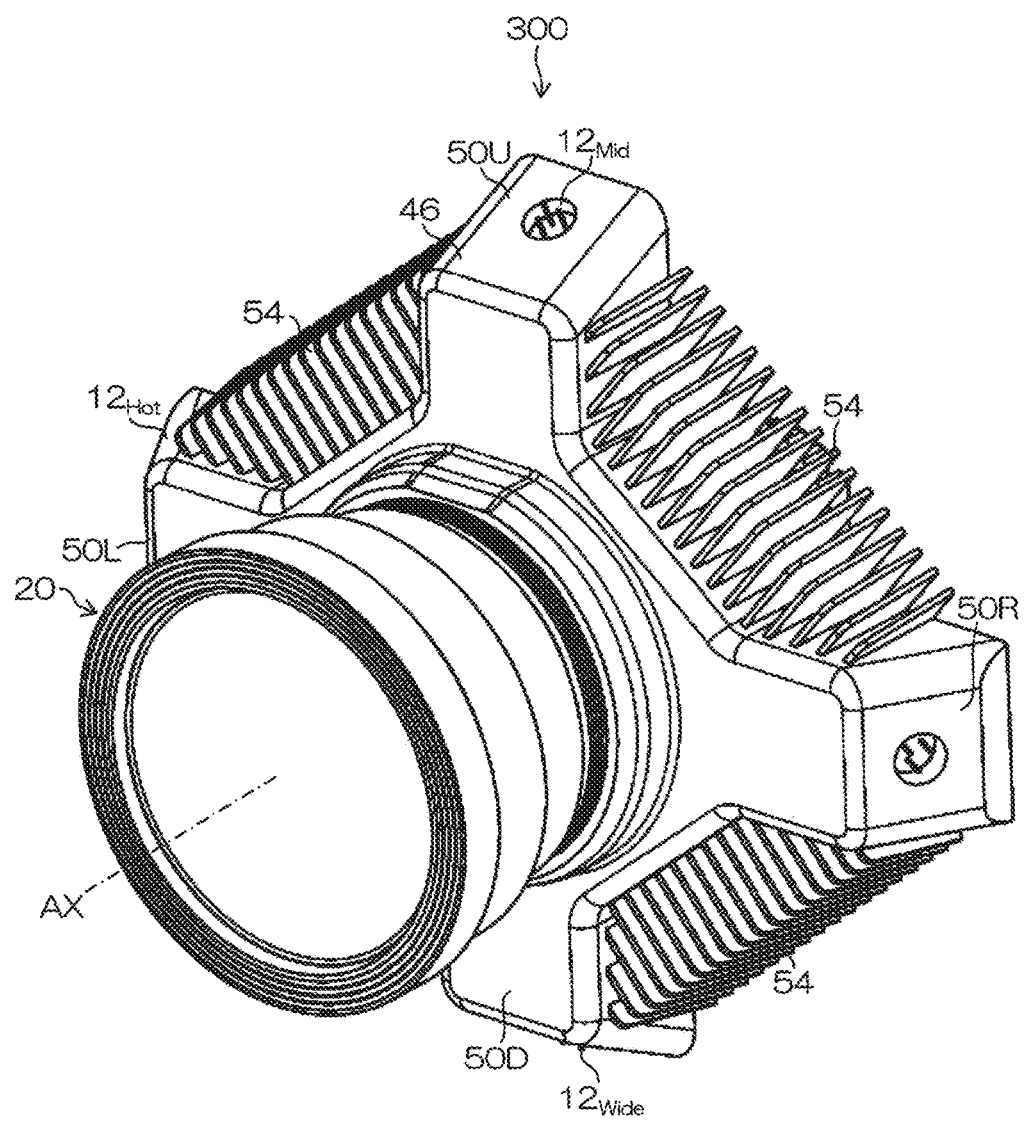
FIG. 22 is a perspective view illustrating the vehicle lighting fixture 300.
Figure 23:
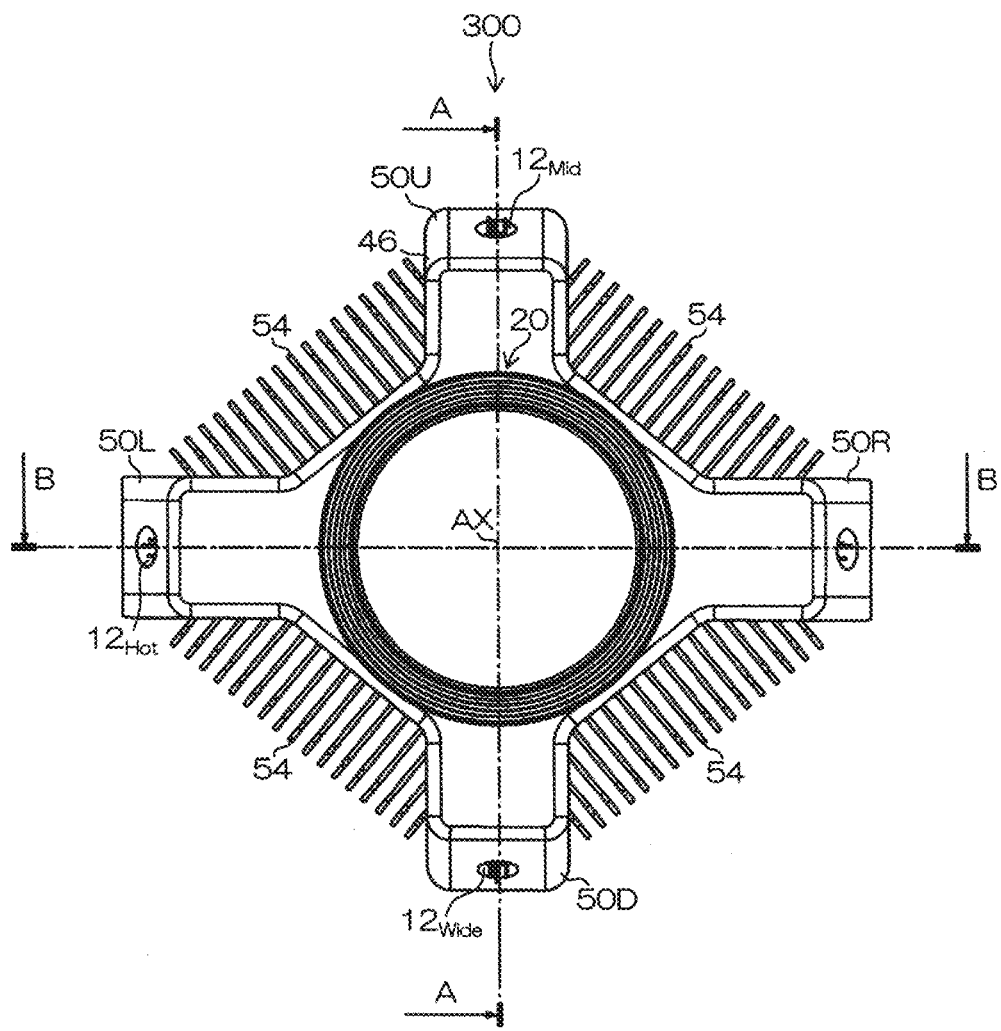
FIG. 23 is a front view illustrating the vehicle lighting fixture 300.
Figure 24:
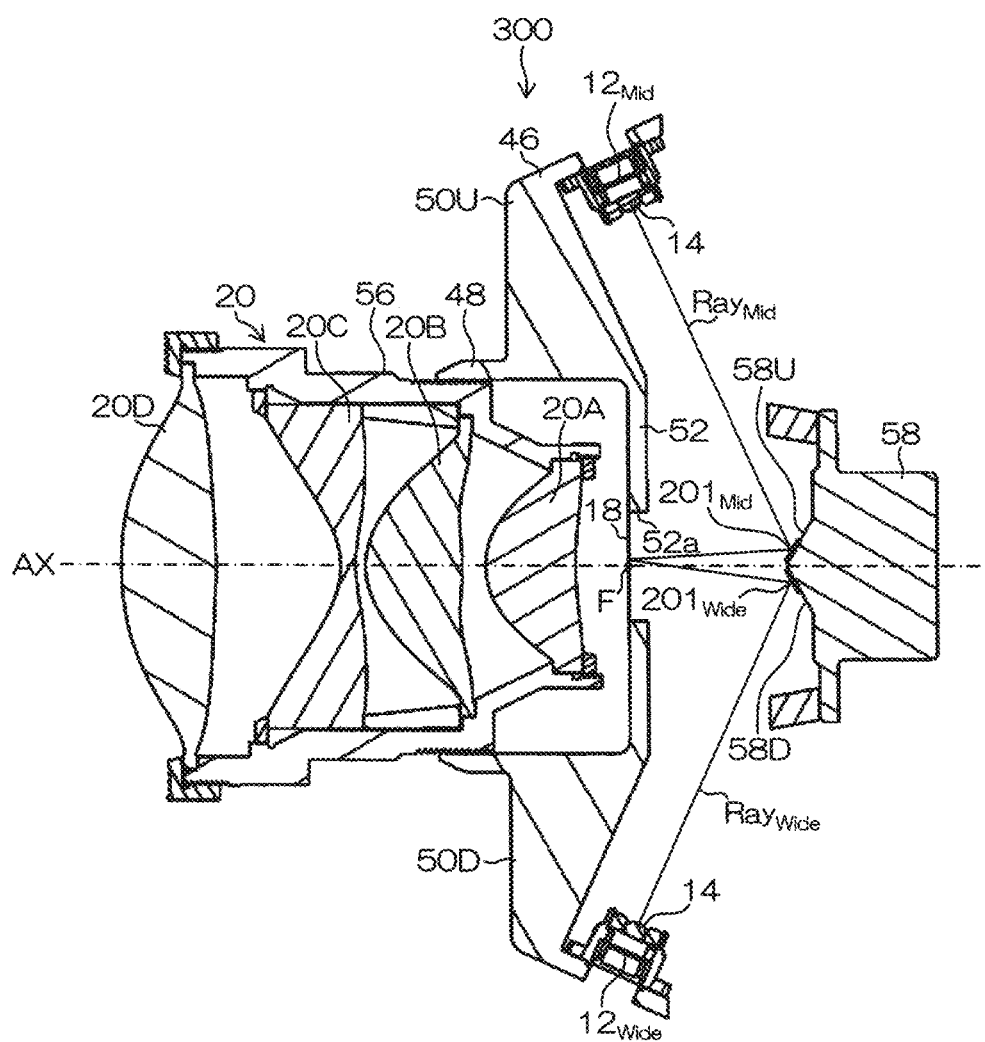
FIG. 24 is a cross-sectional view of the vehicle lighting fixture 300 of FIG. 23 taken along line A-A.
Figure 25:
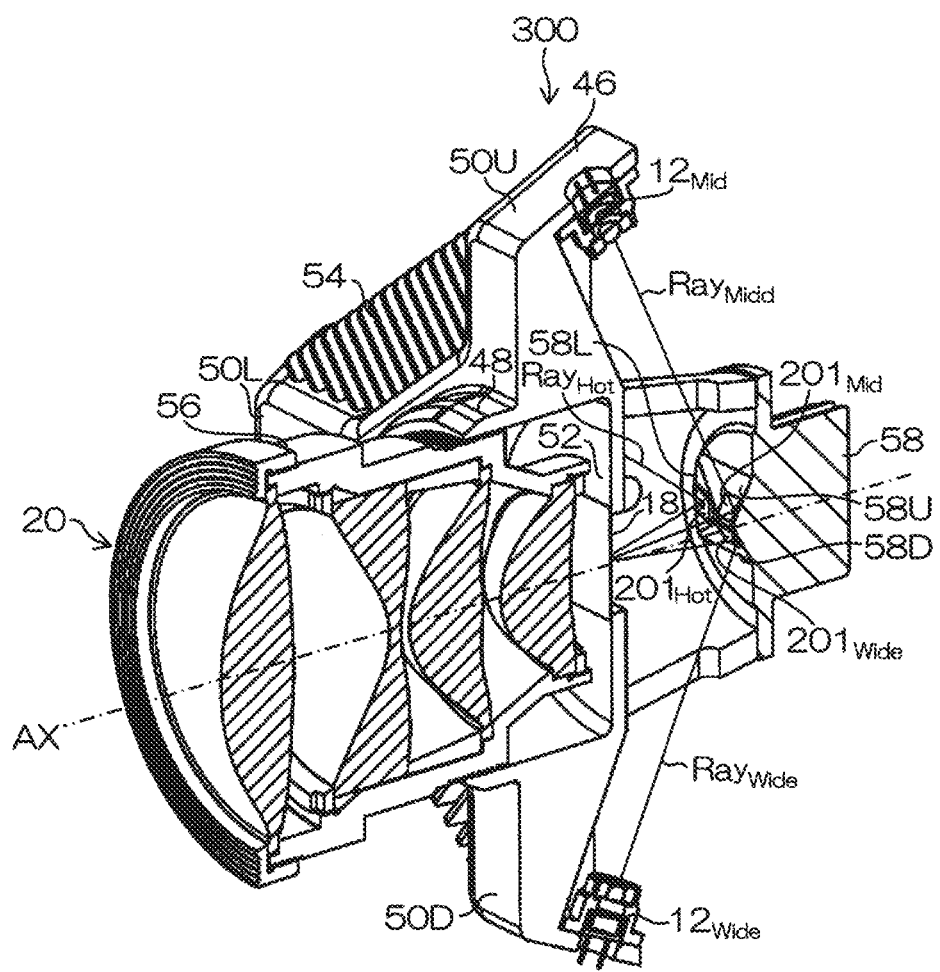
FIG. 25 is a perspective view including the cross-sectional view of FIG. 24 illustrating the vehicle lighting fixture 300 of FIG. 23 taken along line A-A.
Figure 26:
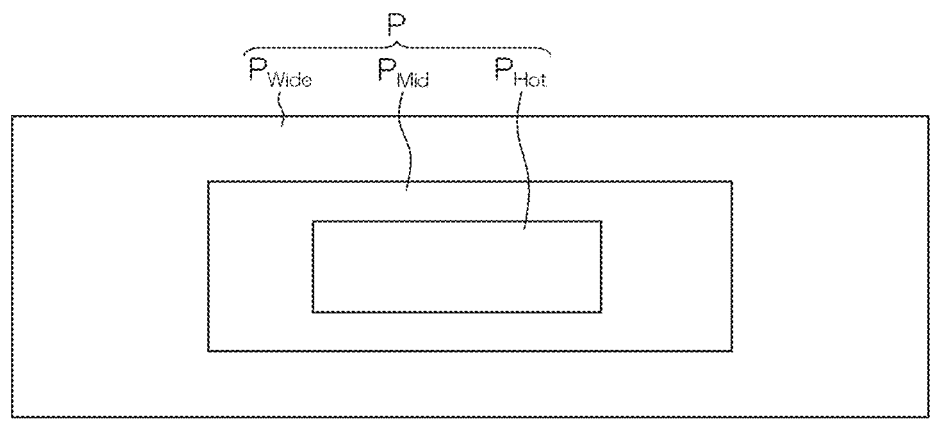
FIG. 26 is a diagram illustrating a predetermined light distribution pattern P formed on a virtual vertical screen (assumed to be disposed in front of a vehicle body approximately 25 m away from the vehicle front face) by the vehicle lighting fixture 300 of the present exemplary embodiment.

FIG. 21 is a schematic diagram illustrating a vehicle lighting fixture 300 according to the first exemplary embodiment made in accordance with the principles of the presently disclosed subject matter. FIG. 22 is a perspective view illustrating the vehicle lighting fixture 300. FIG. 23 is a front view illustrating the vehicle lighting fixture 300. FIG. 24 is a cross-sectional view of the vehicle lighting fixture 300 of FIG. 23 taken along line A-A. FIG. 25 is a perspective view including the cross-sectional view of FIG. 24 illustrating the vehicle lighting fixture 300 of FIG. 23 taken along line A-A. FIG. 26 is a diagram illustrating a predetermined light distribution pattern P formed on a virtual vertical screen (assumed to be disposed in front of a vehicle body approximately 25 m away from the vehicle front face) by the vehicle lighting fixture 300 of the present exemplary embodiment.

As illustrated in FIG. 26, the vehicle lighting fixture 300 of the present exemplary embodiment can be configured to form a predetermined light distribution pattern P (for example, high-beam light distribution pattern) excellent in far-distance visibility and sense of light distribution. The predetermined light distribution pattern P can be configured such that the center light intensity ($P_{Hot}$) is relatively high and the light intensity is gradually lowered from the center to the periphery ($P_{Hot} \rightarrow P_{Mid} \rightarrow P_{Wide}$).

Next, the vehicle lighting fixture 300 of the present exemplary embodiment will be compared with the vehicle lighting fixture 10 of the above-described reference example. In the above-described reference example as illustrated in FIG. 2, the vehicle lighting fixture 10 can include a single excitation light source 12 and a single optical deflector 201. In the present exemplary embodiment as illustrated in FIG. 21, the vehicle lighting fixture 300 can include three excitation light source (wide-zone excitation light source $12_{Wide}$, middle-zone excitation light source $12_{Mid}$, and hot-zone excitation light source $12_{Hot}$), and three optical deflectors (wide-zone optical deflector $201_{Wide}$, middle-zone optical deflector $201_{Mid}$, and hot-zone optical deflector $201_{Hot}$), which is the different feature from the above-described reference example.

The configuration of the vehicle lighting fixture 300 of the present exemplary embodiment can have the same configuration as that of the vehicle lighting fixture 10 of the above-described reference example except for the above different point. Hereinbelow, a description will be give of the different point of the present exemplary embodiment from the above-described reference example, and the same or similar components of the present exemplary embodiment as those in the above-described reference example will be denoted by the same reference numerals and a description thereof will be omitted as appropriate.

In the specification, the term "hot-zone" member/part means a member/part for use in forming a hot-zone partial light distribution pattern (with highest intensity), the term "middle-zone" member/part means a member/part for use in forming a middle-zone partial light distribution pattern (diffused more than the hot-zone partial light distribution pattern), and the term "wide-zone" member/part means a member/part for use in forming a wide-zone partial light distribution pattern (diffused more than the middle-zone partial light distribution pattern), unless otherwise specified.

The vehicle lighting fixture 300 can be configured, as illustrated in FIGS. 21 to 25, as a vehicle headlamp. The vehicle lighting fixture 300 can include three excitation light sources $12_{Wide}$, $12_{Mid}$, and $12_{Hot}$, three optical deflectors $201_{Wide}$, $201_{Mid}$, and $201_{Hot}$ each including a mirror part 202, a wavelength conversion member 18, a projection lens assembly 20, etc. The three optical deflectors $201_{Wide}$, $201_{Mid}$, and $201_{Hot}$ can be provided corresponding to the three excitation light sources $12_{Wide}$, $12_{Mid}$, and $12_{Hot}$. The wavelength conversion member 18 can include three scanning regions $A_{Wide}$, $A_{Mid}$, and $A_{Hot}$ (see FIG. 21) provided corresponding to the three optical deflectors $201_{Wide}$, $201_{Mid}$, and $201_{Hot}$. Partial light intensity distributions can be formed within the respective scanning regions $A_{Wide}$, $A_{Mid}$, and $A_{Hot}$, and can be projected through the projection lens assembly 20 serving as an optical system for forming the predetermined light distribution pattern P. Note that the number of the excitation light sources 12, the optical deflectors 201, and the scanning regions A is not limited to three, and may be two or four or more.

As illustrated in FIG. 24, the projection lens assembly 20, the wavelength conversion member 18, and the optical deflectors $201_{Wide}$, $201_{Mid}$, and $201_{Hot}$ can be disposed in this order along a reference axis AX (or referred to as an optical axis) extending in the front-rear direction of a vehicle body.

The vehicle lighting fixture 300 can further include a laser holder 46. The laser holder 46 can be disposed to surround the reference axis AX and can hold the excitation light sources $12_{Wide}$, $12_{Mid}$, and $12_{Hot}$ with a posture tilted in such a manner that excitation light rays $Ray_{Wide}$, $Ray_{Mid}$, and $Ray_{Hot}$ are directed rearward and toward the reference axis AX.

Specifically, the excitation light sources $12_{Wide}$, $12_{Mid}$, and $12_{Hot}$ can be disposed by being fixed to the laser holder 46 in the following manner.

As illustrated in FIG. 23, the laser holder 46 can be configured to include a tubular part 48 extending in the reference axis AX, and extension parts 50U, 50D, 50L, and 50R each radially extending from the outer peripheral face at its upper, lower, left, or right part in an upper, lower, left, or right direction perpendicular to the reference axis AX. Specifically, the respective extension parts 50U, 50D, 50L, and 50R can be inclined rearward to the tip ends thereof, as illustrated in FIG. 24. Between the adjacent extension parts 50U, 50D, 50L, and 50R, there can be formed a heat dissipation part 54 (heat dissipation fin), as illustrated in FIG. 23.

As illustrated in FIG. 24, the wide-zone excitation light source $12_{Wide}$ can be fixed to the tip end of the extension part 50D with a posture tilted so that the excitation light rays $Ray_{Wide}$ is directed to a rearward and obliquely upward direction. Similarly, the middle-zone excitation light source $12_{Mid}$ can be fixed to the tip end of the extension part 50U with a posture tilted so that the excitation light rays $Ray_{Mid}$ is directed to a rearward and obliquely downward direction. Similarly, the hot-zone excitation light source $12_{Hot}$ can be fixed to the tip end of the extension part SOL with a posture tilted so that the excitation light rays $Ray_{Hot}$ is directed to a rearward and obliquely rightward direction when viewed from its front side.

The vehicle lighting fixture 300 can further include a lens holder 56 to which the projection lens assembly 20 (lenses 20A to 20D) is fixed. The lens holder 56 can be screwed at its rear end to the opening of the tubular part 48 so as to be fixed to the tubular part 48.

A condenser lens 14 can be disposed in front of each of the excitation light sources $12_{Wide}$, $12_{Mid}$, and $12_{Hot}$. The excitation light rays $Ray_{Wide}$, $Ray_{Mid}$, and $Ray_{Hot}$ can be output from the excitation light sources $12_{Wide}$, $12_{Mid}$, and $12_{Hot}$ and condensed by the respective condenser lenses 14 (for example, collimated) to be incident on the respective mirror parts 202 of the optical deflectors $201_{Wide}$, $201_{Mid}$, and $201_{Hot}$.

As illustrated in FIG. 25, the optical deflectors $201_{Wide}$, $201_{Mid}$, and $201_{Hot}$ with the above-described configuration can be disposed to surround the reference axis AX and be closer to the reference axis AX than the excitation light sources $12_{Wide}$, $12_{Mid}$, and $12_{Hot}$ so that the excitation light rays output from the excitation light sources $12_{Wide}$, $12_{Mid}$, and $12_{Hot}$ can be incident on the corresponding mirror parts 202 of the optical deflectors $201_{Wide}$, $201_{Mid}$, and $201_{Hot}$ and reflected by the same to be directed to the corresponding scanning regions $A_{Wide}$, and $A_{Hot}$, respectively.

Specifically, the optical deflectors $201_{Wide}$, $201_{Mid}$, and $201_{Hot}$ can be secured to an optical deflector holder 58 as follows.

The optical deflector holder 58 can have a square pyramid shape projected forward, and its front face can be composed of an upper face 58U, a lower face 58D, a left face 58L, and a right face 58R (not shown in the drawings), as illustrated in FIG. 25.

The wide-zone optical deflector $201_{Wide}$ (corresponding to the first optical deflector in the presently disclosed subject matter) can be secured to the lower face 58D of the square pyramid face while being tilted so that the mirror part 202 thereof is positioned in an optical path of the excitation light rays $Ray_{Wide}$ output from the wide-zone excitation light source $12_{Wide}$. Similarly thereto, the middle-zone optical deflector $201_{Mid}$ (corresponding to the second optical deflector in the presently disclosed subject matter) can be secured to the upper face 58U of the square pyramid face while being tilted so that the mirror part 202 thereof is positioned in an optical path of the excitation light rays $Ray_{Mid}$ output from the middle-zone excitation light source $12_{Mid}$. Similarly thereto, the hot-zone optical deflector $201_{Hot}$ (corresponding to the third optical deflector in the presently disclosed subject matter) can be secured to the left face 58L (when viewed from front) of the square pyramid face while being tilted so that the mirror part 202 thereof is positioned in an optical path of the excitation light rays $Ray_{Hot}$ output from the hot-zone excitation light source $12_{Hot}$.

The optical deflectors $201_{Wide}$, $201_{Mid}$, and $201_{Hot}$ each can be arranged so that the first axis X1 is contained in a vertical plane and the second axis X2 is contained in a horizontal plane. As a result, the above-described arrangement of the optical deflectors $201_{Wide}$, $201_{Mid}$, and $201_{Hot}$ can easily form (draw) a predetermined light distribution pattern (two-dimensional image corresponding to the required predetermined light distribution pattern) being wide in the horizontal direction and narrow in the vertical direction required for a vehicular headlight.

The wide-zone optical deflector $201_{Wide}$ can draw a first two-dimensional image on the wide-zone scanning region $A_{Wide}$ (corresponding to the first scanning region in the presently disclosed subject matter) with the excitation light rays $Ray_{Wide}$ two-dimensionally scanning in the horizontal and vertical directions by the mirror part 202 thereof, to thereby form a first light intensity distribution on the wide-zone scanning region $A_{Wide}$.

The middle-zone optical deflector $201_{Mid}$ can draw a second two-dimensional image on the middle-zone scanning region $A_{Mid}$ (corresponding to the second scanning region in the presently disclosed subject matter) with the excitation light rays $Ray_{Mid}$ two-dimensionally scanning in the horizontal and vertical directions by the mirror part 202 thereof in such a manner that the second two-dimensional image overlaps the first two-dimensional image in part, to thereby form a second light intensity distribution on the middle-zone scanning region $A_{Mid}$ with a higher light intensity than that of the first light intensity distribution.

As illustrated in FIG. 21, the middle-zone scanning region $A_{Mid}$ can be smaller than the wide-zone scanning region $A_{Wide}$ in size and overlap part of the wide-zone scanning region $A_{Wide}$. As a result of the overlapping, the overlapped middle-zone scanning region $A_{Mid}$ can have the relatively higher light intensity distribution.

The hot-zone optical deflector $201_{Hot}$ can draw a third two-dimensional image on the hot-zone scanning region $A_{Hot}$ (corresponding to the third scanning region in the presently disclosed subject matter) with the excitation light rays $Ray_{Hot}$ two-dimensionally scanning in the horizontal and vertical directions by the mirror part 202 thereof in such a manner that the third two-dimensional image overlaps the first and second two-dimensional images in part, to thereby form a third light intensity distribution on the hot-zone scanning region $A_{Hot}$ with a higher light intensity than that of the second light intensity distribution.

As illustrated in FIG. 21, the hot-zone scanning region $A_{Hot}$ can be smaller than the middle-zone scanning region $A_{Mid}$ in size and overlap part of the middle-zone scanning region $A_{Mid}$. As a result of the overlapping, the overlapped hot-zone scanning region $A_{Hot}$ can have the relatively higher light intensity distribution.

The shape of each of the illustrated scanning regions $A_{Wide}$, $A_{Mid}$, and $A_{Hot}$ in FIG. 21 is a rectangular outer shape, but it is not limitative. The outer shape thereof can be a circle, an oval, or other shapes.

Figure 27A:
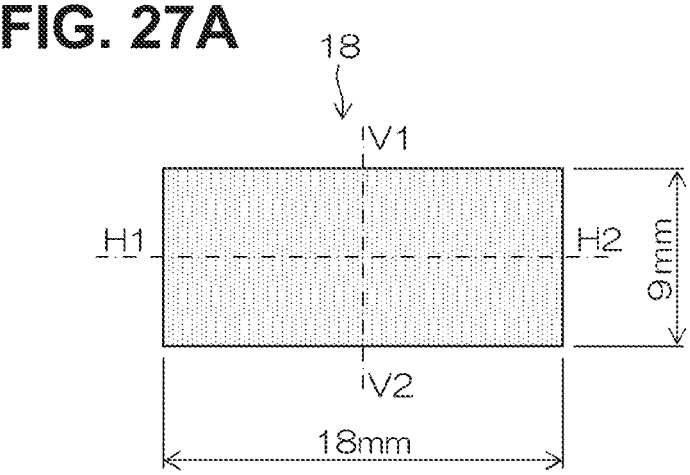
FIGS. 27A, 27B, and 27C are a front view, a top plan view, and a side view of a wavelength conversion member 18, respectively.
Figure 27C:
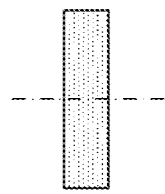
Figure 27B:
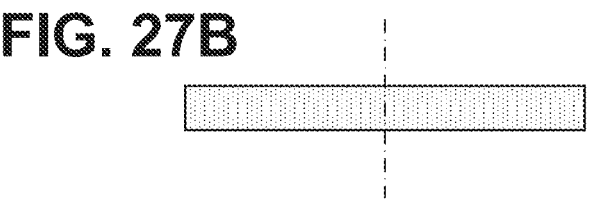

FIGS. 27A, 27B, and 27C are a front view, a top plan view, and a side view of the wavelength conversion member 18, respectively.

The illustrated wavelength conversion member 18 can be configured to be a rectangular plate with a horizontal length of 18 mm and a vertical length of 9 mm. The wavelength conversion member 18 can also be referred to as a phosphor panel.

As illustrated in FIGS. 24 and 25, the vehicle lighting fixture 300 can include a phosphor holder 52 which can close the rear end opening of the tubular part 48. The wavelength conversion member 18 can be secured to the phosphor holder 52. Specifically, the phosphor holder 52 can have an opening 52a formed therein and the wavelength conversion member 18 can be secured to the periphery of the opening 52a of the phosphor holder 52 at its outer periphery of the rear surface 18a thereof. The wavelength conversion member 18 covers the opening 52a.

Figure 30A:
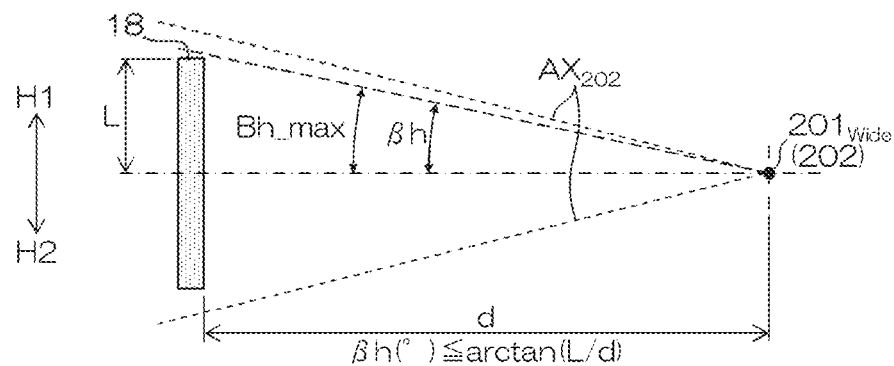
FIG. 30A is a diagram for illustrating the "L" and "βh_max" illustrated in FIG. 29A.
Figure 30B:
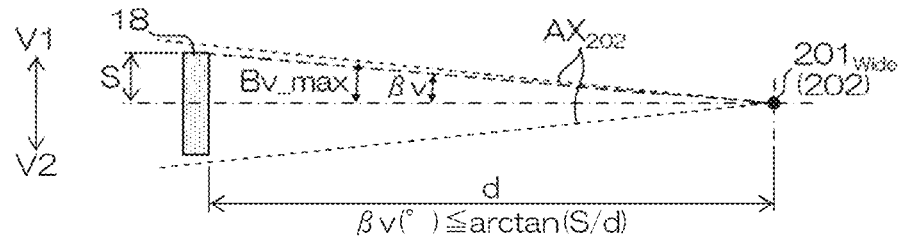
FIG. 30B is a diagram for illustrating the "S," "βv_max," and L illustrated in FIG. 29B.

The wavelength conversion member 18 can be disposed to be confined between the center line $AX_{202}$ of the mirror part 202 of the wide-zone optical deflector $201_{Wide}$ at the maximum deflection angle $\beta h\_max$ (see FIG. 30A) and the center line $AX_{202}$ of the mirror part 202 of the wide-zone optical deflector $201_{Wide}$ at the maximum deflection angle $\beta v\_max$ (see FIG. 30B). Specifically, the wavelength conversion member 18 should be disposed to satisfy the following two formulas 1 and 2:

$$\tan(\beta h\_max) \geq L/d \quad \text{(Formula 1), and}$$

$$\tan(\beta v\_max) \geq S/d \quad \text{(Formula 2)},$$

wherein L is ½ of a horizontal length of the wavelength conversion member 18, S is ½ of a vertical length of the wavelength conversion member 18, and d is the distance from the wavelength conversion member 18 and the optical deflector 201 (mirror part 202).

A description will next be given of how to adjust the sizes (horizontal length and vertical length) of the scanning regions $A_{Wide}$, $A_{Mid}$, and $A_{Hot}$.

The sizes (horizontal length and vertical length) of the scanning regions $A_{Wide}$, $A_{Mid}$, and $A_{Hot}$ can be adjusted by changing the swinging ranges of the mirror parts 202 of the optical deflectors $201_{Wide}$, $201_{Mid}$, and $201_{Hot}$ around the first axis X1 and the swinging ranges of the mirror parts 202 of the optical deflectors $201_{Wide}$, $201_{Mid}$, and $201_{Hot}$ around the second axis X2. This can be done by changing the first and second AC voltages to be applied to the first piezoelectric actuators 203 and 204 and the third AC voltage to be applied to the second piezoelectric actuators 205 and 206 when the distances between each of the optical deflectors $201_{Wide}$, $201_{Mid}$, and $201_{Hot}$ (the center of the mirror part 202) and the wavelength conversion member 18 are the same (or substantially the same) as each other. (See FIGS. 23 and 24.) The reasons therefore are as follows.

Figure 28A:
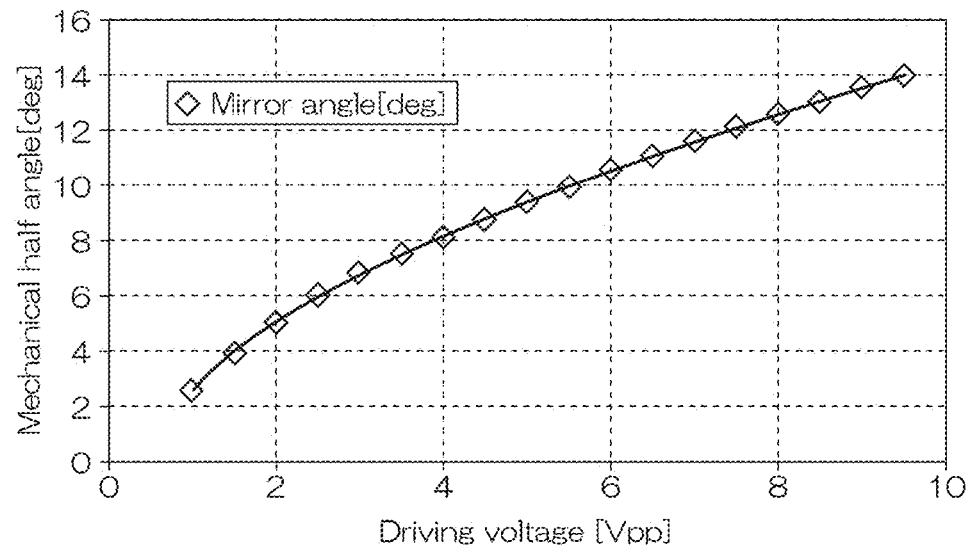
FIG. 28A is a graph showing the relationship between a mechanical swing angle (half angle) of the mirror part 202 around the first axis X1 and the drive voltage to be applied to the first piezoelectric actuator 203 and 204.
Figure 28B:
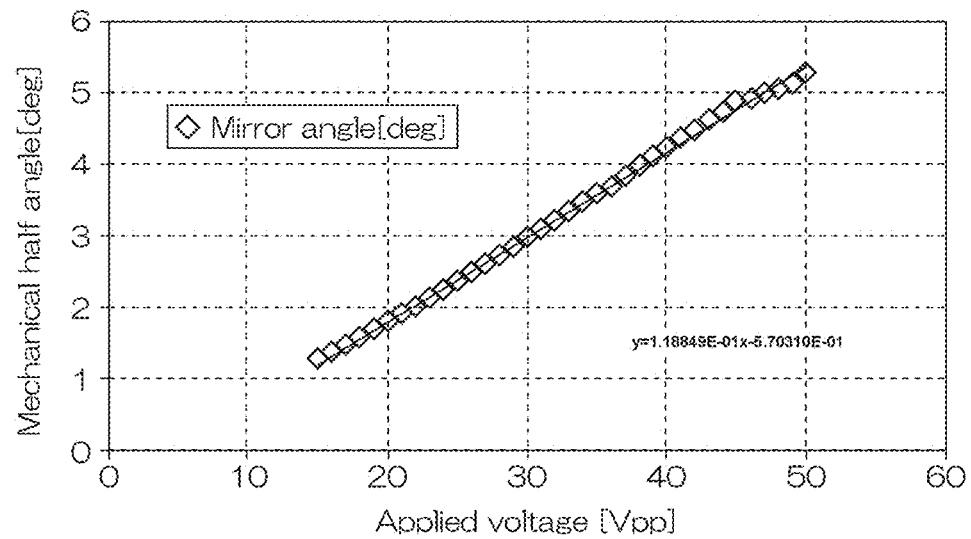
FIG. 28B is a graph showing the relationship between a mechanical swing angle (half angle) of the mirror part 202 around the second axis X2 and the drive voltage to be applied to the second piezoelectric actuators 205 and 206.

Specifically, as illustrated in FIG. 28A, in the optical deflectors $201_{Wide}$, $201_{Mid}$, and $201_{Hot}$, the mechanical swing angle (half angle, see the vertical axis) of the mirror part 202 around the first axis X1 is increased as the drive voltage (see the horizontal axis) to be applied to the first piezoelectric actuators 203 and 204 is increased. Furthermore, as illustrated in FIG. 28B, the mechanical swing angle (half angle, see the vertical axis) of the mirror part 202 around the second axis X2 is also increased as the drive voltage (see the horizontal axis) to be applied to the second piezoelectric actuators 205 and 206 is increased.

Thus, when the distances between each of the optical deflectors $201_{Wide}$, $201_{Mid}$, and $201_{Hot}$ (the center of the mirror part 202) and the wavelength conversion member 18 are the same (or substantially the same) as each other (see FIGS. 24 and 25), the sizes (horizontal length and vertical length) of the scanning regions $A_{Wide}$, $A_{Mid}$, and $A_{Hot}$ can be adjusted by changing the first and second AC voltages to be applied to the first piezoelectric actuators 203 and 204 and the third AC voltage to be applied to the second piezoelectric actuators 205 and 206, and thereby changing the swinging ranges of the mirror parts 202 of the respective optical deflectors $201_{Wide}$, $201_{Mid}$, and $201_{Hot}$ around the first axis X1 and the swinging ranges of the mirror parts 202 of the respective optical deflectors $201_{Wide}$, $201_{Mid}$, and $201_{Hot}$ around the second axis X2.

Next, a description will be given of a concrete adjustment example. In the following description, it is assumed that the distances between each of the optical deflectors $201_{Wide}$, $201_{Mid}$, and $201_{Hot}$ (the center of the mirror part 202) and the wavelength conversion member 18 are the same (or substantially the same) as each other and d=24.0 mm as illustrated in FIGS. 30A and 30B and the focal distance of the projection lens assembly 20 is 32 mm.

As shown in the row "WIDE" of the table of FIG. 29A, when 5.41 $V_{pp}$ as a drive voltage is applied to the first piezoelectric actuators 203 and 204 of the wide-zone optical deflector $201_{Wide}$, the mechanical swing angle (half angle: $\gamma h\_max$) around the first axis X1 and the maximum deflection angle (half angle: $\beta h\_max$) are ±9.8 degrees and ±19.7 degrees, respectively. In this case, the size (horizontal length) of the wide-zone scanning region $A_{Wide}$ is adjusted to be ±8.57 mm.

The "L" and "$\beta h\_max$" described in FIG. 29A represent the distance and the angle shown in FIG. 30A. The "mirror mechanical half angle" (also referred to as "mechanical half angle") described in FIG. 29A means the angle at which the mirror part 202 actually moves, and represents an angle of the mirror part 202 with respect to the normal direction with the sign "+" or "−." The "mirror deflection angle" (also referred to as "optical half angle") described in FIG. 29A means the angle formed between the excitation light (light rays) reflected by the mirror part and the normal direction of the mirror part 202, and also represents an angle of the mirror part 202 with respect to the normal direction with the sign "+" or "−." According to the Fresnel's law, the optical half angle is twice the mechanical half angle.

As shown in the row "WIDE" of the table of FIG. 29B, when 41.2 $V_{pp}$ as a drive voltage is applied to the second piezoelectric actuators 205 and 206 of the wide-zone optical deflector 201$_{Wide}$, the mechanical swing angle (half angle: γh_max) around the first axis X1 and the maximum deflection angle (half angle: βh_max) are ±4.3 degrees and ±8.6 degrees, respectively. In this case, the size (vertical length) of the wide-zone scanning region A$_{Wide}$ is adjusted to be ±3.65 mm.

The "S" and "βv_max" described in FIG. 29B represent the distance and the angle shown in FIG. 30B, respectively.

As described above, by applying 5.41 V$_{pp}$ as a drive voltage (the first and second AC voltages) to the first piezoelectric actuators 203 and 204 of the wide-zone optical deflector 201$_{Wide}$, and also by applying 41.2 V$_{pp}$ as a drive voltage (the third AC voltage) to the second piezoelectric actuators 205 and 206 of the wide-zone optical deflector 201$_{Wide}$, thereby changing the swinging range of the mirror part 202 of the wide-zone optical deflector 201$_{Wide}$ around the first axis X1 and the swinging range of the mirror part 202 of the wide-zone optical deflector 201$_{Wide}$ around the second axis X2, the size (horizontal length) of the wide-zone scanning region A$_{Wide}$ can be adjusted to be ±8.57 mm and the size (vertical length) of the wide-zone scanning region A$_{Wide}$ can be adjusted to be ±3.65 mm to form a rectangular shape with the horizontal length of ±8.57 mm and the vertical length of ±3.65 mm.

The light intensity distribution formed in the wide-zone scanning region A$_{Wide}$ with the above-described dimensions can be projected forward through the projection lens assembly 20 to thereby form the wide-zone light distribution pattern P$_{Wide}$ with a rectangle of the width of ±15 degrees in the horizontal direction and the width of ±6.5 degrees in the vertical direction on the virtual vertical screen (see FIG. 26).

As shown in the row "MID" of the table of FIG. 29A, when 2.31 V$_{pp}$ as a drive voltage is applied to the first piezoelectric actuators 203 and 204 of the middle-zone optical deflector 201$_{Mid}$, the mechanical swing angle (half angle: γh_max) around the first axis X1 and the maximum deflection angle (half angle: βh_max) are ±5.3 degrees and ±11.3 degrees, respectively. In this case, the size (horizontal length) of the middle-zone scanning region A$_{Mid}$ is adjusted to be ±4.78 mm.

As shown in the row "MID" of the table of FIG. 29B, when 24.4 V$_{pp}$ as a drive voltage is applied to the second piezoelectric actuators 205 and 206 of the middle-zone optical deflector 201$_{Mid}$, the mechanical swing angle (half angle: γh_max) around the first axis X1 and the maximum deflection angle (half angle: βh_max) are ±2.3 degrees and ±4.7 degrees, respectively. In this case, the size (vertical length) of the middle-zone scanning region A$_{Mid}$ is adjusted to be ±1.96 mm.

As described above, by applying 2.31 V$_{pp}$ as a drive voltage (the first and second AC voltages) to the first piezoelectric actuators 203 and 204 of the middle-zone optical deflector 201$_{Mid}$, and by applying 24.4 V$_{pp}$ as a drive voltage (the third AC voltage) to the second piezoelectric actuators 205 and 206 of the middle-zone optical deflector 201$_{Mid}$, thereby changing the swinging range of the mirror part 202 of the middle-zone optical deflector 201$_{Mid}$ around the first axis X1 and the swinging range of the mirror part 202 of the middle-zone optical deflector 201$_{Mid}$ around the second axis X2, the size (horizontal length) of the middle-zone scanning region A$_{Mid}$ can be adjusted to be ±4.78 mm and the size (vertical length) of the middle-zone scanning region A$_{Mid}$ can be adjusted to be ±1.96 mm to form a rectangular shape with the horizontal length of ±4.78 mm and the vertical length of ±1.96 mm.

The light intensity distribution formed in the middle-zone scanning region A$_{Mid}$ with the above-described dimensions can be projected forward through the projection lens assembly 20 to thereby form the middle-zone light distribution pattern P$_{Mid}$ (see FIG. 26) with a rectangle of the width of ±8.5 degrees in the horizontal direction and the width of ±3.5 degrees in the vertical direction on the virtual vertical screen.

As shown in the row "HOT" of the table of FIG. 29A, when 0.93 V$_{pp}$ as a drive voltage is applied to the first piezoelectric actuators 203 and 204 of the hot-zone optical deflector 201$_{Hot}$, the mechanical swing angle (half angle: γh_max) around the first axis X1 and the maximum deflection angle (half angle: βh_max) are ±2.3 degrees and ±4.7 degrees, respectively. In this case, the size (horizontal length) of the hot-zone scanning region A$_{Hot}$ is adjusted to be ±1.96 mm.

As shown in the row "HOT" of the table of FIG. 29B, when 13.3 V$_{pp}$ as a drive voltage is applied to the second piezoelectric actuators 205 and 206 of the hot-zone optical deflector 201$_{Hot}$, the mechanical swing angle (half angle: γh_max) around the first axis X1 and the maximum deflection angle (half angle: βh_max) are ±1.0 degrees and ±2.0 degrees, respectively. In this case, the size (vertical length) of the hot-zone scanning region A$_{Hot}$ is adjusted to be ±0.84 mm.

As described above, by applying 0.93 V$_{pp}$ as a drive voltage (the first and second AC voltages) to the first piezoelectric actuators 203 and 204 of the hot-zone optical deflector 201$_{Hot}$, and also by applying 13.3 V$_{pp}$ as a drive voltage (the third AC voltage) to the second piezoelectric actuators 205 and 206 of the hot-zone optical deflector 201$_{Hot}$, thereby changing the swinging range of the mirror part 202 of the hot-zone optical deflector 201$_{Hot}$ around the first axis X1 and the swinging range of the mirror part 202 of the hot-zone optical deflector 201$_{Hot}$ around the second axis X2, the size (horizontal length) of the hot-zone scanning region A$_{Hot}$ can be adjusted to be ±1.96 mm and the size (vertical length) of the hot-zone scanning region A$_{Hot}$ can be adjusted to be ±0.84 mm to form a rectangular shape with the horizontal length of ±1.96 mm and the vertical length of ±0.84 mm.

The light intensity distribution formed in the hot-zone scanning region A$_{Hot}$ with the above-described dimensions can be projected forward through the projection lens assembly 20 to thereby form the hot-zone light distribution pattern P$_{Hot}$ with a rectangle of the width of ±3.5 degrees in the horizontal direction and the width of ±1.5 degrees in the vertical direction on the virtual vertical screen (see FIG. 26).

Thus, when the distances between each of the optical deflectors 201$_{Wide}$, 201$_{Mid}$, and 201$_{Hot}$ (the center of the mirror part 202) and the wavelength conversion member 18 are the same (or substantially the same) as each other (see FIGS. 24 and 25), the sizes (horizontal length and vertical length) of the scanning regions A$_{Wide}$, A$_{Mid}$, and A$_{Hot}$ can be adjusted by changing the first and second AC voltages to be applied to the first piezoelectric actuators 203 and 204 and the third AC voltage to be applied to the second piezoelectric actuators 205 and 206, and thereby changing the swinging ranges of the mirror parts 202 of the optical deflectors 201$_{Wide}$, 201$_{Mid}$, and 201$_{Hot}$ around the first axis X1 and the swinging ranges of the mirror parts 202 of the optical deflectors 201$_{Wide}$, 201$_{Mid}$, and 201$_{Hot}$ around the second axis X2.

A description will next be given of another technique of adjusting the sizes (horizontal length and vertical length) of the scanning regions A$_{Wide}$, A$_{Mid}$, and A$_{Hot}$.

Figure 31:
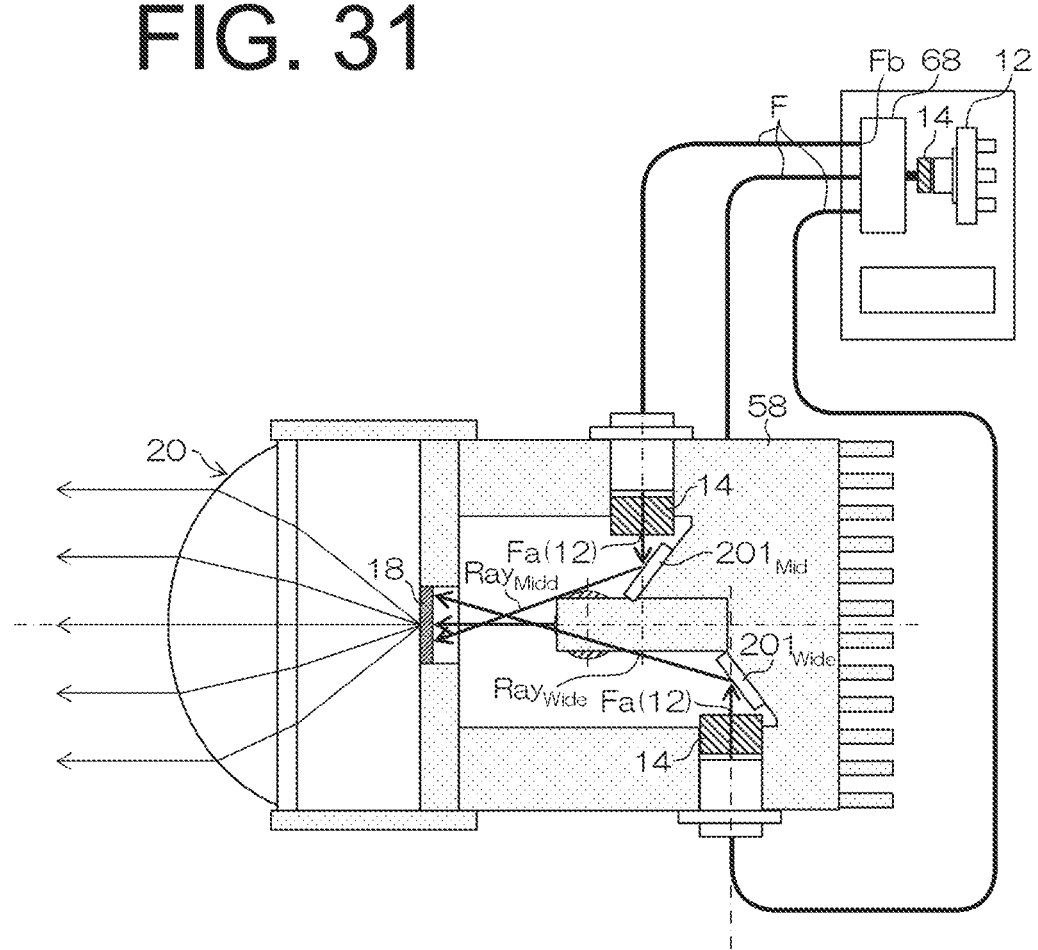
FIG. 31 is a diagram for illustrating an example in which the distances between each of the optical deflectors $201_{Wide}$, $201_{Mid}$, and $201_{Hot}$ (the center of the mirror part 202) and the wavelength conversion member 18 are changed.

When the drive voltages to be applied to the respective optical deflectors $201_{Wide}$, $201_{Mid}$, and $201_{Hot}$ are the same (or substantially the same) as each other, the sizes (horizontal length and vertical length) of the scanning regions $A_{Wide}$, $A_{Mid}$, and $A_{Hot}$ can be adjusted by changing the distances between each of the optical deflectors $201_{Wide}$, $201_{Mid}$, and $201_{Hot}$ (the center of the mirror part 202) and the wavelength conversion member 18 (for example, see FIG. 31).

Next, a description will be given of a concrete adjustment example. In the following description, it is assumed that the drive voltages to be applied to the respective optical deflectors $201_{Wide}$, $201_{Mid}$, and $201_{Hot}$ are the same as each other and the focal distance of the projection lens assembly 20 is 32 mm.

For example, as shown in the row "WIDE" of the table of FIG. 32A, when the distance between the wide-zone optical deflector $201_{Wide}$ (the center of the mirror part 202) and the wavelength conversion member 18 is set to 24.0 mm and 5.41 $V_{pp}$ as a drive voltage is applied to the first piezoelectric actuators 203 and 204 of the wide-zone optical deflector $201_{Wide}$, the mechanical swing angle (half angle: γh_max) around the first axis X1 and the maximum deflection angle (half angle: βh_max) are ±9.8 degrees and ±19.7 degrees, respectively. In this case, the size (horizontal length) of the wide-zone scanning region $A_{Wide}$ is adjusted to be ±8.57 mm.

The "L" and "d," and "βh_max" described in FIG. 32A represent the distances and the angle shown in FIG. 30A, respectively.

Then, as shown in the row "WIDE" of the table of FIG. 32B, when the distance between the wide-zone optical deflector $201_{Wide}$ (the center of the mirror part 202) and the wavelength conversion member 18 is set to 24.0 mm and 41.2 $V_{pp}$ as a drive voltage is applied to the second piezoelectric actuators 205 and 206 of the wide-zone optical deflector $201_{Wide}$, the mechanical swing angle (half angle: γv_max) around the first axis X1 and the maximum deflection angle (half angle: βv_max) are ±4.3 degrees and ±8.6 degrees, respectively. In this case, the size (vertical length) of the wide-zone scanning region $A_{Wide}$ is adjusted to be ±3.65 mm.

The "S" and "d," and "βv_max" described in FIG. 32B represent the distances and the angle shown in FIG. 30B, respectively.

As described above, by setting the distance between the wide-zone optical deflector $201_{Wide}$ (the center of the mirror part 202) and the wavelength conversion member 18 to 24.0 mm, the size (horizontal length) of the wide-zone scanning region $A_{Wide}$ can be adjusted to be ±8.57 mm and the size (vertical length) of the wide-zone scanning region $A_{Wide}$ can be adjusted to be ±3.65 mm to form a rectangular shape with the horizontal length of ±8.57 mm and the vertical length of ±3.65 mm.

The light intensity distribution formed in the wide-zone scanning region $A_{Wide}$ with the above-described dimensions can be projected forward through the projection lens assembly 20 to thereby form the wide-zone light distribution pattern $P_{Wide}$ with a rectangle of the width of ±15 degrees in the horizontal direction and the width of ±6.5 degrees in the vertical direction on the virtual vertical screen (see FIG. 26).

Next, as shown in the row "MID" of the table of FIG. 32A, when the distance between the middle-zone optical deflector $201_{Mid}$ (the center of the mirror part 202) and the wavelength conversion member 18 is set to 13.4 mm and 5.41 $V_{pp}$ as a drive voltage is applied to the first piezoelectric actuators 203 and 204 of the middle-zone optical deflector $201_{Mid}$ as in the wide-zone optical deflector $201_{Wide}$, the mechanical swing angle (half angle: γh_max) around the first axis X1 and the maximum deflection angle (half angle: βh_max) are ±9.8 degrees and ±19.7 degrees, respectively, as in the wide-zone optical deflector $201_{Wide}$. However, the distance (13.4 mm) between the middle-zone optical deflector $201_{Mid}$ (the center of the mirror part 202) and the wavelength conversion member 18 is set to be shorter than the distance (24.0 mm) between the wide-zone optical deflector $201_{Wide}$ (the center of the mirror part 202) and the wavelength conversion member 18. Thus, the size (horizontal length) of the middle-zone scanning region $A_{Mid}$ is adjusted to be ±4.78 mm.

Then, as shown in the row "MID" of the table of FIG. 32B, when the distance between the middle-zone optical deflector $201_{Mid}$ (the center of the mirror part 202) and the wavelength conversion member 18 is set to 13.4 mm and 41.2 $V_{pp}$ as a drive voltage is applied to the second piezoelectric actuators 205 and 206 of the middle-zone optical deflector $201_{Mid}$ as in the wide-zone optical deflector $201_{Wide}$, the mechanical swing angle (half angle: γv_max) around the first axis X1 and the maximum deflection angle (half angle: βv_max) are ±4.3 degrees and ±8.6 degrees, respectively, as in the wide-zone optical deflector $201_{Wide}$. However, the distance (13.4 mm) between the middle-zone optical deflector $201_{Mid}$ (the center of the mirror part 202) and the wavelength conversion member 18 is set to be shorter than the distance (24.0 mm) between the wide-zone optical deflector $201_{Wide}$ (the center of the mirror part 202) and the wavelength conversion member 18. Thus, the size (vertical length) of the middle-zone scanning region $A_{Mid}$ is adjusted to be ±1.96 mm.

As described above, by setting the distance between the middle-zone optical deflector $201_{Mid}$ (the center of the mirror part 202) and the wavelength conversion member 18 to 13.4 mm, the size (horizontal length) of the middle-zone scanning region $A_{Mid}$ can be adjusted to be ±4.78 mm and the size (vertical length) of the middle-zone scanning region $A_{Mid}$ can be adjusted to be ±1.96 mm to form a rectangular shape with the horizontal length of ±4.78 mm and the vertical length of ±1.96 mm.

The light intensity distribution formed in the middle-zone scanning region $A_{Mid}$ with the above-described dimensions can be projected forward through the projection lens assembly 20 to thereby form the middle-zone light distribution pattern $P_{Mid}$ with a rectangle of the width of ±8.5 degrees in the horizontal direction and the width of ±3.6 degrees in the vertical direction on the virtual vertical screen (see FIG. 26).

Next, as shown in the row "HOT" of the table of FIG. 32A, when the distance between the hot-zone optical deflector $201_{Hot}$ (the center of the mirror part 202) and the wavelength conversion member 18 is set to 5.5 mm and 5.41 $V_{pp}$ as a drive voltage is applied to the first piezoelectric actuators 203 and 204 of the hot-zone optical deflector $201_{Hot}$ as in the wide-zone optical deflector $201_{Wide}$, the mechanical swing angle (half angle: γh_max) around the first axis X1 and the maximum deflection angle (half angle: βh_max) are ±9.8 degrees and ±19.7 degrees, respectively, as in the wide-zone optical deflector $201_{Wide}$. However, the distance (5.5 mm) between the hot-zone optical deflector $201_{Hot}$ (the center of the mirror part 202) and the wavelength conversion member 18 is set to be shorter than the distance (13.4 mm) between the middle-zone optical deflector $201_{Mid}$ (the center of the mirror part 202) and the wavelength conversion member 18. Thus, the size (horizontal length) of the hot-zone scanning region $A_{Hot}$ is adjusted to be ±1.96 mm.

Then, as shown in the row "HOT" of the table of FIG. 32B, when the distance between the hot-zone optical deflector $201_{Hot}$ (the center of the mirror part 202) and the wavelength conversion member 18 is set to 5.5 mm and 41.2 $V_{pp}$ as a drive voltage is applied to the second piezoelectric actuators 205 and 206 of the hot-zone optical deflector $201_{Hot}$ as in the wide-zone optical deflector $201_{Wide}$, the mechanical swing angle (half angle: γv_max) around the first axis X1 and the maximum deflection angle (half angle: βv_max) are ±4.3 degrees and ±8.6 degrees, respectively, as in the wide-zone optical deflector $201_{Wide}$. However, the distance (5.5 mm) between the hot-zone optical deflector $201_{Hot}$ (the center of the mirror part 202) and the wavelength conversion member 18 is set to be shorter than the distance (13.4 mm) between the middle-zone optical deflector $201_{Mid}$ (the center of the mirror part 202) and the wavelength conversion member 18. Thus, the size (vertical length) of the hot-zone scanning region $A_{Hot}$ is adjusted to be ±0.84 mm.

As described above, by setting the distance between the hot-zone optical deflector $201_{Hot}$ (the center of the mirror part 202) and the wavelength conversion member 18 to 5.5 mm, the size (horizontal length) of the hot-zone scanning region $A_{Hot}$ can be adjusted to be ±1.96 mm and the size (vertical length) of the hot-zone scanning region $A_{Hot}$ can be adjusted to be ±0.84 mm to form a rectangular shape with the horizontal length of ±1.96 mm and the vertical length of ±0.84 mm.

The light intensity distribution formed in the hot-zone scanning region $A_{Hot}$ with the above-described dimensions can be projected forward through the projection lens assembly 20 to thereby form the hot-zone light distribution pattern $P_{Hot}$ with a rectangle of the width of ±3.5 degrees in the horizontal direction and the width of ±1.5 degrees in the vertical direction on the virtual vertical screen (see FIG. 26).

As described above, when the drive voltages to be applied to the respective optical deflectors $201_{Wide}$, $201_{Mid}$, and $201_{Hot}$ are the same (or substantially the same) as each other, the sizes (horizontal length and vertical length) of the scanning regions $A_{Wide}$, $A_{Mid}$, and $A_{Hot}$ can be adjusted by changing the distances between each of the optical deflectors $201_{Wide}$, $201_{Mid}$, and $201_{Hot}$ (the center of the mirror part 202) and the wavelength conversion member 18.

When the first and second AC voltages to be applied to the respective optical deflectors $201_{Wide}$, $201_{Mid}$, and $201_{Hot}$ are feedback-controlled, the drive voltages applied to the respective optical deflectors $201_{Wide}$, $201_{Mid}$, and $201_{Hot}$ are not completely the same. Even in this case, the sizes (horizontal length and vertical length) of the scanning regions $A_{Wide}$, $A_{Mid}$, and $A_{Hot}$ can be adjusted by changing the distance between each of the optical deflectors $201_{Wide}$, $201_{Mid}$, and $201_{Hot}$ (the center of each of the mirror parts 202) and the wavelength conversion member 18.

A description will next be given of still another technique of adjusting the sizes (horizontal length and vertical length) of the scanning regions $A_{Wide}$, $A_{Mid}$, and $A_{Hot}$.

Figure 33:
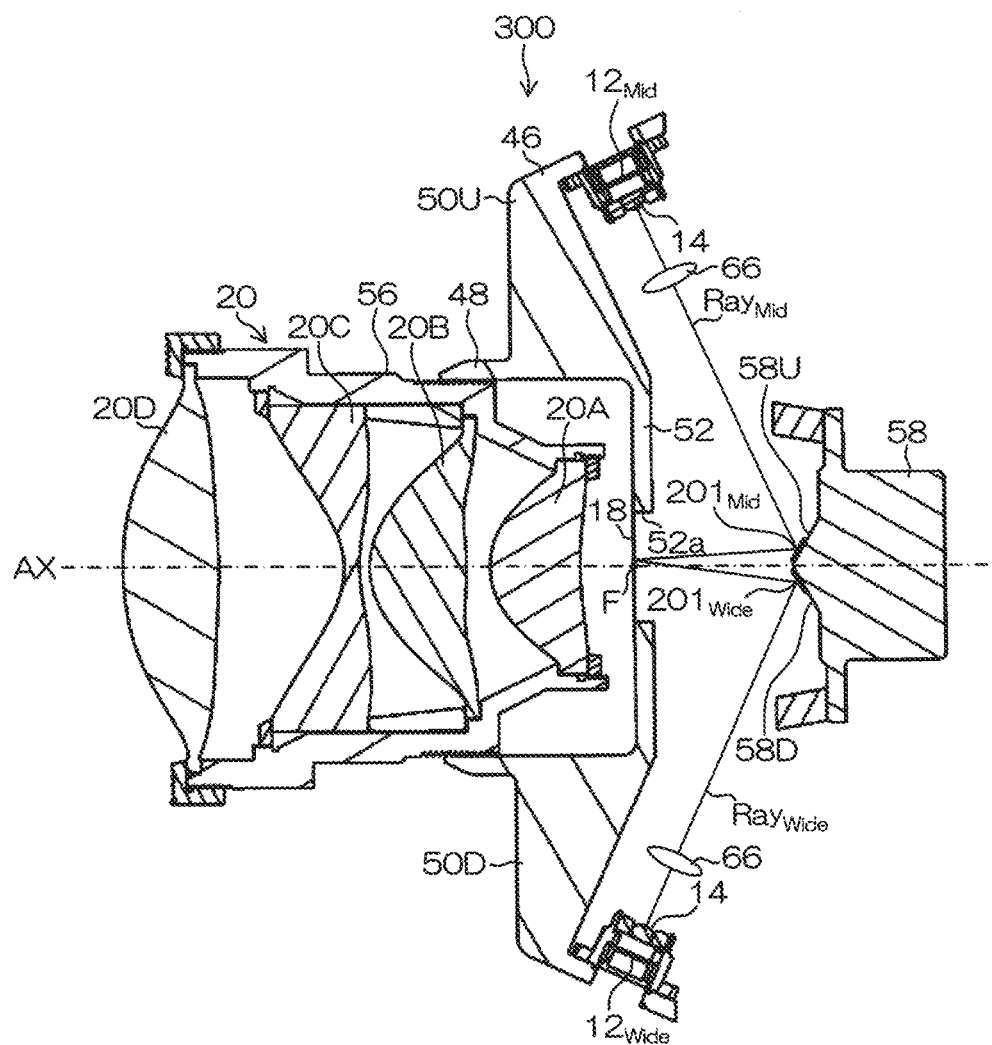
FIG. 33 is a vertical cross-sectional view of a variation of the vehicle lighting fixture 300.

It is conceivable that the sizes (horizontal length and vertical length) of the scanning regions $A_{Wide}$, $A_{Mid}$, and $A_{Hot}$ can be adjusted by disposing a lens 66 between each of the excitation light sources $12_{Wide}$, $12_{Mid}$, and $12_{Hot}$ and each of the optical deflectors $201_{Wide}$, $201_{Mid}$, and $201_{Hot}$ (between each of the optical deflectors $201_{Wide}$, $201_{Mid}$, and $201_{Hot}$ and the wavelength conversion member 18), as illustrated in FIG. 33. The lens 66 may be a lens having a different focal distance.

With the vehicle lighting fixture having the above-described configuration in the present exemplary embodiment, which utilizes a plurality of optical deflectors configured to scan with excitation light in a two-dimensional manner, it is possible to miniaturize its size and reduce the parts number, which has been a cause for cost increase. This is because the single wavelength conversion member 18 and the single optical system (projection lens assembly 20) are used correspondingly to the plurality of optical deflectors $201_{Wide}$, $201_{Mid}$, and $201_{Hot}$ as compared with the conventional case wherein a vehicle lighting fixture uses a plurality of wavelength conversion members (phosphor parts) and a plurality of optical systems (projection lenses).

With the vehicle lighting fixture having the above-described configuration in the present exemplary embodiment, which utilizes a plurality of optical deflectors configured to scan with excitation light in a two-dimensional manner, as illustrated in FIG. 26, a predetermined light distribution pattern P (for example, high-beam light distribution pattern) excellent in far-distance visibility and sense of light distribution. The predetermined light distribution pattern P of FIG. 26 can be configured such that the light intensity in part, for example, at the center ($P_{Hot}$), is relatively high and the light intensity is gradually lowered from that part, or the center, to the periphery ($P_{Hot} \rightarrow P_{Mid} \rightarrow P_{Wide}$).

This is because of the following reason. Specifically, as illustrated in FIG. 21, the middle-zone scanning region $A_{Mid}$ can be smaller than the wide-zone scanning region $A_{Wide}$ in size and overlap part of the wide-zone scanning region $A_{Wide}$, and the hot-zone scanning region $A_{Hot}$ can be smaller than the middle-zone scanning region $A_{Mid}$ in size and overlap part of the middle-zone scanning region $A_{Mid}$. As a result, the light intensity of the first light intensity distribution formed in the wide-zone scanning region $A_{Wide}$, that of the second light intensity distribution formed in the middle-zone scanning region $A_{Mid}$, and that of the third light intensity distribution formed in the hot-zone scanning region $A_{Hot}$ are increased more in this order while the respective sizes of the light intensity distributions are decreased more in this order. Then, the predetermined light distribution pattern P as illustrated in FIG. 26 can be formed by projecting the first, second, and third light intensity distributions respectively formed in the wide-zone scanning region $A_{Wide}$, the middle-zone scanning region $A_{Mid}$, and the hot-zone scanning region $A_{Hot}$. Thus, the resulting predetermined light distribution pattern P can be excellent in far-distance visibility and sense of light distribution.

Furthermore, according to the present exemplary embodiment, the vehicle lighting fixture 300 (or the lighting unit) can be made thin in the reference axis AX direction as compared with a vehicle lighting fixture 400 (or the lighting unit) to be described later, though the size thereof may be large in the vertical and horizontal direction.

Next, a description will be given of another vehicle lighting fixture using three optical deflectors 201 of one-dimensional nonresonance/one-dimensional resonance type (2-D optical scanner (fast resonant and slow static combination)) as a second exemplary embodiment. Note that the type of the optical deflector 201 is not limited to this, but may adopt any of the previously described various optical deflectors as exemplified in the above-described reference example.

Figure 34:
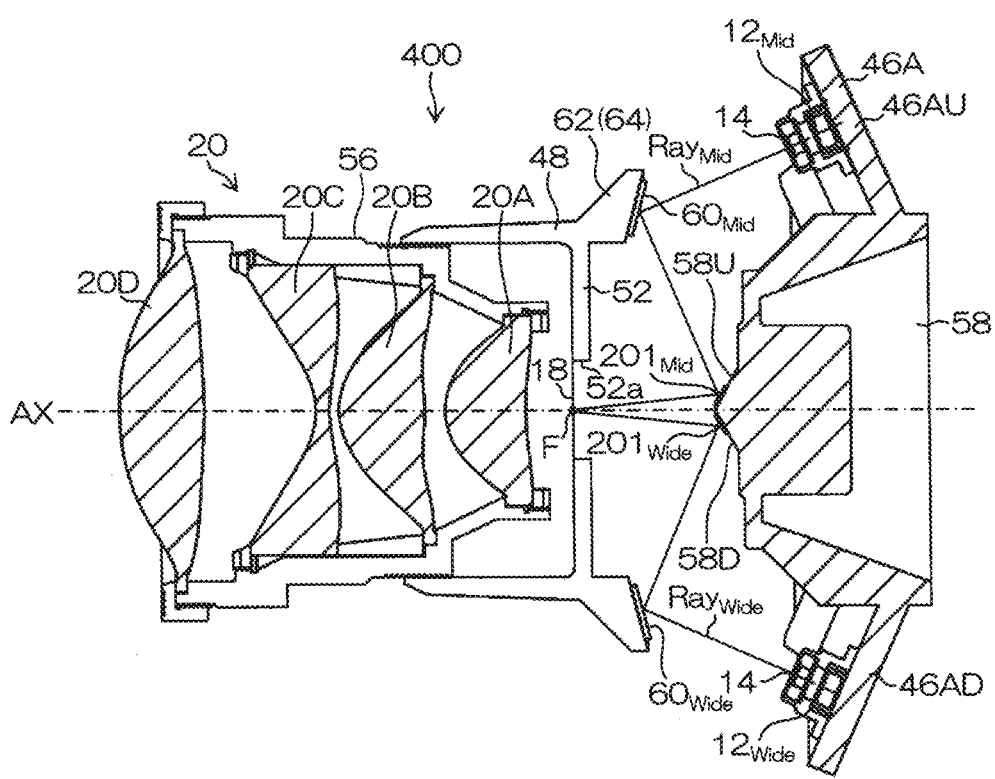
FIG. 34 is a vertical cross-sectional view of a vehicle lighting fixture 400 according to a second exemplary embodiment made in accordance with the principles of the presently disclosed subject matter.
Figure 35:
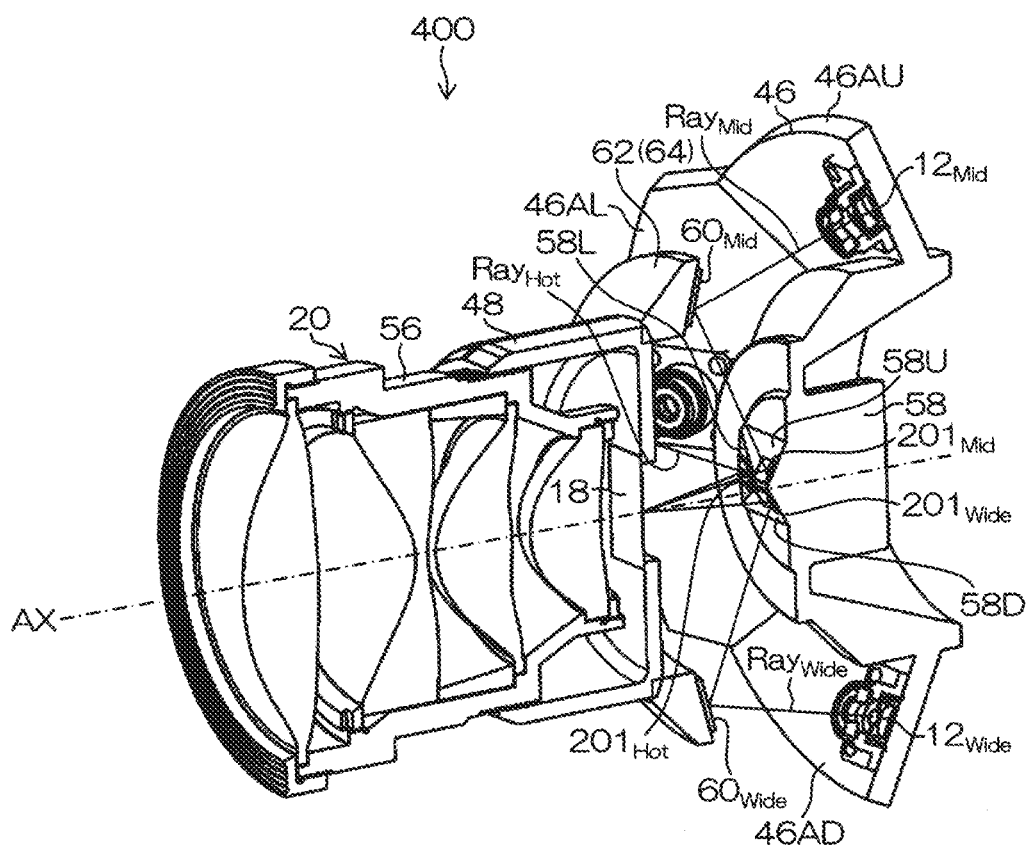
FIG. 35 is a perspective view of a cross section of the vehicle lighting fixture 400 of FIG. 34.

FIG. 34 is a vertical cross-sectional view of a vehicle lighting fixture 400 according to the second exemplary embodiment made in accordance with the principles of the presently disclosed subject matter, and FIG. 35 is a perspective view of a cross section of the vehicle lighting fixture 400 of FIG. 34.

The vehicle lighting fixture 400 of this exemplary embodiment can be configured to form a predetermined light distribution pattern P (for example, high-beam light distribution pattern), as illustrated in FIG. 26, which can be excellent in far-distance visibility and sense of light distribution and be configured such that the light intensity in part, for example, at the center ($P_{Hot}$), is relatively high and the light intensity is gradually lowered from that part, or the center, to the periphery ($P_{Hot} \rightarrow P_{Mid} \rightarrow P_{Wide}$).

Next, the vehicle lighting fixture 400 of this exemplary embodiment will be compared with the vehicle lighting fixture 300 of the first exemplary embodiment. In the first exemplary embodiment, as illustrated in FIGS. 24 and 25, the vehicle lighting fixture 300 can be configured such that the laser light rays as the excitation light rays emitted from the respective excitation light sources $12_{Wide}$, $12_{Mid}$, and $12_{Hot}$ can be directly incident on the corresponding optical deflectors $201_{Wide}$, $201_{Mid}$, and $201_{Hot}$, respectively. The vehicle lighting fixture 400 of the present exemplary embodiment is different from the previous one in that, as illustrated in FIGS. 34 and 35, once the laser light rays as the excitation light rays emitted from the respective excitation light sources $12_{Wide}$, $12_{Mid}$, and $12_{Hot}$ can be reflected by corresponding reflection surfaces $60_{Wide}$, $60_{Mid}$, and $60_{Hot}$, respectively and then incident on the corresponding optical deflectors $201_{Wide}$, $201_{Mid}$, and $201_{Hot}$, respectively.

The configuration of the vehicle lighting fixture 400 of the present exemplary embodiment can have the same configuration as that of the vehicle lighting fixture 300 of the first exemplary embodiment except for the above different point. Hereinbelow, a description will be give of the different point of the present exemplary embodiment from the first exemplary embodiment, and the same or similar components of the present exemplary embodiment as those in the first exemplary embodiment will be denoted by the same reference numerals and a description thereof will be omitted as appropriate.

The vehicle lighting fixture 400 can be configured, as illustrated in FIGS. 34 and 35, as a vehicle headlamp. The vehicle lighting fixture 400 can include three excitation light sources $12_{Wide}$, $12_{Mid}$, and $12_{Hot}$; three reflection surfaces $60_{Wide}$, $60_{Mid}$, and $60_{Hot}$ provided corresponding to the three excitation light sources $12_{Wide}$, $12_{Mid}$, and $12_{Hot}$; three optical deflectors $201_{Wide}$, $201_{Mid}$, and $201_{Hot}$ each including a mirror part 202, a wavelength conversion member 18, a projection lens assembly 20, etc. The three optical deflectors $201_{Wide}$, $201_{Mid}$, and $201_{Hot}$ can be provided corresponding to the three reflection surfaces $60_{Wide}$, $60_{Mid}$, and $60_{Hot}$. The wavelength conversion member 18 can include three scanning regions $A_{Wide}$, $A_{Mid}$, and $A_{Hot}$ (see FIG. 21) provided corresponding to the three optical deflectors $201_{Wide}$, $201_{Mid}$, and $201_{Hot}$. Partial light intensity distributions can be formed within the respective scanning regions $A_{Wide}$, $A_{Mid}$, and $A_{Hot}$, and can be projected through the projection lens assembly 20 serving as an optical system to thereby form the predetermined light distribution pattern P. Note that the number of the excitation light sources 12, the reflection surfaces 60, the optical deflectors 201, and the scanning regions A is not limited to three, and may be two or four or more.

As illustrated in FIG. 34, the projection lens assembly 20, the wavelength conversion member 18, and the optical deflectors $201_{Wide}$, $201_{Mid}$, and $201_{Hot}$ can be disposed in this order along a reference axis AX (or referred to as an optical axis) extending in the front-rear direction of a vehicle body.

The vehicle lighting fixture 400 can further include a laser holder 46A. The laser holder 46A can be disposed to surround the reference axis AX and can hold the excitation light sources $12_{Wide}$, $12_{Mid}$, and $12_{Hot}$ with a posture tilted in such a manner that excitation light rays $Ray_{Wide}$, $Ray_{Mid}$, and $Ray_{Hot}$ are directed forward and toward the reference axis AX.

Specifically, the excitation light sources $12_{Wide}$, $12_{Mid}$, and $12_{Hot}$ can be disposed by being fixed to the laser holder 46A in the following manner.

As illustrated in FIG. 34, the laser holder 46A can be configured to include extension parts 46AU, 46AD, 46AL, and 46AR each radially extending from the outer peripheral face of an optical deflector holder 58 at its upper, lower, left, or right part in a forward and obliquely upward, forward and obliquely downward, forward and obliquely leftward, or forward and obliquely rightward direction.

As illustrated in FIG. 34, the wide-zone excitation light source $12_{Wide}$ can be fixed to the front face of the extension part 46AD with a posture tilted so that the excitation light rays $Ray_{Wide}$ is directed to a forward and obliquely upward direction. Similarly, the middle-zone excitation light source $12_{Mid}$ can be fixed to the front face of the extension part 46AU with a posture tilted so that the excitation light rays $Ray_{Mid}$ is directed to a forward and obliquely downward direction. Similarly, the hot-zone excitation light source $12_{Hot}$ can be fixed to the front face of the extension part 46AL with a posture tilted so that the excitation light rays $Ray_{Mid}$ is directed to a forward and obliquely leftward direction.

The vehicle lighting fixture 400 can further include a lens holder 56 to which the projection lens assembly 20 (lenses 20A to 20D) is fixed. The lens holder 56 can be screwed at its rear end to the opening of a tubular part 48 so as to be fixed to the tubular part 48.

A condenser lens 14 can be disposed in front of each of the excitation light sources $12_{Wide}$, $12_{Mid}$, and $12_{Hot}$. The excitation light rays $Ray_{Wide}$, $Ray_{Mid}$, and $Ray_{Hot}$ can be output from the respective excitation light sources $12_{Wide}$, $12_{Mid}$, and $12_{Hot}$ and condensed by the respective condenser lenses 14 (for example, collimated) to be incident on and reflected by the respective reflection surfaces $60_{Wide}$, $60_{Mid}$, and $60_{Hot}$, and then be incident on the respective mirror parts 202 of the optical deflectors $201_{Wide}$, $201_{Mid}$, and $201_{Hot}$.

As illustrated in FIG. 34, the reflection surfaces $60_{Wide}$, $60_{Mid}$, and $60_{Hot}$ can be disposed to surround the reference axis AX and be closer to the reference axis AX than the excitation light sources $12_{Wide}$, $12_{Mid}$, and $12_{Hot}$. The reflection surfaces $60_{Wide}$, $60_{Mid}$, and $60_{Hot}$ can be fixed to a reflector holder 62 such that each posture is tilted to be closer to the reference axis AX and also the excitation light rays output from the excitation light sources $12_{Wide}$, $12_{Mid}$, and $12_{Hot}$ can be incident on the corresponding reflection surfaces $60_{Wide}$, $60_{Mid}$, and $60_{Hot}$, and reflected by the same to be directed in a rearward direction and closer to the reference axis AX.

Specifically, the reflection surfaces $60_{Wide}$, $60_{Mid}$, and $60_{Hot}$ can be secured to the reflector holder 62 as follows.

The reflector holder 62 can include a ring-shaped extension 64 extending from the rear end of the tubular part 48 that extend in the reference axis AX direction toward the rear and outer side. The ring-shaped extension 64 can have a rear surface tilted so that an inner rim thereof closer to the reference axis AX is positioned more forward than an outer rim thereof, as can be seen from FIG. 34.

The wide-zone reflection surface $60_{Wide}$ can be secured to a lower portion of the rear surface of the ring-shaped extension 64 with a tilted posture such that the excitation light rays $Ray_{Wide}$ can be reflected thereby to a rearward and obliquely upward direction. Similarly, the middle-zone reflection surface $60_{Mid}$ can be secured to an upper portion of the rear surface of the ring-shaped extension 64 with a tilted posture such that the excitation light rays $Ray_{Mid}$ can be reflected thereby to a rearward and obliquely downward direction. Similarly, the hot-zone reflection surface $60_{Hot}$ can be secured to a left portion of the rear surface of the ring-shaped extension 64 with a tilted posture such that the excitation light rays $Ray_{Hot}$ can be reflected thereby to a rearward and obliquely rightward direction.

As illustrated in FIG. 35, the optical deflectors $201_{Wide}$, $201_{Mid}$, and $201_{Hot}$ with the above-described configuration can be disposed to surround the reference axis AX and be closer to the reference axis AX than the reflection surfaces $60_{Wide}$, $60_{Mid}$, and $60_{Hot}$ so that the excitation light rays as reflected light rays from the corresponding reflection surfaces $60_{Wide}$, $60_{Mid}$, and $60_{Hot}$ can be incident on the corresponding mirror parts 202 of the optical deflectors $201_{Wide}$, $201_{Mid}$, and $201_{Hot}$ and reflected by the same to be directed to the corresponding scanning regions $A_{Wide}$, $A_{Mid}$, and $A_{Hot}$, respectively.

Specifically, the optical deflectors $201_{Wide}$, $201_{Mid}$, and $201_{Hot}$ can be secured to an optical deflector holder 58 in the same manner as in the first exemplary embodiment.

The wide-zone optical deflector $201_{Wide}$ (corresponding to the first optical deflector in the presently disclosed subject matter) can be secured to the lower face 58D of the square pyramid face while being tilted so that the mirror part 202 thereof is positioned in an optical path of the excitation light rays $Ray_{Wide}$ reflected from the wide-zone reflection surface $60_{Wide}$. Similarly thereto, the middle-zone optical deflector $201_{Mid}$ (corresponding to the second optical deflector in the presently disclosed subject matter) can be secured to the upper face 58U of the square pyramid face while being tilted so that the mirror part 202 thereof is positioned in an optical path of the excitation light rays $Ray_{Mid}$ reflected from the middle-zone reflection surface $60_{Mid}$. Similarly thereto, the hot-zone optical deflector $201_{Hot}$ (corresponding to the third optical deflector in the presently disclosed subject matter) can be secured to the left face 58L (when viewed from front) of the square pyramid face while being tilted so that the mirror part 202 thereof is positioned in an optical path of the excitation light rays $Ray_{Hot}$ reflected from the hot-zone reflection surface $60_{Hot}$.

The optical deflectors $201_{Wide}$, $201_{Mid}$, and $201_{Hot}$ each can be arranged so that the first axis X1 is contained in a vertical plane and the second axis X2 is contained in a horizontal plane. As a result, the above-described arrangement of the optical deflectors $201_{Wide}$, $201_{Mid}$, and $201_{Hot}$ can easily form (draw) a predetermined light distribution pattern (two-dimensional image corresponding to the required predetermined light distribution pattern) being wide in the horizontal direction and narrow in the vertical direction required for a vehicular headlight.

The wide-zone optical deflector $201_{Wide}$ can draw a first two-dimensional image on the wide-zone scanning region $A_{Wide}$ (corresponding to the first scanning region in the presently disclosed subject matter) with the excitation light rays $Ray_{Wide}$ two-dimensionally scanning in the horizontal and vertical directions by the mirror part 202 thereof, to thereby form a first light intensity distribution on the wide-zone scanning region $A_{Wide}$.

The middle-zone optical deflector $201_{Mid}$ can draw a second two-dimensional image on the middle-zone scanning region $A_{Mid}$ (corresponding to the second scanning region in the presently disclosed subject matter) with the excitation light rays $Ray_{Mid}$ two-dimensionally scanning in the horizontal and vertical directions by the mirror part 202 thereof in such a manner that the second two-dimensional image overlaps the first two-dimensional image in part, to thereby form a second light intensity distribution on the middle-zone scanning region $A_{Mid}$ with a higher light intensity than that of the first light intensity distribution.

As illustrated in FIG. 21, the middle-zone scanning region $A_{Mid}$ can be smaller than the wide-zone scanning region $A_{Wide}$ in size and overlap part of the wide-zone scanning region $A_{Wide}$. As a result of the overlapping, the overlapped middle-zone scanning region $A_{Mid}$ can have the relatively higher light intensity distribution.

The hot-zone optical deflector $201_{Hot}$ can draw a third two-dimensional image on the hot-zone scanning region $A_{Hot}$ (corresponding to the third scanning region in the presently disclosed subject matter) with the excitation light rays $Ray_{Hot}$ two-dimensionally scanning in the horizontal and vertical directions by the mirror part 202 thereof in such a manner that the third two-dimensional image overlaps the first and second two-dimensional images in part, to thereby form a third light intensity distribution on the hot-zone scanning region $A_{Hot}$ with a higher light intensity than that of the second light intensity distribution.

As illustrated in FIG. 21, the hot-zone scanning region $A_{Hot}$ can be smaller than the middle-zone scanning region $A_{Mid}$ in size and overlap part of the middle-zone scanning region $A_{Mid}$. As a result of the overlapping, the overlapped hot-zone scanning region $A_{Hot}$ can have the relatively higher light intensity distribution.

The shape of each of the illustrated scanning regions $A_{Wide}$, $A_{Mid}$, and $A_{Hot}$ in FIG. 21 is a rectangular outer shape, but it is not limitative. The outer shape thereof can be a circle, an oval, or other shapes.

The vehicle lighting fixture 300 can include a phosphor holder 52 to which the wavelength conversion member 18 can be secured as in the first exemplary embodiment.

In the present exemplary embodiment, the sizes (horizontal length and vertical length) of the scanning regions $A_{Wide}$, $A_{Mid}$, and $A_{Hot}$ can be adjusted by the same technique as in the first exemplary embodiment.

With the vehicle lighting fixture having the above-described configuration in the present exemplary embodiment, which utilizes a plurality of optical deflectors configured to scan with excitation light in a two-dimensional manner, it is possible to miniaturize its size and reduce the parts number, which has been a cause for cost increase as in the first exemplary embodiment.

With the vehicle lighting fixture having the above-described configuration in the present exemplary embodiment, which utilizes a plurality of optical deflectors configured to scan with excitation light in a two-dimensional manner, as illustrated in FIG. 26, a predetermined light distribution pattern P (for example, high-beam light distribution pattern) excellent in far-distance visibility and sense of light distribution. The predetermined light distribution pattern P of FIG. 26 can be configured such that the light intensity in part, for example, at the center ($P_{Hot}$), is relatively high and the light intensity is gradually lowered from that part, or the center, to the periphery ($P_{Hot} \rightarrow P_{Mid} \rightarrow P_{Wide}$).

According to the present exemplary embodiment, when compared with the above-described vehicle lighting fixture 300 (lighting unit), although the efficiency may be slightly lowered due to the additional reflection, the vehicle lighting fixture 400 can be miniaturized in the up-down and left-right directions (vertical and horizontal direction).

A description will now be given of a modified example.

The reference example and the first and second exemplary embodiments have dealt with the cases where the semiconductor light emitting elements that can emit excitation light rays are used as the excitation light sources 12 (12$_{Wide}$, 12$_{Mid}$, and 12$_{Hot}$), but the presently disclosed subject matter is not limited thereto.

Figure 36:
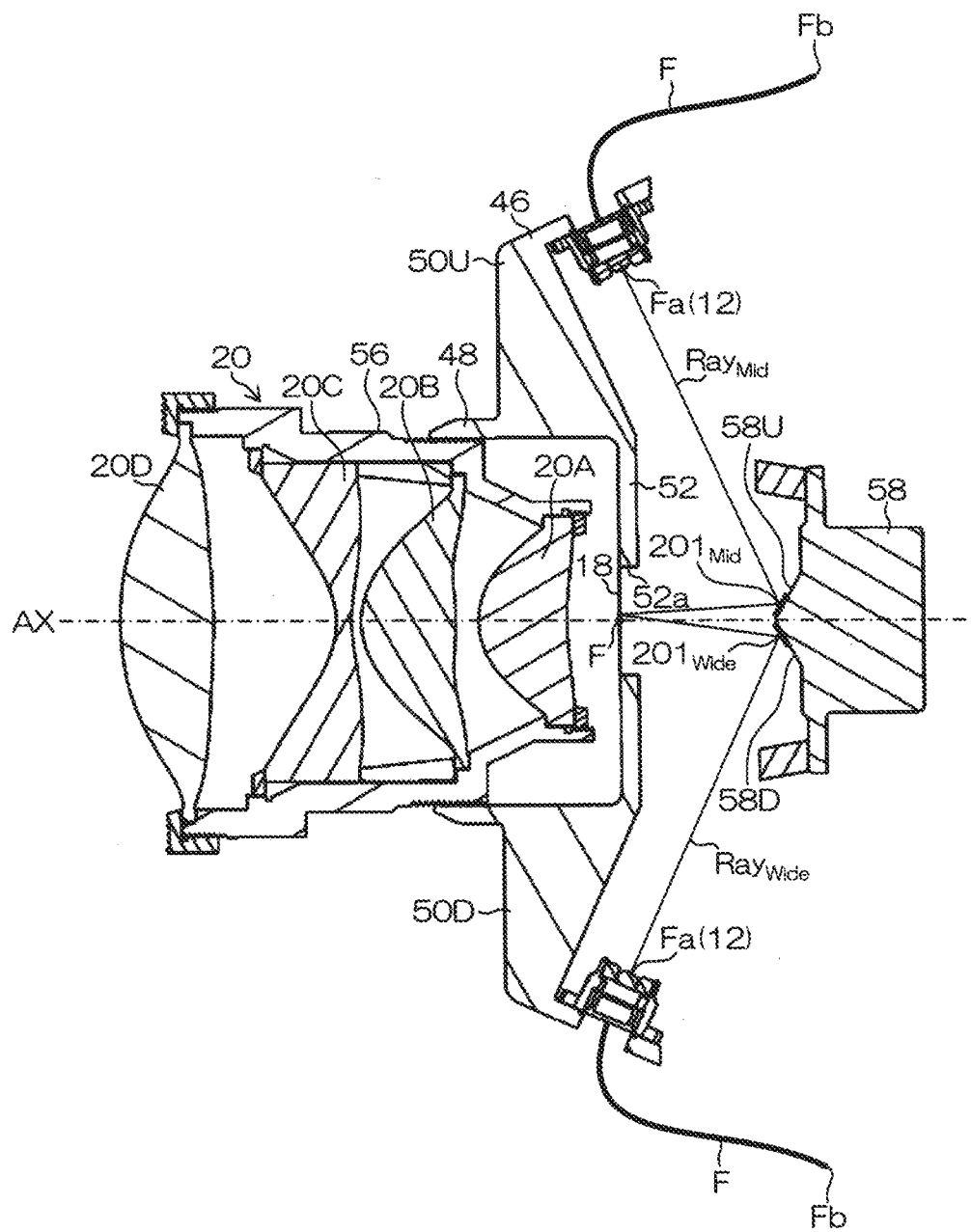
FIG. 36 is a vertical cross-sectional view of another variation of the vehicle lighting fixture 300.

For example, as the excitation light sources 12 (12$_{Wide}$, 12$_{Mid}$, and 12$_{Hot}$), output end faces Fa of optical fibers Fb that can output excitation light rays may be used as illustrated in FIGS. 31 and 36.

In particular, when the output end faces Fa of optical fibers F guiding and outputting excitation light is used as each of a plurality of excitation light sources 12 (12$_{Hot}$, 12$_{Mid}$, and 12$_{Wide}$), the excitation light source, such as a semiconductor light emitting element, can be disposed at a position away from the main body of the vehicle lighting fixture 10. This configuration can make it possible to further miniaturize the vehicle lighting fixture and reduce its weight.

FIG. 36 shows an example in which three optical fibers F are combined with not-illustrated three excitation light sources disposed outside of the vehicle lighting fixture. Here, the optical fiber F can be configured to include a core having an input end face Fb for receiving excitation laser light and an output end face Fa for outputting the excitation laser light, and a clad configured to surround the core. Note that FIG. 36 does not show the hot-zone optical fiber F due to the cross-sectional view.

FIG. 31 shows an example in which the vehicle lighting fixture can include a single excitation light source 12 and an optical distributor 68 that can divide excitation laser light rays from the excitation light source 12 into a plurality of (for example, three) bundles of laser light rays and distribute the plurality of bundles of light rays. The vehicle lighting fixture can further include optical fibers F the number of which corresponds to the number of division of laser light rays. The optical fiber F can be configured to have a core with an input end face Fb and an output end face Fa and a clad surrounding the core. The distributed bundles of the light rays can be incident on the respective input end faces Fb, guided through the respective cores of the optical fibers F and output through the respective output end faces Fa.

Figure 37:
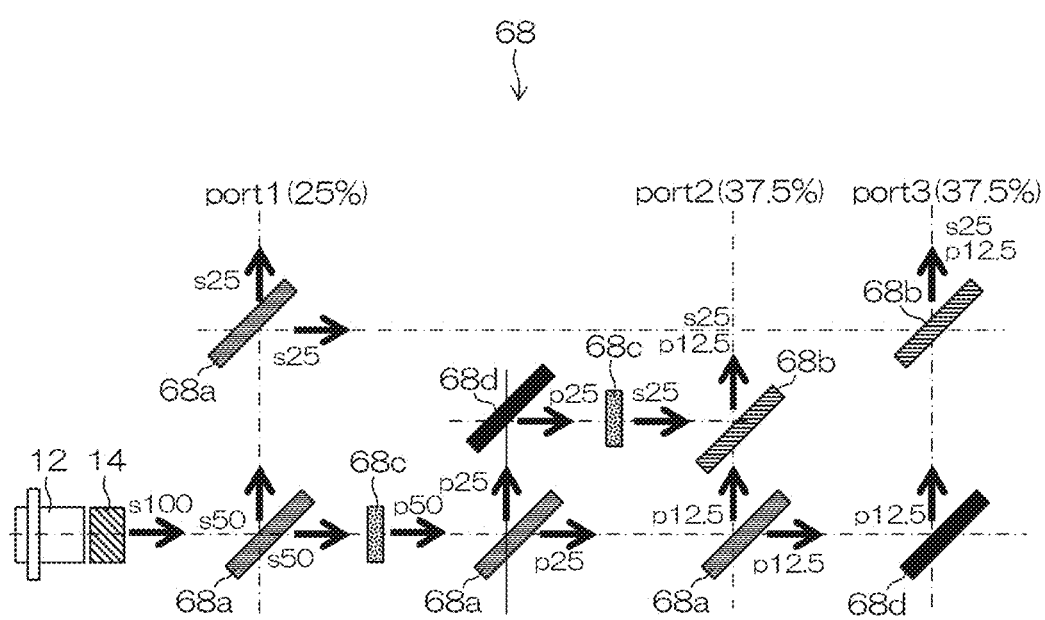
FIG. 37 is a diagram illustrating an example of an internal configuration of an optical distributor 68.

FIG. 37 shows an example of an internal structure of the optical distributor 68. The optical distributor 68 can be configured to include a plurality of non-polarizing beam splitters 68a, polarizing beam splitter 68b, ½λ plate 68c, and mirrors 68d, which are arranged in the manner described in FIG. 37. With the optical distributor 68 having this configuration, excitation laser light rays emitted from the excitation light source 12 and condensed by the condenser lens 14 can be distributed to the ratios of 25%, 37.5%, and 37.5%.

With this modified example, the same or similar advantageous effects as or to those in the respective exemplary embodiments can be obtained.

Next, a description will be given of, as a second reference example, a technique of forming a light intensity distribution having a relatively high intensity region in part (and a predetermined light distribution pattern having a relatively high intensity region in part) by means of an optical deflector 201 (see FIG. 4) of the one-dimensional nonresonance/one-dimensional resonance type (2-D optical scanner (fast resonant and slow static combination)) in the vehicle lighting fixture 10 (see FIG. 2) as described in the above-mentioned reference example.

First, with reference to (a) of FIG. 38, a description will be given of a technique of forming a light intensity distribution having a relatively high intensity region B1 in the vicinity of the center part (see the region surrounded by an alternate dash and long chain line in (a) of FIG. 38) (and a predetermined light distribution pattern having a relatively high intensity region in part) as the light intensity distribution having a relatively high intensity region in part (and the predetermined light distribution pattern having a relatively high intensity region in part). The technique will be described by applying it to the reference example of FIG. 2 in order to facilitate the understanding the technique with a simple configuration. Therefore, it should be appreciated that this technique can be applied to any of the vehicle lighting fixtures described above as the exemplary embodiments and their modified examples of the presently disclosed subject matter.

The vehicle lighting fixture 10 in the following description can be configured to include a controlling unit (for example, such as the controlling unit 24 and the MEMS power circuit 26 illustrated in FIG. 11) for resonantly controlling the first piezoelectric actuators 203 and 204 and nonresonantly controlling the second piezoelectric actuators 205 and 206 in order to form a two-dimensional image on the scanning region A1 of the wavelength conversion member 18 by the excitation light scanning in a two-dimensional manner by the mirror part 202 of the optical deflector 201 of the one-dimensional nonresonance/one-dimensional resonance type (2-D optical scanner (fast resonant and slow static combination)). It is assumed that the output (or modulation rate) of the excitation light source 12 is constant and the optical deflector 201 utilizing a 2-D optical scanner (fast resonant and slow static combination) can be arranged so that the first axis X1 is contained in a vertical plane and the second axis X2 is contained in a horizontal plane.

The (a) of FIG. 38 shows an example of a light intensity distribution wherein the light intensity in the region B1 in the vicinity of the center area is relatively high. In this case, the scanning region A1 of the wavelength conversion member 18 can be scanned by the excitation light rays in the two-dimensional manner by means of the mirror part 202 to draw a two-dimensional image, thereby forming a light intensity distribution image having a relatively high intensity area in the scanning region A1 of the wavelength conversion member 18. Note that the scanning region A1 is not limited to the rectangular outer shape as illustrated in (a) of FIG. 38, but may be a circular, an oval, and other various shapes.

The light intensity distribution illustrated in (a) of FIG. 38 can have a horizontal center region (in the left-right direction in (a) of FIG. 38) with a relatively low intensity (further with relatively high intensity regions at or near both right and left ends) and a vertical center region B1 (in the up-down direction in (a) of FIG. 38) with a relatively high intensity (further with relatively low intensity regions at or near upper and lower ends). As a whole, the light intensity distribution can have the relatively high intensity region B1 at or near the center thereof required for use in a vehicle headlamp.

The light intensity distribution illustrated in (a) of FIG. 38 can be formed in the following manner. Specifically, the controlling unit can control the first piezoelectric actuators 203 and 204 to resonantly drive them on the basis of a drive signal (sinusoidal wave) shown in (b) of FIG. 38 and also can control the second piezoelectric actuators 205 and 206 to nonresonantly drive them on the basis of a drive signal (sawtooth wave or rectangular wave) including a nonlinear region shown in (c) of FIG. 38. Specifically, in order to form the light intensity distribution, the controlling unit can apply the drive voltage according to the drive signal (sinusoidal wave) shown in (b) of FIG. 38 to the first piezoelectric actuators 203 and 204 and also apply the drive voltage according to the drive signal (sawtooth wave or rectangular wave) including a nonlinear region shown in (c) of FIG. 38 to the second piezoelectric actuators 205 and 206. The reason therefor is as follows.

Specifically, assume a case where the optical deflector 201 of one-dimensional nonresonance/one-dimensional resonance type (2-D optical scanner (fast resonant and slow static combination)) applies the drive voltage according to the drive signal (sinusoidal wave) shown in (b) of FIG. 38 to the first piezoelectric actuators 203 and 204. In this case, the reciprocal swing speed (scanning speed in the horizontal direction) around the first axis X1 of the mirror part 202 can be maximized in the horizontal center region in the scanning region A1 of the wavelength conversion member 18 while it can be minimized in both the right and left ends in the horizontal direction. This is because, first, the drive signal shown in (b) of FIG. 38 is a sinusoidal wave, and second, the controlling unit can control the first piezoelectric actuators 203 and 204 to resonantly drive them on the basis of the drive signal (sinusoidal wave).

In this case, the amount of excitation light rays per unit area in the center region is relatively reduced where the reciprocal swing speed around the first axis X1 of the mirror part 202 is relatively high. Conversely, the amount of excitation light rays per unit area in both the left and right end regions is relatively increased where the reciprocal swing speed around the first axis X1 of the mirror part 202 is relatively low. As a result, the light intensity distribution as illustrated in (a) of FIG. 38 can have a relatively low intensity horizontal center region while having relatively high intensity regions at or near both right and left ends.

In (a) of FIG. 38, the distances between adjacent lines of the plurality of lines extending in the vertical direction represent the scanning distance per unit time of the excitation light rays from the excitation light source 12 to be scanned in the horizontal direction by the mirror part 202. Specifically, the distance between adjacent vertical lines can represent the reciprocal swing speed around the first axis X1 of the mirror part 202 (scanning speed in the horizontal direction). The shorter the distance is, the lower the reciprocal swing speed around the first axis X1 of the mirror part 202 (scanning speed in the horizontal direction) is.

With reference to (a) of FIG. 38, the distance between adjacent vertically extending lines is relatively wide in the vicinity of the center region, meaning that the reciprocal swing speed around the first axis X1 of the mirror part 202 is relatively high in the vicinity of the center region. Further, the distance between adjacent vertically extending lines is relatively narrow in the vicinity of both the left and right end regions, meaning that the reciprocal swing speed around the first axis X1 of the mirror part 202 is relatively low in the vicinity of the left and right end regions.

Specifically, assume a case where the optical deflector 201 of one-dimensional nonresonance/one-dimensional resonance type (2-D optical scanner (fast resonant and slow static combination)) applies the drive voltage according to the drive signal (sawtooth wave or rectangular wave) shown in (c) of FIG. 38 to the second piezoelectric actuators 205 and 206. In this case, the reciprocal swing speed (scanning speed in the vertical direction) around the second axis X2 of the mirror part 202 can become relatively low in the vertical center region B1 in the scanning region A1 of the wavelength conversion member 18. This is because, first, the drive signal (sawtooth wave or rectangular wave) including a nonlinear region shown in (c) of FIG. 38 is a drive signal including a nonlinear region that is adjusted such that the reciprocal swing speed around the second axis X2 of the mirror part 202 becomes relatively low while the center region B1 in the scanning region A1 of the wavelength conversion member 18 can be scanned by the excitation light rays in the two-dimensional manner by means of the mirror part 202 to draw a two-dimensional image in the region B1. Second, the controlling unit can control the second piezoelectric actuators 205 and 206 to nonresonantly drive them on the basis of the drive signal (sawtooth wave or rectangular wave).

In this case, the amount of excitation light rays per unit area in the center region B1 is relatively increased where the reciprocal swing speed around the second axis X2 of the mirror part 202 is relatively low. In addition, the pixels in the center region B1 are relatively dense to increase its resolution. Conversely, the amount of excitation light rays per unit area in both the upper and lower end regions is relatively decreased where the reciprocal swing speed around the second axis X2 of the mirror part 202 is relatively high. In addition, the pixels in the upper and lower end regions are relatively coarse to decrease its resolution. As a result, the light intensity distribution as illustrated in (a) of FIG. 38 can have the relatively high intensity vertical center region B1 while having relatively low intensity regions at or near both upper and lower ends.

In (a) of FIG. 38, the distances between adjacent lines of the plurality of lines extending in the horizontal direction represent the scanning distance per unit time of the excitation light rays from the excitation light source 12 to be scanned in the vertical direction by the mirror part 202. Specifically, the distance between adjacent horizontal lines can represent the reciprocal swing speed around the second axis X2 of the mirror part 202 (scanning speed in the vertical direction). The shorter the distance is, the lower the reciprocal swing speed around the second axis X2 of the mirror part 202 (scanning speed in the vertical direction) is.

With reference to (a) of FIG. 38, the distance between adjacent horizontally extending lines is relatively narrow in the vicinity of the center region B1, meaning that the reciprocal swing speed around the second axis X2 of the mirror part 202 is relatively low in the vicinity of the center region B1. Further, the distance between adjacent horizontally extending lines is relatively wide in the vicinity of both the upper and lower end regions, meaning that the reciprocal swing speed around the second axis X2 of the mirror part 202 is relatively high in the vicinity of the upper and lower end regions.

In this manner, the light intensity distribution with a relatively high center region B1 in the scanning region A1 of the wavelength conversion member 18 can be formed as illustrated in (a) of FIG. 38. Since the formed light intensity distribution can have relatively high resolution as well as dense pixels in the vicinity of the center region B1, in which the apparent size of an opposing vehicle becomes relatively smaller and also can have relatively low resolution as well as coarse pixels in the vicinity of both the left and right end regions, in which the apparent size of an opposing vehicle becomes relatively large, it can be suitable for the formation of a high-beam light distribution pattern to achieve ADB. This light intensity distribution ((a) of FIG. 38) having the relatively high intensity region B1 in the vicinity of the center region can be projected forward by the projection lens assembly 20, thereby forming a high-beam light distribution pattern with a high intensity center region on a virtual vertical screen.

As a comparison, FIG. 39 shows a case where the controlling unit can apply a drive voltage according to a drive signal shown in (b) of FIG. 39 (the same as that in (b)

of FIG. 38) to the first piezoelectric actuators 203 and 204 while applying a drive signal (sawtooth wave or rectangular wave) including a linear region shown in (c) of FIG. 39 to the second piezoelectric actuators 205 and 206 in place of the drive signal including a nonlinear region shown in (c) of FIG. 38, to thereby obtain the light intensity distribution shown in (a) of FIG. 39 formed in the scanning region A1 of the wavelength conversion member 18.

As shown in (a) of FIG. 39, the light intensity distribution in the horizontal direction can be configured such that the light intensity in the vicinity of horizontal center (left-right direction in (a) of FIG. 39) is relatively low while the light intensity between the vertically upper and lower end regions is substantially uniform. This light intensity distribution is thus not suitable for use in a vehicle headlamp. Furthermore, the light intensity distribution in the vertical direction can be configured such that the light intensity between the vertical upper and lower ends is substantially uniform while the drive signal shown in (c) of FIG. 39 is not a drive signal including a nonlinear region as shown in (c) of FIG. 38, but a drive signal including a linear region. As a result, the scanning speed in the vertical direction becomes constant.

As described above, in the vehicle lighting fixture of the present reference example, which utilizes the mirror part 202 of the optical deflector 201 of the one-dimensional nonresonance/one-dimensional resonance type (2-D optical scanner (fast resonant and slow static combination)) (see FIG. 4), the light intensity distribution with a relatively high intensity region in part (for example, in the center region B1) required for use in a vehicle lighting fixture (in particular, vehicle headlamp) can be formed (see (a) of FIG. 38).

This is because the controlling unit can control the second piezoelectric actuators 205 and 206 such that the reciprocal swing speed around the second axis X2 of the mirror part 202 can be relatively low while the two-dimensional image is drawn in a partial region (for example, the center region B1) of the scanning region A1 of the wavelength conversion member 18 with the excitation light rays scanning in the two-dimensional manner by the mirror part 202.

Further, according to the present reference example that utilizes the optical deflector 201 utilizing a 2-D optical scanner (fast resonant and slow static combination) (see FIG. 4), the predetermined light distribution pattern (for example, high-beam light distribution pattern) having a relatively high light intensity region in part (for example, the center region B1) can be formed.

This is because the light intensity distribution having a relatively high intensity region in part (for example, the region B1 in the vicinity of its center part, as shown in (a) of FIG. 38) can be formed, and in turn, the predetermined light distribution pattern having a relatively high intensity region in part (for example, high-beam light distribution pattern) can be formed by projecting the light intensity distribution having the relatively high intensity region in part (for example, the region B1 in the vicinity of its center part).

Furthermore, according to the present reference example, the light intensity distribution formed in the scanning region A1 can have relatively high resolution as well as dense pixels in the vicinity of the center region B1, in which the apparent size of an opposing vehicle becomes relatively smaller and also can have relatively low resolution as well as coarse pixels in the vicinity of both the left and right end regions, in which the apparent size of an opposing vehicle becomes relatively large, it can be suitable for the formation of a high-beam light distribution pattern to achieve ADB.

Further, by adjusting the drive signal (see (c) of FIG. 38) including a nonlinear region for controlling the second piezoelectric actuators 205 and 206, a relatively high light intensity distribution with a relatively high intensity region in any optional region other than the center region B1 can be formed, meaning that a predetermined light distribution pattern having a relatively high intensity region at any optional region can be formed.

Figure 40:
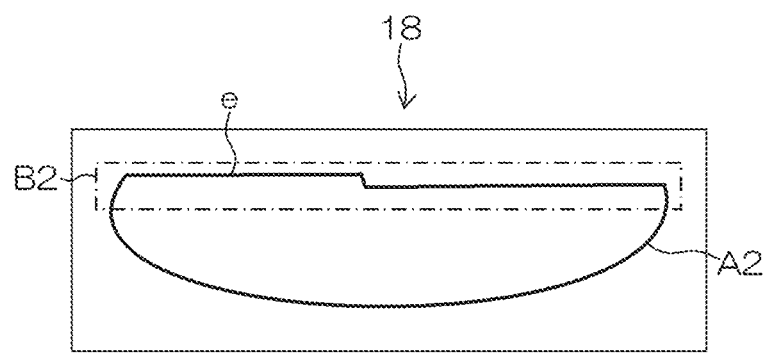
FIG. 40 is a diagram illustrating an example of a light intensity distribution in which the light intensity at a region B2 in the vicinity of the side e corresponding to a cut-off line is relatively high.

For example, as illustrated in FIG. 40, a light intensity distribution having a relatively high intensity region in a region B2 near its one side e corresponding to its cut-off line (see the region surrounded by alternate dash and dot line in FIG. 40) can be formed, thereby forming a low-beam light distribution pattern with a relatively high intensity region in the vicinity of the cut-off line. This can be easily achieved as follows. Specifically, as the drive signal (sawtooth wave or rectangular wave) including a nonlinear region shown for controlling the second piezoelectric actuators 205 and 206, the controlling unit can utilize a drive signal including a nonlinear region that is adjusted such that the reciprocal swing speed around the second axis X2 of the mirror part 202 becomes relatively low while the region B2 in the scanning region A2 of the wavelength conversion member 18 near its side e corresponding to the cut-off line can be scanned by the excitation light rays in the two-dimensional manner by means of the mirror part 202 to draw a two-dimensional image in the region B2.

Next, a description will be given of, as a third reference example, a technique of forming a light intensity distribution having a relatively high intensity region in part (and a predetermined light distribution pattern having a relatively high intensity region in part) by means of an optical deflectors 161 (see FIG. 16) of the two-dimensional nonresonance type in the vehicle lighting fixture 10 (see FIG. 2) as described in the above-mentioned reference example in place of the optical deflector 201 of one-dimensional nonresonance/one-dimensional resonance type.

First, with reference to (a) of FIG. 41, a description will be given of a technique of forming a light intensity distribution having relatively high intensity regions B1 and B3 in the vicinity of its center parts (see the regions surrounded by an alternate dash and long chain line in (a) of FIG. 41) (and a predetermined light distribution pattern having relatively high intensity regions in part) as the light intensity distribution having relatively high intensity regions in part (and the predetermined light distribution pattern having relatively high intensity regions in part). The technique will be described by applying it to the reference example of FIG. 2 in order to facilitate the understanding the technique with a simple configuration. Therefore, it should be appreciated that this technique can be applied to any of the vehicle lighting fixtures described above as the exemplary embodiments and their modified examples of the presently disclosed subject matter.

The vehicle lighting fixture 10 in the following description can be configured to include a controlling unit (for example, such as the controlling unit 24 and the MEMS power circuit 26 illustrated in FIG. 11) for nonresonantly controlling the first piezoelectric actuators 163 and 164 and the second piezoelectric actuators 165 and 166 in order to form a two-dimensional image on the scanning region A1 of the wavelength conversion member 18 by the excitation light scanning in a two-dimensional manner by the mirror part 162 of the optical deflector 161 of the two-dimensional nonresonance type. It is assumed that the output (or modulation rate) of the excitation light source 12 is constant and the optical deflector 161 of two-dimensional nonresonance type can be arranged so that the third axis X3 is contained in a vertical plane and the fourth axis X4 is contained in a horizontal plane.

The (a) of FIG. 41 shows an example of a light intensity distribution wherein the light intensity in the regions B1 and B3 in the vicinity of the center areas are relatively high. In this case, the scanning region A1 of the wavelength conversion member 18 can be scanned by the excitation light rays in the two-dimensional manner by means of the mirror part 162 to draw a two-dimensional image, thereby forming a light intensity distribution image having a relatively high intensity area in the scanning region A1 of the wavelength conversion member 18. Note that the scanning region A1 is not limited to the rectangular outer shape as illustrated in (a) of FIG. 41, but may be a circular, an oval, and other various shapes.

The light intensity distribution illustrated in (a) of FIG. 41 can have the horizontal center region B3 (in the left-right direction in (a) of FIG. 41) with a relatively high intensity (further with relatively low intensity regions at or near both right and left ends) and the vertical center region B1 (in the up-down direction in (a) of FIG. 41) with a relatively high intensity (further with relatively low intensity regions at or near upper and lower ends). As a whole, the light intensity distribution can have the relatively high intensity regions B1 and b3 at or near the center thereof required for use in a vehicle headlamp.

The light intensity distribution illustrated in (a) of FIG. 41 can be formed in the following manner. Specifically, the controlling unit can control the first piezoelectric actuators 163 and 164 to nonresonantly drive them on the basis of a first drive signal including a first nonlinear region (sawtooth wave or rectangular wave) shown in (b) of FIG. 41 and also can control the second piezoelectric actuators 165 and 166 to nonresonantly drive them on the basis of a second drive signal including a second nonlinear region (sawtooth wave or rectangular wave) shown in (c) of FIG. 41. Specifically, in order to form the light intensity distribution, the controlling unit can apply the drive voltage according to the first drive signal including the first nonlinear region (sawtooth wave or rectangular wave) shown in (b) of FIG. 41 to the first piezoelectric actuators 163 and 164 and also apply the drive voltage according to the second drive signal including the second nonlinear region (sawtooth wave or rectangular wave) shown in (c) of FIG. 41 to the second piezoelectric actuators 165 and 166. The reason therefor is as follows.

Specifically, assume a case where the optical deflector 161 of two-dimensional nonresonance type applies the drive voltage according to the first drive signal including the first nonlinear region (sawtooth wave or rectangular wave) shown in (b) of FIG. 41 to the first piezoelectric actuators 163 and 164. In this case, the reciprocal swing speed (scanning speed in the horizontal direction) around the third axis X3 of the mirror part 162 can be reduced in the horizontal center region B3 in the scanning region A1 of the wavelength conversion member 18. This is because, first, the first drive signal including the first nonlinear region (sawtooth wave or rectangular wave) shown in (b) of FIG. 41 is a drive signal including a nonlinear region that is adjusted such that the reciprocal swing speed around the third axis X3 of the mirror part 162 becomes relatively low while the center region B3 in the scanning region A1 of the wavelength conversion member 18 can be scanned by the excitation light rays in the two-dimensional manner by means of the mirror part 162 to draw a two-dimensional image in the region B3. Second, the controlling unit can control the first piezoelectric actuators 163 and 164 to nonresonantly drive them on the basis of the first drive signal including the first nonlinear region (sawtooth wave or rectangular wave).

In this case, the amount of excitation light rays per unit area in the center region B3 is relatively increased where the reciprocal swing speed around the third axis X3 of the mirror part 162 is relatively low. In addition, the pixels in the center region B3 are relatively dense to increase its resolution. Conversely, the amount of excitation light rays per unit area in both the left and right end regions is relatively decreased where the reciprocal swing speed around the third axis X3 of the mirror part 162 is relatively high. In addition, the pixels in the left and right end regions are relatively coarse to decrease its resolution. As a result, the light intensity distribution as illustrated in (a) of FIG. 41 can have the relatively high intensity horizontal center region B3 while having relatively low intensity regions at or near both left and right ends.

In (a) of FIG. 40, the distances between adjacent lines of the plurality of lines extending in the vertical direction represent the scanning distance per unit time of the excitation light rays from the excitation light source 12 to be scanned in the horizontal direction by the mirror part 162. Specifically, the distance between adjacent vertical lines can represent the reciprocal swing speed around the third axis X3 of the mirror part 162 (scanning speed in the horizontal direction). The shorter the distance is, the lower the reciprocal swing speed around the third axis X3 of the mirror part 162 (scanning speed in the horizontal direction) is.

With reference to (a) of FIG. 41, the distance between adjacent vertically extending lines is relatively narrow in the vicinity of the center region B3, meaning that the reciprocal swing speed around the third axis X3 of the mirror part 162 is relatively low in the vicinity of the center region B3. Further, the distance between adjacent vertically extending lines is relatively wide in the vicinity of both the left and right end regions, meaning that the reciprocal swing speed around the third axis X3 of the mirror part 162 is relatively low in the vicinity of the left and right end regions.

On the other hand, assume a case where the optical deflector 161 of two-dimensional nonresonance type applies the drive voltage according to the second drive signal including the second nonlinear region (sawtooth wave or rectangular wave) shown in (c) of FIG. 41 to the second piezoelectric actuators 165 and 166. In this case, the reciprocal swing speed (scanning speed in the vertical direction) around the fourth axis X4 of the mirror part 162 can become relatively low in the vertical center region B1 in the scanning region A1 of the wavelength conversion member 18. This is because, first, the second drive signal including the second nonlinear region (sawtooth wave or rectangular wave) shown in (c) of FIG. 41 is a drive signal including a nonlinear region that is adjusted such that the reciprocal swing speed around the fourth axis X4 of the mirror part 162 becomes relatively low while the center region B1 in the scanning region A1 of the wavelength conversion member 18 can be scanned by the excitation light rays in the two-dimensional manner by means of the mirror part 162 to draw a two-dimensional image in the region B1. Second, the controlling unit can control the second piezoelectric actuators 165 and 166 to nonresonantly drive them on the basis of the second drive signal including the second nonlinear region (sawtooth wave or rectangular wave).

In this case, the amount of excitation light rays per unit area in the center region B1 is relatively increased where the reciprocal swing speed around the fourth axis X4 of the mirror part 162 is relatively low. In addition, the pixels in the center region B1 are relatively dense to increase its resolution.

In this case, the amount of excitation light rays per unit area in the center region B1 is relatively decreased where the reciprocal swing speed around the fourth axis X4 of the mirror part 162 is relatively high. In addition, the pixels in the center region B1 are relatively coarse to decrease its resolution. As a result, the light intensity distribution as illustrated in (a) of FIG. 41 can have the relatively high intensity vertical center region B1 while having relatively low intensity regions at or near both upper and lower ends.

In (a) of FIG. 41, the distances between adjacent lines of the plurality of lines extending in the horizontal direction represent the scanning distance per unit time of the excitation light rays from the excitation light source 12 to be scanned in the vertical direction by the mirror part 162. Specifically, the distance between adjacent horizontal lines can represent the reciprocal swing speed around the fourth axis X4 of the mirror part 162 (scanning speed in the vertical direction). The shorter the distance is, the lower the reciprocal swing speed around the fourth axis X4 of the mirror part 162 (scanning speed in the vertical direction) is.

With reference to (a) of FIG. 41, the distance between adjacent horizontally extending lines is relatively narrow in the vicinity of the center region B1, meaning that the reciprocal swing speed around the fourth axis X4 of the mirror part 162 is relatively low in the vicinity of the center region B1. Further, the distance between adjacent horizontally extending lines is relatively wide in the vicinity of both the upper and lower end regions, meaning that the reciprocal swing speed around the fourth axis X4 of the mirror part 162 is relatively high in the vicinity of the upper and lower end regions.

In this manner, the light intensity distribution with the relatively high center regions B1 and B3 in the scanning region A1 of the wavelength conversion member 18 can be formed as illustrated in (a) of FIG. 41. Since the formed light intensity distribution can have relatively high resolution as well as dense pixels in the vicinity of the center region B1, in which the apparent size of an opposing vehicle becomes relatively smaller and also can have relatively low resolution as well as coarse pixels in the vicinity of both the left and right end regions, in which the apparent size of an opposing vehicle becomes relatively large, it can be suitable for the formation of a high-beam light distribution pattern to achieve ADB. This light intensity distribution ((a) of FIG. 41) having the relatively high intensity regions B1 and B3 in the vicinity of the center regions can be projected forward by the projection lens assembly 20, thereby forming a high-beam light distribution pattern with a high intensity center region on a virtual vertical screen.

As a comparison, FIG. 42 shows a case where the controlling unit can apply a drive voltage according to a drive signal including a linear region (sawtooth wave or rectangular wave) shown in (b) of FIG. 42 to the first piezoelectric actuators 163 and 164 in place of the first drive signal including the first nonlinear region shown in (b) of FIG. 41. Furthermore, in this case, the controlling unit can apply a drive signal including a linear region (sawtooth wave or rectangular wave) shown in (c) of FIG. 42 to the second piezoelectric actuators 165 and 166 in place of the second drive signal including the second nonlinear region shown in (c) of FIG. 41, to thereby obtain the light intensity distribution shown in (a) of FIG. 42 formed in the scanning region A1 of the wavelength conversion member 18.

As shown in (a) of FIG. 42, the light intensity distribution in the horizontal direction can be configured such that the light intensity between the left and right end regions is substantially uniform in the horizontal direction (in the left-right direction in (a) of FIG. 42) and the light intensity between vertically upper and lower end regions is substantially uniform. This light intensity distribution is thus not suitable for use in a vehicle headlamp. Furthermore, the light intensity distribution in the horizontal direction can be configured such that the light intensity in the vicinity of left and right ends is substantially uniform while the drive signal shown in (b) of FIG. 42 is not a drive signal including a nonlinear region as shown in (b) of FIG. 41, but a drive signal including a linear region. As a result, the scanning speed in the horizontal direction becomes constant. Similarly, the light intensity distribution in the vertical direction can be configured such that the light intensity between the vertical upper and lower ends is substantially uniform while the drive signal shown in (c) of FIG. 42 is not a drive signal including a nonlinear region as shown in (c) of FIG. 41, but a drive signal including a linear region. As a result, the scanning speed in the vertical direction becomes constant.

As described above, in the vehicle lighting fixture of the present reference example, which utilizes the mirror part 162 of the optical deflector 161 of the two-dimensional nonresonance type (see FIG. 16), the light intensity distribution with a relatively high intensity region in part (for example, in the center regions B1 and B3) required for use in a vehicle lighting fixture (in particular, vehicle headlamp) can be formed (see (a) of FIG. 41).

This is because the controlling unit can control the first and second piezoelectric actuators 163, 164, 165, and 166 such that the reciprocal swing speed around the third and fourth axes X3 and X4 of the mirror part 162 can be relatively low while the two-dimensional image is drawn in a partial region (for example, the center regions B1 and B3) of the scanning region A1 of the wavelength conversion member 18 with the excitation light rays scanning in the two-dimensional manner by the mirror part 162.

Further, according to the present reference example that utilizes the optical deflector 161 of two-dimensional non-resonance type (see FIG. 16), the predetermined light distribution pattern (for example, high-beam light distribution pattern) having the relatively high light intensity regions in part (for example, the center regions B1 and B3) can be formed.

This is because the light intensity distribution having the relatively high intensity regions in part (for example, the regions B1 and B3 in the vicinity of its center part, as shown in (a) of FIG. 41) can be formed, and in turn, the predetermined light distribution pattern having the relatively high intensity regions in part (for example, high-beam light distribution pattern) can be formed by projecting the light intensity distribution having the relatively high intensity regions in part (for example, the regions B1 and B3 in the vicinity of its center part).

Furthermore, according to the present reference example, the light intensity distribution formed in the scanning region A1 can have relatively high resolution as well as dense pixels in the vicinity of the center region B1, in which the apparent size of an opposing vehicle becomes relatively smaller and also can have relatively low resolution as well as coarse pixels in the vicinity of both the left and right end regions, in which the apparent size of an opposing vehicle becomes relatively large, it can be suitable for the formation of a high-beam light distribution pattern to achieve ADB.

Further, by adjusting the first and second drive signals including a nonlinear region for controlling the first and second piezoelectric actuators 163, 164, 165, and 166, a relatively high light intensity distribution with a relatively high intensity region in any optional region other than the center regions B1 and B3 can be formed, meaning that a predetermined light distribution pattern having a relatively high intensity region at any optional region can be formed.

For example, as illustrated in FIG. 40, a light intensity distribution having a relatively high intensity region in a region B2 near its one side e corresponding to its cut-off line (see the region surrounded by alternate dash and dot line in FIG. 40) can be formed, thereby forming a low-beam light distribution pattern with a relatively high intensity region in the vicinity of the cut-off line. This can be easily achieved as follows. Specifically, as the second drive signal including the second nonlinear region (sawtooth wave or rectangular wave) shown for controlling the second piezoelectric actuators 165 and 166, the controlling unit can utilize a drive signal including a nonlinear region that is adjusted such that the reciprocal swing speed around the fourth axis X4 of the mirror part 162 becomes relatively low while the region B2 in the scanning region A2 of the wavelength conversion member 18 near its side e corresponding to the cut-off line can be scanned by the excitation light rays in the two-dimensional manner by means of the mirror part 162 to draw a two-dimensional image in the region B2.

Next, as a reference example, a description will be given of a light intensity distribution shown in (a) of FIG. 42 in the vehicle lighting fixture 10 of the first reference example (see FIG. 2) that utilizes an optical deflector 201A of two-dimensional resonance type (see FIG. 17) in place of the optical deflector 201 of one-dimensional nonresonance/one-dimensional resonance type. Specifically, the light intensity distribution (see (a) of FIG. 43) can be formed in the scanning region A1 of the wavelength conversion member 18 by the controlling unit that applies a drive voltage according to a drive signal (sinusoidal wave) shown in (b) of FIG. 43 to the first piezoelectric actuators 15Aa and 15Ab and applies a drive voltage according to a drive signal (sinusoidal wave) shown in (c) of FIG. 43.

Specifically, the vehicle lighting fixture 10 in the following description can be configured to include a controlling unit (for example, such as the controlling unit 24 and the MEMS power circuit 26 illustrated in FIG. 11) for resonantly controlling the first piezoelectric actuators 15Aa and 15Ab and the second piezoelectric actuators 17Aa and 17Ab in order to form a two-dimensional image on the scanning region A of the wavelength conversion member 18 by the excitation light scanning in a two-dimensional manner by the mirror part 13A of the optical deflector 201A of the two-dimensional resonance type. It is assumed that the output (or modulation rate) of the excitation light source 12 is constant and the optical deflector 201A of two-dimensional resonance type can be arranged so that the fifth axis X5 is contained in a vertical plane and the sixth axis X6 is contained in a horizontal plane.

In this case, the light intensity distribution shown in (a) of FIG. 43 can a horizontal center region (in the left-right direction in (a) of FIG. 43) with a relatively low intensity (further with relatively high intensity regions at or near both right and left ends) and a vertical center region (in the up-down direction in (a) of FIG. 43) with a relatively low intensity (further with relatively high intensity regions at or near upper and lower ends). Accordingly, the resulting light intensity distribution is not suitable for use in a vehicle headlamp.

A description will now be given of a technique for forming a high-beam light distribution pattern $P_{Hi}$ (see FIG. 44D) as a third exemplary embodiment. Here, the high-beam light distribution pattern $P_{Hi}$ can be formed by overlaying a plurality of irradiation patterns $P_{Hot}$, $P_{Mid}$, and $P_{Wide}$ to form non-irradiation regions C1, C2, and C3 illustrated in FIGS. 44A to 44C.

Hereinafter, a description will be given of an example in which the high-beam light distribution pattern $P_{Hi}$ (see FIG. 44D) is formed by the vehicle lighting fixture 300 as illustrated in the first exemplary embodiment (see FIGS. 21 to 25). It should be appreciated that the vehicle lighting fixture may be any of those described in the second exemplary embodiment or may be a combination of a plurality of lighting units for forming the respective irradiation patterns $P_{Hot}$, $P_{Mid}$, and $P_{Wide}$. The number of the irradiation patterns for forming the high-beam light distribution pattern $P_{Hi}$ is not limited to three, but may be two or four or more.

The vehicle lighting fixture 300 can be configured to include an irradiation-prohibitive object detection unit for detecting an object to which irradiation is prohibited such as a pedestrian and an opposing vehicle in front of a vehicle body in which the vehicle lighting fixture 300 is installed. The irradiation-prohibitive object detection unit may be configured to include an imaging device and the like, such as a camera 30 shown in FIG. 11.

Figure 44A:
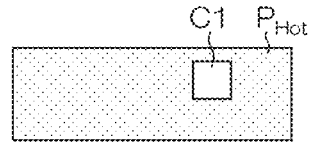
FIG. 44A is a diagram illustrating an example of an irradiation pattern $P_{Hot}$ for forming an unirradiation region C1.
Figure 44B:
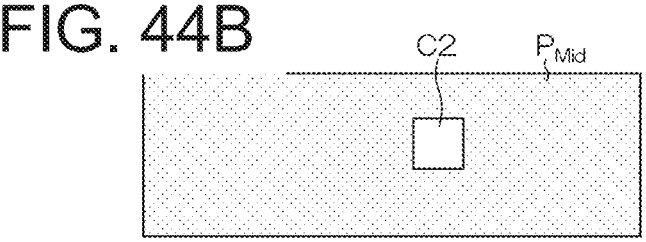
FIG. 44B is a diagram illustrating an example of an irradiation pattern $P_{Mid}$ for forming an unirradiation region C2.
Figure 44C:
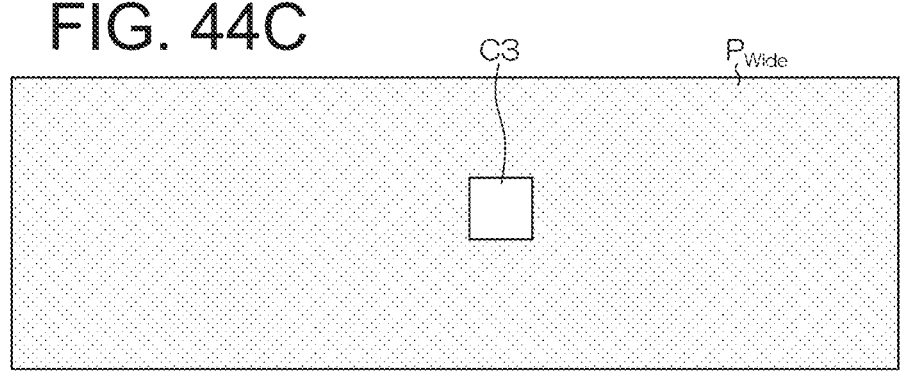
FIG. 44C is a diagram illustrating an example of an irradiation pattern $P_{Wide}$ for forming an unirradiation region C3.

FIG. 44A shows an example of an irradiation pattern $P_{Hot}$ in which the non-irradiation region C1 is formed, FIG. 44B an example of an irradiation pattern $P_{Mid}$ in which the non-irradiation region C2 is formed, and FIG. 44C an example of an irradiation pattern $P_{Wide}$ in which the non-irradiation region C3 is formed.

Figure 44D:
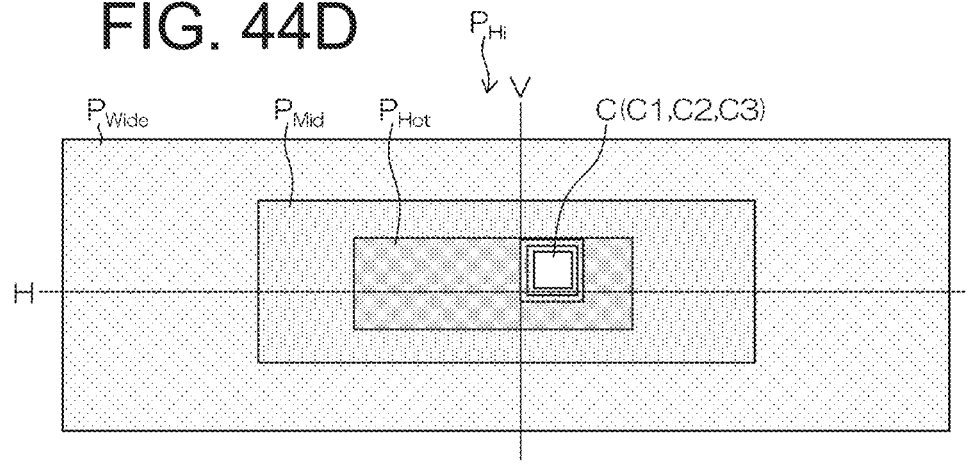
FIG. 44D is a diagram illustrating an example of a high-beam light distribution pattern $P_{Hi}$ configured by overlaying a plurality of irradiation patterns $P_{Hot}$, $P_{Mid}$, and $P_{Wide}$.

As shown in FIG. 44D, the plurality of irradiation patterns $P_{Hot}$, $P_{Mid}$, and $P_{Wide}$ can be overlaid on one another to overlay the non-irradiation regions C1, C2, and C3 thereby forming a non-irradiation region C.

Figure 45:
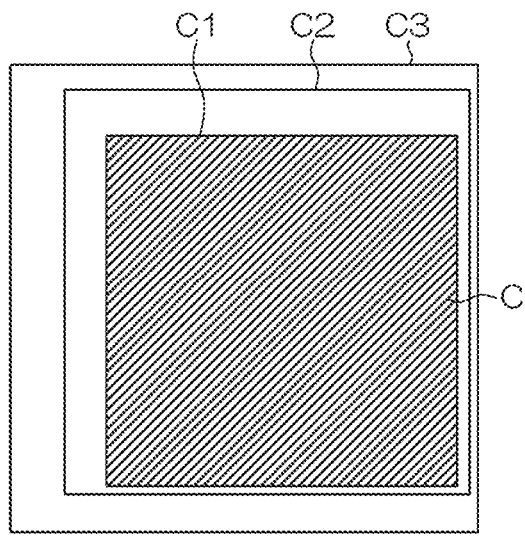
FIG. 45 is a diagram illustrating a state in which the nonirradiation regions C1, C2, and C3 are shifted from each other.

The non-irradiation regions C1, C2, and C3 each can have a different size, as illustrated in FIGS. 44A to 44D. By this setting, even when the non-irradiation regions C1, C2, and C3 formed by the respective irradiation patterns $P_{Hot}$, $P_{Mid}$, and $P_{Wide}$ are displaced from one another due to controlling error in the respective optical deflectors $201_{Hot}$, $201_{Mid}$, and $201_{Wide}$, displacement of the optical axes, as shown in FIG. 45, the area of the resulting non-irradiation region C (see the hatched region in FIG. 45) can be prevented from decreasing. As a result, any glare light to the irradiation-prohibitive object can be prevented from being generated. This is because the sizes of the non-irradiation regions C1, C2, and C3 formed in the respective irradiation patterns $P_{Hot}$, $P_{Mid}$, and $P_{Wide}$ can be different from one another.

The non-irradiation regions C1, C2, and C3 (or the non-irradiation region C) can be formed in respective regions of the plurality of irradiation patterns $P_{Hot}$, $P_{Mid}$ and $P_{Wide}$ corresponding to the irradiation-prohibitive object detected by the irradiation-prohibitive object detection unit. Specifically, the non-irradiation regions C1, C2, and C3 (or the non-irradiation region C) can be formed in a different region corresponding to the position where the irradiation-prohibitive object is detected. As a result, any glare light to the irradiation-prohibitive object such as a pedestrian, an opposing vehicle, etc. can be prevented from being generated.

The plurality of irradiation patterns $P_{Hot}$, $P_{Mid}$, and $P_{Wide}$ can have respective different sizes, and can have a higher light intensity as the size thereof is smaller. By doing so, the vehicle lighting fixture 300 can be configured to form a high-beam light distribution pattern (see FIG. 44D) excellent in far-distance visibility and sense of light distribution. The predetermined light distribution pattern can be configured such that the center light intensity ($P_{Hot}$) is relatively high and the light intensity is gradually lowered from the center to the periphery ($P_{Hot} \rightarrow P_{Mid} \rightarrow P_{Wide}$).

The non-irradiation regions C1, C2, and C3 can have a smaller size as the irradiation pattern including the non-irradiation region is smaller. Therefore, the relation in size of the non-irradiation region C1<the non-irradiation region C2<the non-irradiation region C3 may hold. Therefore, the smallest non-irradiation region C1 can be formed in the smallest irradiation pattern $P_{Hot}$ (with the maximum light intensity). This means that the irradiation pattern $P_{Hot}$ can irradiate with light a wider region more brighter when compared with the case where a smallest non-irradiation region C1 is formed in the irradiation patterns $P_{Mid}$ and $P_{Wide}$ other than the smallest irradiation pattern $P_{Hot}$. Furthermore, since the smallest non-irradiation region C1 is formed in the smallest irradiation pattern $P_{Hot}$ with the maximum light intensity, the bright/dark ratio near the contour of the non-irradiation region C can become relatively high (see FIG. 45) when compared with the case where a smallest non-irradiation region C1 is formed in the irradiation patterns $P_{Mid}$ and $P_{Wide}$ other than the smallest irradiation pattern $P_{Hot}$. As a result, the sharp and clear contour of the non-irradiation region C can be formed. It should be appreciated that the non-irradiation regions C1, C2, and C3 may have respective different sizes and the relation in size of the non-irradiation region C1<the non-irradiation region C2<the non-irradiation region C3 is not limitative. In order to blur the contour of the non-irradiation region C, the relation in size of the non-irradiation regions C1, C2, and C3 can be controlled as appropriate in place of the relationship described above.

The non-irradiation regions C1, C2, and C3 formed in the respective irradiation patterns $P_{Hot}$, $P_{Mid}$, and $P_{Wide}$ can have a similarity shape. Even when the non-irradiation regions C1, C2, and C3 formed by the respective irradiation patterns $P_{Hot}$, $P_{Mid}$, and $P_{Wide}$ are displaced from one another, the area of the resulting non-irradiation region C (see the hatched region in FIG. 45) can be prevented from decreasing. As a result, any glare light to the irradiation-prohibitive object can be prevented from being generated. It should be appreciated that the non-irradiation regions C1, C2, and C3 may have a shape other than a similarity shape as long as their sizes are different from each other. Furthermore, the shape thereof is not limited to a rectangular shape as shown in FIGS. 44A to 44D, but may be a circular shape, an oval shape, or other outer shapes.

The high-beam light distribution pattern $P_{Hi}$ shown in FIG. 44D can be formed on a virtual vertical screen by projecting the light intensity distributions formed by the respective scanning regions $A_{Hot}$, $A_{Mid}$, and $A_{Wide}$ by the projection lens assembly 20.

The light intensity distributions can be formed in the respective scanning regions $A_{Hot}$, $A_{Mid}$, and $A_{Wide}$ by the following procedures.

The wide-zone optical deflector $201_{Wide}$ can draw a first two-dimensional image on the wide-zone scanning region $A_{Wide}$ (see FIG. 21) (two-dimensional image corresponding to the irradiation pattern $P_{Wide}$ shown in FIG. 44C) with the excitation light rays $Ray_{Wide}$ two-dimensionally scanning in the horizontal and vertical directions by the mirror part 202 thereof, to thereby form a first light intensity distribution on the wide-zone scanning region $A_{Wide}$ (the light intensity distribution corresponding to the irradiation pattern $P_{Wide}$ shown in FIG. 44C).

The middle-zone optical deflector $201_{Mid}$ can draw a second two-dimensional image on the middle-zone scanning region $A_{Mid}$ (see FIG. 21) (two-dimensional image corresponding to the irradiation pattern $P_{Mid}$ shown in FIG. 44B) with the excitation light rays $Ray_{Wide}$ two-dimensionally scanning in the horizontal and vertical directions by the mirror part 202 thereof in such a manner that the second two-dimensional image overlaps the first two-dimensional image in part, to thereby form a second light intensity distribution on the middle-zone scanning region $A_{Mid}$ (the light intensity distribution corresponding to the irradiation pattern $P_{Mid}$ shown in FIG. 44B). Here, the light intensity of the second light intensity distribution is higher than that of the first light intensity distribution.

The hot-zone optical deflector $201_{Hot}$ can draw a third two-dimensional image on the hot-zone scanning region $A_{Hot}$ (see FIG. 21) (two-dimensional image corresponding to the irradiation pattern $P_{Hot}$ shown in FIG. 44A) with the excitation light rays $Ray_{Hot}$ two-dimensionally scanning in the horizontal and vertical directions by the mirror part 202 thereof in such a manner that the third two-dimensional image overlaps the first and second two-dimensional images in part, to thereby form a third light intensity distribution on the hot-zone scanning region $A_{Hot}$ (the light intensity distribution corresponding to the irradiation pattern $P_{Hot}$ shown in FIG. 44A). Here, the light intensity of the third light intensity distribution is higher than that of the second light intensity distribution.

It should be appreciated that the first to third light intensity distributions can be formed in the respective scanning region $A_{Wide}$, $A_{Mid}$, and $A_{Hot}$ so as to include the non-irradiation region corresponding to the non-irradiation regions C1, C2, and C3 by overlaying the non-irradiation regions C1, C2, and C3 to form the non-irradiation region.

As described above, the light intensity distributions formed in the respective scanning region $A_{Wide}$, $A_{Mid}$, and $A_{Hot}$ can be projected forward by the projection lens assembly 20, to thereby form the high-beam light distribution pattern $P_{Hi}$ on a virtual vertical screen as shown in FIG. 44D.

As described above, the present exemplary embodiment can provide a vehicle lighting fixture configured to form a predetermined light distribution pattern (for example, a high-beam light distribution pattern) by overlaying a plurality of irradiation patterns $P_{Hot}$, $P_{Mid}$, and $P_{Wide}$ including the respective non-irradiation regions C1, C2, and C3. Thus, even when the non-irradiation regions C1, C2, and C3 formed in the respective irradiation patterns $P_{Hot}$, $P_{Mid}$, and $P_{Wide}$ are displaced from one another (as shown in FIG. 45), the area of the resulting non-irradiation region C (the shaded region in FIG. 45) can be prevented from decreasing, and as a result, any glare light toward irradiation-prohibitive objects can be prevented from occurring.

This can be achieved by designing the non-irradiation regions C1, C2, and C3 to have respective different sizes to be formed in the respective irradiation patterns $P_{Hot}$, $P_{Mid}$, and $P_{Wide}$.

Figure 46A:
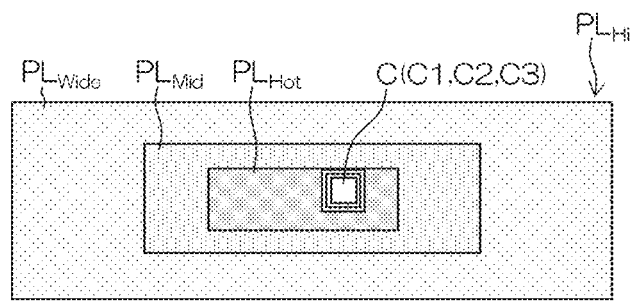
FIG. 46A is a diagram illustrating an example of a high-beam light distribution pattern $PL_{Hi}$ formed by a vehicle lighting fixture 300L disposed on the left side of a vehicle body front portion (on the left side of a vehicle body)
Figure 46B:
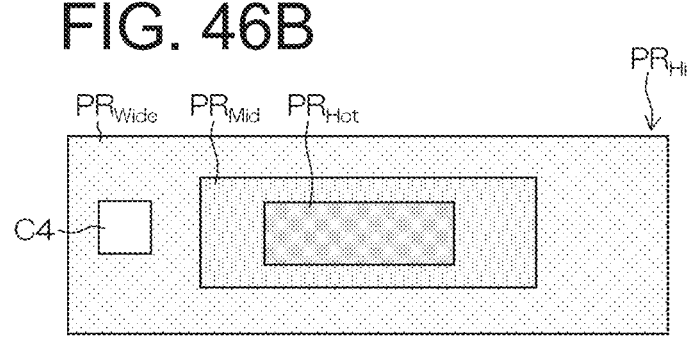
FIG. 46B is a diagram illustrating an example of a high-beam light distribution pattern $PR_{Hi}$ formed by a vehicle lighting fixture 300R disposed on the right side of the vehicle body front portion (on the front side of the vehicle body)

It should be appreciated that two vehicle lighting fixtures 300 can be used to form a single high-beam light distribution pattern $P_{Hi}$ (illustrated in FIG. 46C) by overlaying two high-beam light distribution patterns $PL_{Hi}$ and $PR_{Hi}$, as shown in FIGS. 46A and 46B.

FIG. 46A shows an example of the high-beam light distribution pattern $PL_{Hi}$ formed by a vehicle lighting fixture 300L disposed on the left side of a vehicle body front portion (on the left side of a vehicle body), and FIG. 46B an example of the high-beam light distribution pattern $PR_{Hi}$ formed by a vehicle lighting fixture 300R disposed on the right side of the vehicle body front portion (on the front side of the vehicle body). It should be appreciated that the high-beam light distribution patterns $PL_{Hi}$ and $PR_{Hi}$ are not limited to those formed by overlaying a plurality of irradiation patterns (irradiation patterns $PL_{Hot}$, $PL_{Mid}$, and $PL_{Wide}$ and irradiation patterns $PR_{Hot}$, $PR_{Mid}$, and $PR_{Wide}$), but may be formed by a single irradiation pattern or by a combination of two or four or more irradiation patterns overlaid with each other.

Figure 46C:
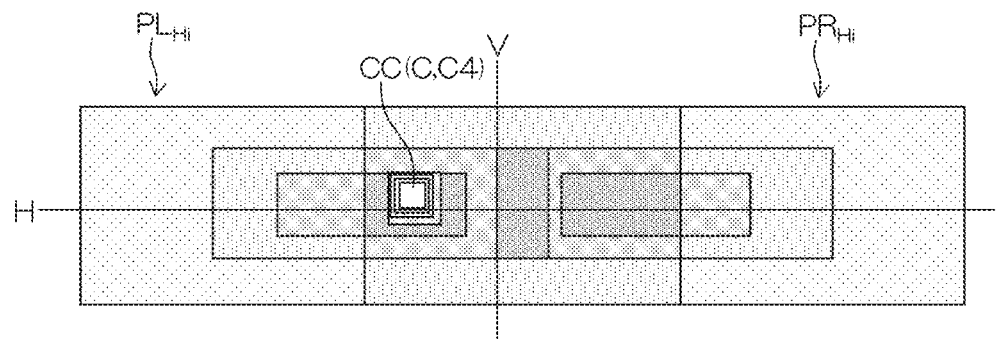
FIG. 46C is a diagram illustrating an example of a high-beam light distribution pattern $P_{Hi}$ configured by overlaying the two irradiation patterns $PL_{Hi}$ and $PR_{Hi}$.

The high-beam light distribution patterns $PL_{Hi}$ and $PR_{Hi}$, as illustrated in FIG. 46C, can be overlaid on each other so that the non-irradiation region C (non-irradiation regions C1, C2, and C3) and non-irradiation region C4 are overlaid on each other to form a non-irradiation region CC.

The non-irradiation region C (non-irradiation regions C1, C2, and C3) and non-irradiation region C4 can have respectively different sizes as illustrated in FIGS. 46A to 46C. For example, the relationship of the non-irradiation region C1<the non-irradiation region C2<the non-irradiation region C3<the non-irradiation region C4 may hold. Therefore, the smallest non-irradiation region C1 can be formed in the smallest irradiation pattern $P_{Hot}$ (with the maximum light intensity). This means that the irradiation pattern $P_{Hot}$ can irradiate with light a wider region more brighter when compared with the case where a smallest non-irradiation region C1 is formed in the irradiation patterns $P_{Mid}$ and $P_{Wide}$ other than the smallest irradiation pattern $P_{Hot}$. Furthermore, since the smallest non-irradiation region C1 is formed in the smallest irradiation pattern $P_{Hot}$ with the maximum light intensity, the bright/dark ratio near the contour of the non-irradiation region CC can become relatively high (see FIG. 45) when compared with the case where a smallest non-irradiation region C1 is formed in the irradiation patterns $P_{Mid}$ and $P_{Wide}$ other than the smallest irradiation pattern $P_{Hot}$. As a result, the sharp and clear contour of the non-irradiation region CC can be formed. It should be appreciated that the non-irradiation regions C1, C2, and C3 may have respective different sizes and the relation in size of the non-irradiation region C1<the non-irradiation region C2<the non-irradiation region C3<the non-irradiation region C4 is not limitative. In order to blur the contour of the non-irradiation region CC, the relation in size of the non-irradiation regions C1, C2, and C3 can be controlled as appropriate in place of the relationship described above.

As a fourth exemplary embodiment, a description will now be given of a problem (temperature quenching) arising when excitation laser light rays from a plurality of excitation light sources (for example, the wide-zone, middle-zone, and hot-zone excitation light sources $12_{Hot}$, $12_{Mid}$, and $12_{Wide}$ as illustrated in FIG. 21) are used to scan a single wavelength conversion member 18 and a technique for solving the problem.

First, a description will be given of the problem (temperature quenching) arising when excitation laser light rays from a plurality of excitation light sources (for example, the wide-zone excitation light source $12_{Hot}$, the middle-zone excitation light source $12_{Mid}$, and the hot-zone excitation light source $12_{Wide}$ as illustrated in FIG. 21) are used to scan a single wavelength conversion member 18.

Figure 47:
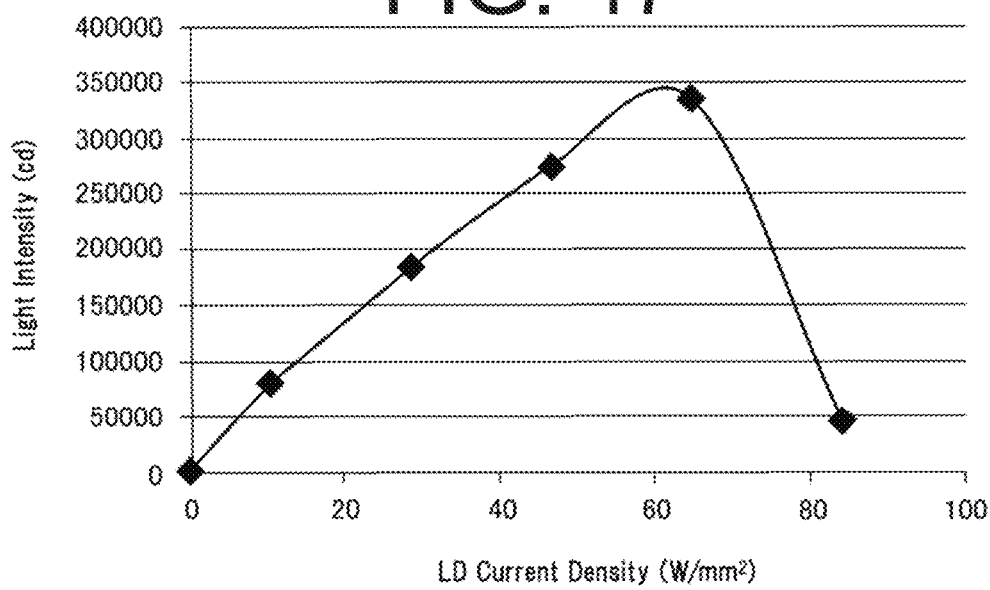
FIG. 47 is a graph showing the relationship between an LD current density and a light intensity measured on a virtual vertical screen disposed in front of a vehicle body approximately 25 m away from the vehicle front face when laser light is irradiated in a spot-like manner onto a narrow region (for example, having an area of 0.008 mm$^2$) of a phosphor (wavelength conversion member) of the same type of the wavelength conversion member 18 to form an image and the formed image of light emitted from the phosphor is projected by a projection lens.

FIG. 47 is a graph showing the relationship between an LD current density and a light intensity measured on a virtual vertical screen disposed in front of a vehicle body approximately 25 m away from the vehicle front face when laser light is irradiated in a spot-like manner onto a narrow region (for example, having an area of 0.008 mm$^2$) of a phosphor (wavelength conversion member) of the same type of the wavelength conversion member 18 to form an image and the formed image of light emitted from the phosphor is projected by a projection lens.

With reference to FIG. 47, the following matters can be seen.

Specifically, first, temperature quenching (or referred to as thermal quenching) has occurred where a light intensity is abruptly decreased at the LD current density of approximately 60 W/mm$^2$. Note that the phenomenon "temperature quenching" means that the temperature of phosphor is increased due to the heat generated by laser light from LD to decrease the luminance (or light intensity).

Second, the LD current density (approximately 10 W/mm$^2$) at which the maximum light intensity (approximately 60,000 cd.) required for the formation of vehicle light distribution patterns (for example, high-beam light distribution pattern) is achieved is remarkably smaller than the LD current density (approximately 60 W/mm$^2$) at which the temperature quenching occurs. Although the result may slightly change due to the efficiency of phosphor or heat conductivity, the result is not remarkably changed.

As discussed, when a vehicle light distribution pattern (light intensity distribution) having a maximum light intensity of approximately 60,000 cd. by scanning the phosphor with laser light is to be formed, it is predicted that the temperature quenching does not occur unless the LD current density exceeds 60 W/mm$^2$.

However, when the inventor of the subject application conducted experiments in which phosphor with a wide area was scanned with laser light, it has revealed that the temperature quenching occurred even when the LD current density did not exceed 60 W/mm$^2$.

Figure 48:
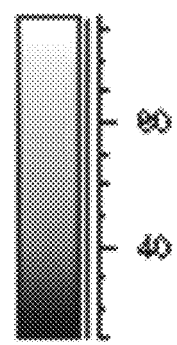
FIG. 48 is a diagram illustrating a state in which the center part (scanning center) of a scanning region has the maximum temperature (becomes hottest)

The experiments conducted by the inventor were performed by setting a scanning region in a phosphor 18 as illustrated in FIG. 48, scanning the scanning region with laser light by using an optical deflector, and measuring the items shown as vertical and horizontal axes in the graphs of FIGS. 49A to 50C, which summarize the results derived from the experiments.

Figure 49A:
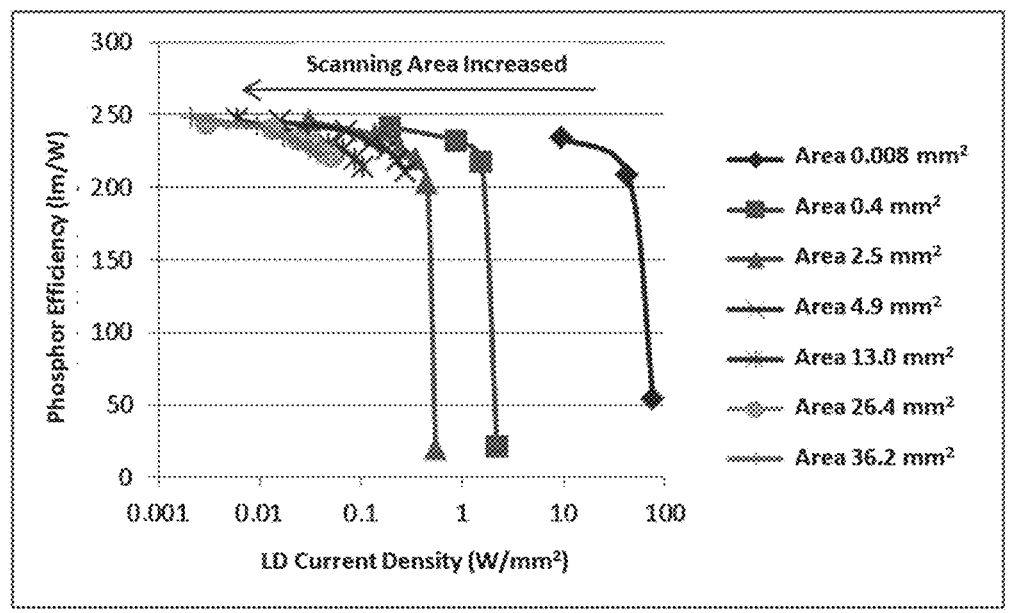
FIG. 49A is a graph showing the relationship between the LD current density and the phosphor efficiency (luminous flux from phosphor/LD irradiation output) for various areas when scanning regions of phosphor having various areas are scanned with laser light.

FIG. 49A is a graph showing the relationship between the LD current density and the phosphor efficiency (luminous flux from phosphor/LD irradiation output) for various areas set to the phosphor when scanning regions of phosphor having various areas are scanned with laser light. Note that the graph of "area 0.008 mm$^2$" shows the results of a case where spot-like laser light is irradiated to a scanning region having an area of 0.008 mm$^2$ set to the phosphor.

With reference to FIG. 49A, when a wide-area scanning region is scanned with laser light, the phosphor efficiency is abruptly decreased even when the LD current density does not exceed 60 W/mm$^2$. Thus, it has revealed that the temperature quenching occurred even when the LD current density did not exceed 60 W/mm$^2$.

Figure 49B:
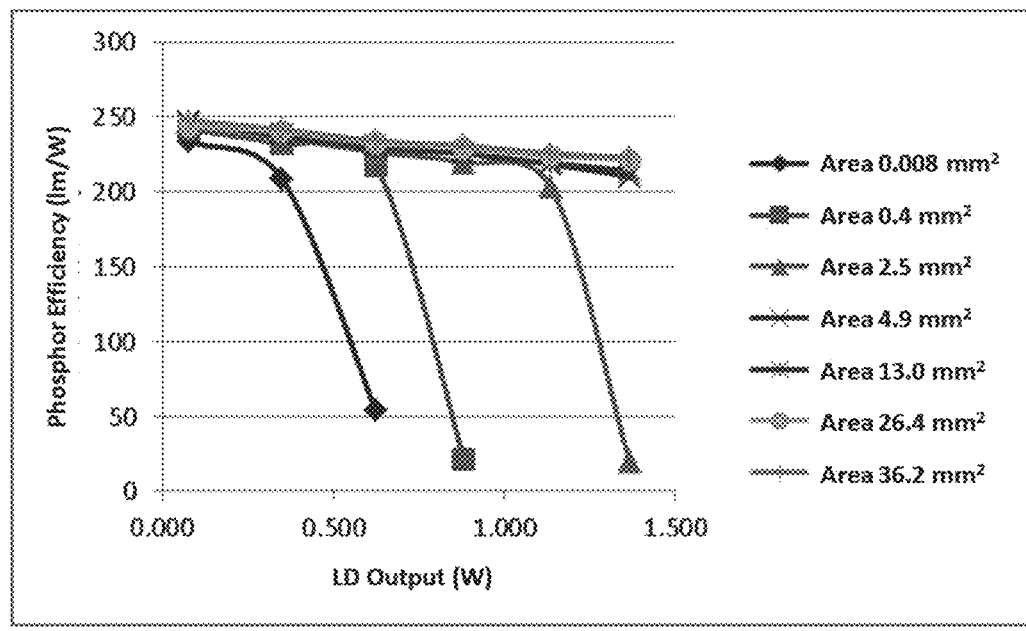
FIG. 49B is a graph showing the relationship between the LD output and the phosphor efficiency (luminous flux from phosphor/LD irradiation output) for various areas.

As shown in FIG. 49B, the relationship between the LD output and the phosphor efficiency (luminous flux from phosphor/LD irradiation output) has been found to show a wider scanning region can provide a phosphor efficiency with smaller decreasing ratio.

Figure 50A:
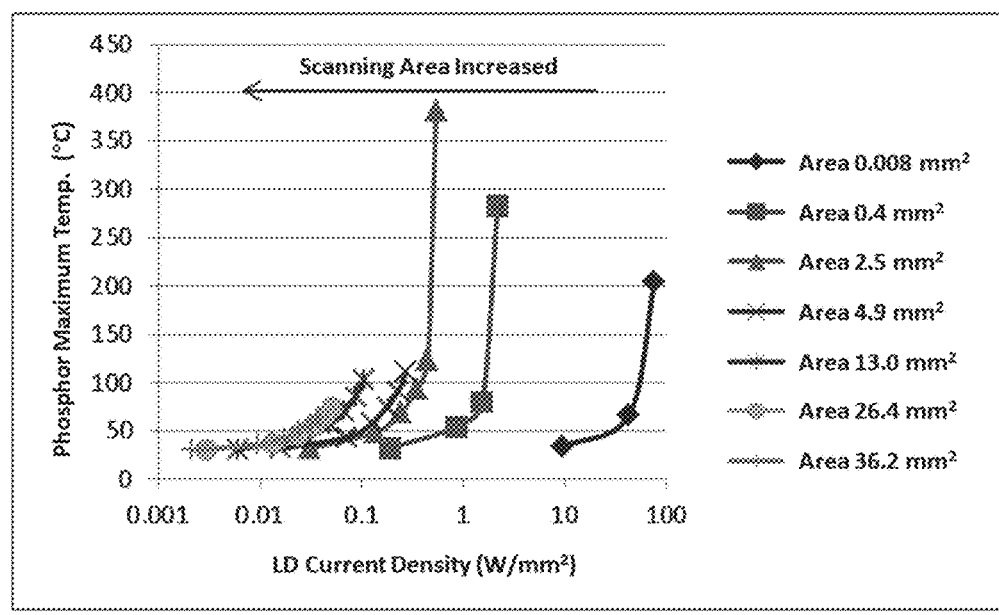
FIG. 50A is a graph showing the relationship between the LD current density and the phosphor maximum temperature for various areas when scanning regions of phosphor having various areas are scanned with laser light.

FIG. 50A is a graph showing the relationship between the LD current density and the phosphor maximum temperature for various areas when scanning regions of phosphor having various areas are scanned with laser light. Note that the graph of "Area 0.008 mm$^2$" shows the results of a case where spot-like laser light is irradiated to a scanning region having an area of 0.008 mm$^2$ set to the phosphor.

With reference to FIG. 50A, when a wide-area scanning region is scanned with laser light, the phosphor maximum temperature is abruptly increased even when the LD current density does not exceed 60 W/mm². Thus, it has revealed that the temperature quenching occurred even when the LD current density did not exceed 60 W/mm².

Note that it has been found that the site where the temperature becomes high (becomes maximum temperature) is the center of the scanning region (scanning center) according to the test results conducted by the inventor (see FIG. 48).

Figure 50B:
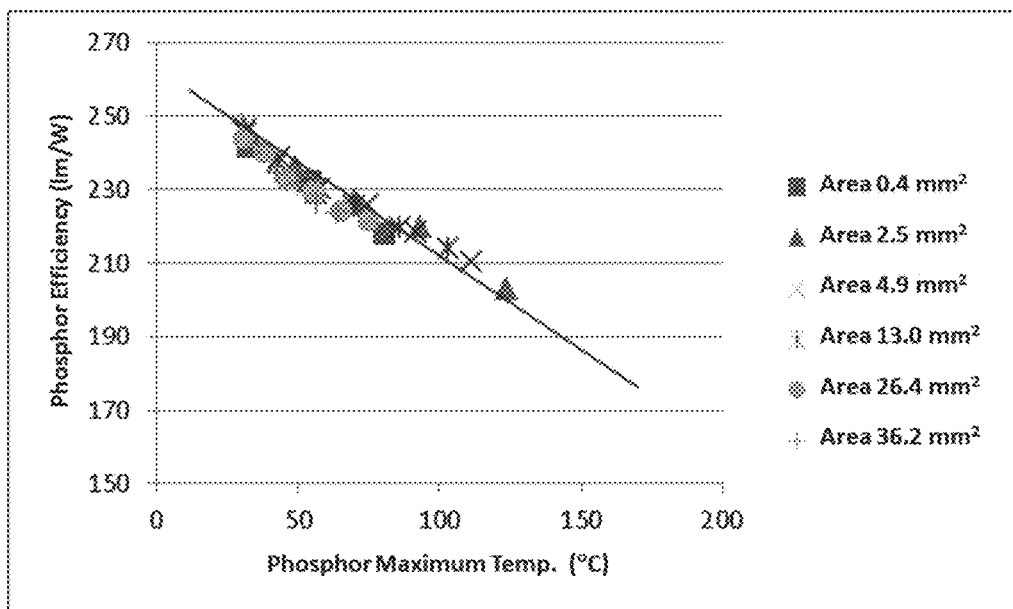
FIG. 50B is a graph showing the relationship between the phosphor maximum temperature and the phosphor efficiency for various areas.

FIG. 50B is a graph showing the relationship between the phosphor maximum temperature and the phosphor efficiency for various areas set to the phosphor when scanning regions of phosphor having various areas are scanned with laser light.

With reference to FIG. 50B, there is a certain relationship between the phosphor maximum temperature and the phosphor efficiency in which the phosphor efficiency linearly decreases as the phosphor maximum temperature increases, meaning that the temperature quenching occurs.

Figure 50C:
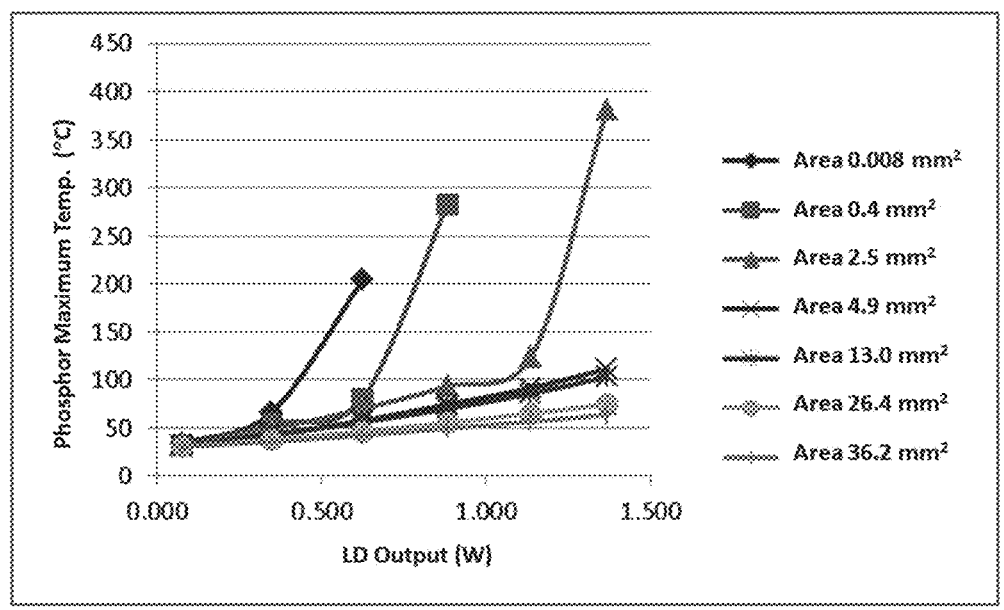
FIG. 50C is a graph showing the relationship between the LD output and the phosphor maximum temperature for various areas.

Note that as shown in FIG. 50C, it has been revealed that the relationship between the LD output and the phosphor maximum temperature for various areas is such that the larger-area scanning region for LD output may affect the increasing degree of the phosphor maximum temperature to become smaller.

As described above, when the phosphor with a wide area was scanned with laser light, the temperature quenching occurred even when the LD current density did not exceed 60 W/mm². This may be because of the following fact inferred. When a small-area scanning region (for example, region with an area of 0.008 mm²) is irradiated with a spot-shaped laser light, the surrounding area of the scanning region (spot) is not irradiated with the laser light. In this case, the generated heat tends to be dissipated through the outer region of the phosphor, so that the temperature is difficult to increase (meaning that the temperature quenching tends not to occur). When a wide-area scanning region is irradiated with laser light, the surrounding area of the scanning center of the scanning region can be irradiated with the laser light. As a result, the center area of the scanning region tends to easily hold heat, meaning that the heat is difficult to be dissipated toward the outer region of the phosphor. As a result, the center area of the scanning region tends to increase in temperature and the temperature quenching tends to easily occur.

Because of the above-described causes, when, for example, a single wavelength conversion member 18 is irradiated with excitation laser light from a plurality of excitation laser light sources (for example, the wide-zone excitation light source $12_{Hot}$, the middle-zone excitation light source $12_{Mid}$, and the hot-zone excitation light source $12_{Wide}$ illustrated in FIG. 21), the temperature quenching problem may occur depending on the outputs of the respective excitation light sources. This may possible occur in the region where the plurality of scanning regions overlap with one another.

A description will now be given of a technique for resolving the problem of the temperature quenching.

The inventor of the present invention has intensively studied to resolve the problem of the temperature quenching, and as a result, has found that at least two or more phosphors (wavelength conversion members 18) are used to form an illuminance distribution or a light intensity distribution, and the images thereof are projected and overlaid with each other, so that the problem of the temperature quenching can be resolve while the maximum light intensity required for a vehicle light distribution pattern (for example, a high-beam light distribution pattern) can be achieved.

A description will now be given of a vehicle lighting fixture utilizing two phosphors, or wavelength conversion members 18A and 18B to which the above-described technique is applied.

Figure 51:
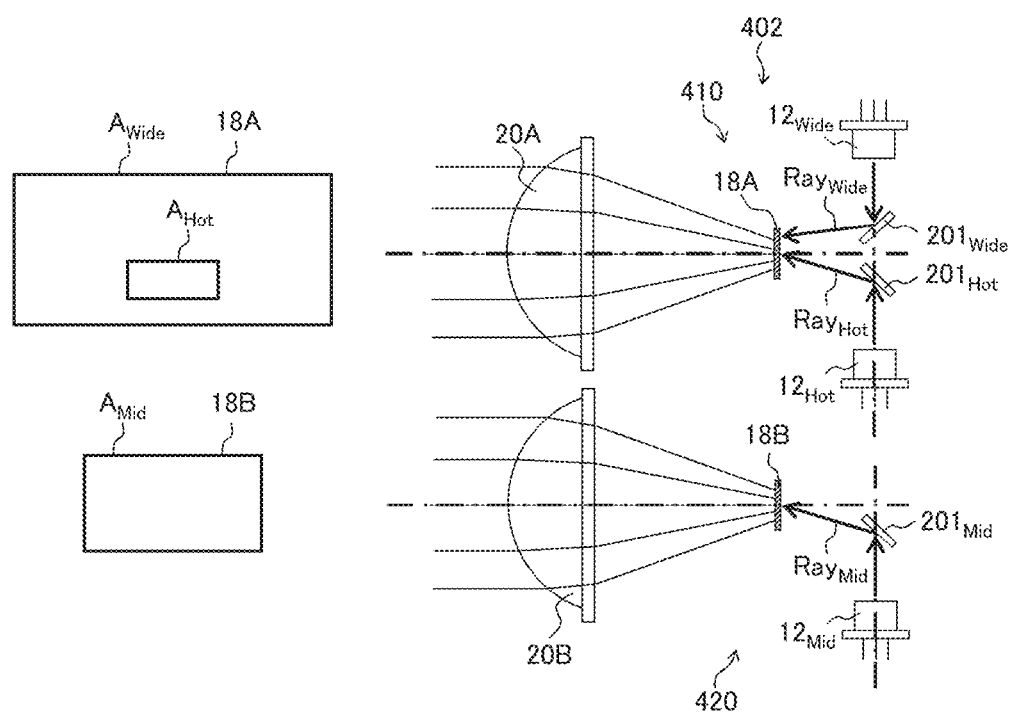
FIG. 51 is a schematic diagram of a vehicle lighting fixture 402 using two wavelength conversion members 18A and 18B.

FIG. 51 is a schematic diagram of a vehicle lighting fixture 402 using two wavelength conversion members 18A and 18B.

As illustrated in FIG. 51, the vehicle lighting fixture 402 of the present exemplary embodiment can include at least one first lighting unit 410 and at least second lighting unit 420.

The first lighting unit 410 can be configured to scan two scanning regions (wide-zone scanning region $A_{Wide}$ and hot-zone scanning region $A_{Hot}$) in the first wavelength conversion member 18A with laser light to form a two-dimensional image thereon and project the image, so that the wide-zone light distribution pattern $P_{Wide}$ and the hot-zone light distribution pattern $P_{Hot}$ (first light distribution pattern) on a virtual vertical screen as illustrated in FIG. 26.

The first lighting unit 410 can be configured in the same manner as the vehicle lighting fixture 300 of the first exemplary embodiment illustrated in FIGS. 21 to 25. For example, the first lighting unit 410 can be configured by eliminating from the vehicle lighting fixture 300 the configuration for forming the middle-zone light distribution pattern $P_{Mid}$, including the middle-zone excitation light source $12_{Mid}$ and the middle-zone optical deflector $201_{Mid}$.

Specifically, the first lighting unit 410, as illustrated in FIG. 51, can include two excitation light sources (wide-zone excitation light source $12_{Wide}$ and hot-zone excitation light source $12_{Hot}$), two optical deflectors (wide-zone optical deflector $201_{Wide}$ and hot-zone optical deflector $201_{Hot}$) each including a mirror part, a first wavelength conversion member 18A, and a first optical system 20A (for example, a projection lens. The two optical deflectors $201_{Wide}$ and $201_{Hot}$ can be provided corresponding to the two excitation light sources $12_{Wide}$ and $12_{Hot}$, and the mirror part thereof can receive the excitation light from the corresponding excitation light source among the two excitation light sources $12_{Wide}$ and $12_{Hot}$ and reflect the same so as to scan an object with the light two-dimensionally in horizontal and vertical directions. The first wavelength conversion member 18A can include two scanning regions (wide-zone scanning region $A_{Wide}$ and hot-zone scanning region $A_{Hot}$) provided corresponding to the two optical deflectors $201_{Wide}$ and $201_{Hot}$. Partial light intensity distributions can be formed within the respective scanning regions $A_{Wide}$ and $A_{Hot}$ by being scanned with the excitation light in a two-dimensional manner by the mirror parts of the respective optical deflectors $201_{Wide}$ and $201_{Hot}$ and can be projected through the projection lens 20A thereby forming the predetermined first light distribution pattern.

At least one of the scanning regions $A_{Wide}$ and $A_{Hot}$ can overlap the other scanning region in part, so that the light intensity distribution formed at the overlapping scanning regions can have a relatively high intensity.

The light intensity distributions formed in the scanning regions $A_{Wide}$ and $A_{Hot}$ can be projected forward by the projection lens 20A, to thereby form the wide-zone light distribution pattern $P_{Wide}$ and the hot-zone light distribution pattern $P_{Hot}$ (first light distribution pattern) on a virtual vertical screen as illustrated in FIG. 26.

The above configuration is not limitative, and the first lighting unit 410 can be configured to have the same configuration as that of the vehicle lighting fixture 400 of the second exemplary embodiment illustrated in FIGS. 34 to 36.

For example, the first lighting unit 410 can be configured by eliminating from the vehicle lighting fixture 400 the configuration for forming the middle-zone light distribution pattern $P_{Mid}$, including the middle-zone excitation light source $12_{Mid}$, the middle-zone optical deflector $201_{Mid}$, and the middle zone reflection surface $60_{Mid}$.

Since the temperature at the center of the wide-zone scanning region $A_{Wide}$ becomes high, the hot-zone scanning region $A_{Hot}$ preferably overlaps the wide-zone scanning region $A_{Wide}$ in part at the position shifted from the center of the wide-zone scanning region $A_{Wide}$ (for example, the position shifted downward in FIG. 51). This can further facilitate the suppression of the occurrence of the temperature quenching.

It should be appreciated that the two scanning regions contained in the first wavelength conversion member 18A may be the middle-zone scanning region $A_{Mid}$ and the hot-zone scanning region $A_{Hot}$ but preferably the wide-zone scanning region $A_{Wide}$ and the hot-zone scanning region $A_{Hot}$. This is because the wide-zone scanning region $A_{Wide}$ is larger than the middle-zone scanning region $A_{Mid}$ in area to suppress the increase of temperature, thereby further suppressing the occurrence of the temperature quenching.

The second lighting unit 420 can be configured to scan a single scanning region (middle-zone scanning region $A_{Mid}$) in the second wavelength conversion member 18B with laser light to form a two-dimensional image thereon and project the image, so that the middle-zone light distribution pattern $P_{Mid}$ (second light distribution pattern) on a virtual vertical screen as illustrated in FIG. 26.

The second lighting unit 420 can be configured in the same manner as the vehicle lighting fixture 10 of the reference example illustrated in FIG. 2.

Specifically, the second lighting unit 420, as illustrated in FIG. 51, can include a single excitation light source (middle-zone excitation light source $12_{Mid}$), a single optical deflector (middle-zone optical deflector $201_{Mid}$) including a mirror part, a second wavelength conversion member 18B, and a second optical system 20B (for example, a projection lens. The optical deflector $201_{Mid}$ can be provided corresponding to the single excitation light source $12_{Mid}$, and the mirror part thereof can receive the excitation light from the excitation light source $12_{Mid}$ and reflect the same so as to scan an object with the light two-dimensionally in horizontal and vertical directions. The second wavelength conversion member 18B can include a single scanning region (middle-zone scanning region $A_{Mid}$) provided corresponding to the optical deflector $201_{Mid}$. A partial light intensity distribution can be formed within the scanning region $A_{Mid}$ by being scanned with the excitation light in a two-dimensional manner by the mirror part of the optical deflector $201_{Mid}$ and can be projected through the projection lens 20B thereby forming the predetermined second light distribution pattern.

The light intensity distribution formed in the scanning region $A_{Mid}$ can be projected forward by the projection lens 20B, to thereby form the middle-zone light distribution pattern $P_{Mid}$ (second light distribution pattern) on a virtual vertical screen as illustrated in FIG. 26.

The wide-zone light distribution pattern $P_{Wide}$ and the hot-zone light distribution pattern $P_{Hot}$ (first light distribution pattern) formed by the first lighting unit 410 and the middle-zone light distribution pattern $P_{Mid}$ (second light distribution pattern) can be overlaid on each other to form a predetermined light distribution pattern on a virtual vertical screen as illustrated in FIG. 26.

With the vehicle lighting fixture having the above-described configuration of this exemplary embodiment, which utilizes a plurality of optical deflectors configured to scan with excitation light in a two-dimensional manner, it is possible to miniaturize its size and reduce the parts number, which has been a cause for cost increase. This is because the single wavelength conversion member (the first wavelength conversion member 18A) and the single optical system (the first projection lens 20A) are used corresponding to the plurality of optical deflectors (the wide-zone optical deflector $201_{Wide}$ and the hot-zone optical deflector $201_{Hot}$.

With the vehicle lighting fixture having the above-described configuration in the present exemplary embodiment, which utilizes a plurality of optical deflectors configured to scan with excitation light in a two-dimensional manner, as illustrated in FIG. 26, a predetermined light distribution pattern P (for example, high-beam light distribution pattern) excellent in far-distance visibility and sense of light distribution. The predetermined light distribution pattern P of FIG. 26 can be configured such that the light intensity in part, for example, at the center ($P_{Hot}$), is relatively high and the light intensity is gradually lowered from that part, or the center, to the periphery ($P_{Hot} \to P_{Mid} \to P_{Wide}$).

This can be achieved by, for example, adjusting the output of each of the excitation light sources $12_{Wide}$, $12_{Mid}$, and $12_{Hot}$ so that the center light intensity ($P_{Hot}$) is relatively high and the light intensity is gradually lowered from that part, or the center, to the periphery ($P_{Hot} \to P_{Mid} \to P_{Wide}$).

Furthermore, the present exemplary embodiment can suppress the occurrence of the temperature quenching. This is because the single wavelength conversion member 18 is not scanned with the excitation laser light rays from the wide-zone, middle-zone, and hot-zone excitation light sources $12_{Wide}$, $12_{Mid}$, and $12_{Hot}$, but the first wavelength conversion member 18A and the second wavelength conversion member 18B are provided and the first wavelength conversion member 18A is scanned with the excitation laser light rays from the wide-zone and hot-zone excitation light sources $12_{Wide}$ and $12_{Hot}$ while the second wavelength conversion member 18B is scanned with the excitation laser light rays from the middle-zone excitation light source $12_{Mid}$.

A description will now be given of a first modified example.

Figure 52A:
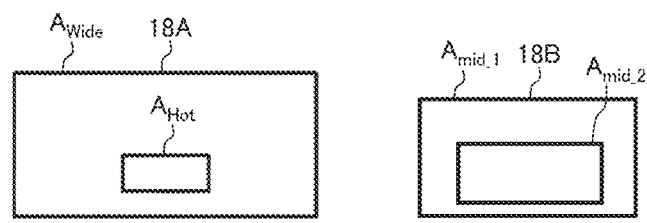
FIGS. 52A, 52B, and 52C are each a modified example of the wavelength conversion member.

The first lighting unit 410A of the first modified example can be configured in the same manner as the first lighting unit 410 of the above-mentioned fourth exemplary embodiment, and can include a first wavelength conversion member 18A containing the wide-zone scanning region $A_{Wide}$ and the hot-zone scanning region $A_{Hot}$ (see FIG. 52A).

The second lighting unit 420A of the first modified example can be configured in the same manner as the first lighting unit 410 of the above-mentioned fourth exemplary embodiment, except that the second lighting unit 420A can include a second wavelength conversion member 18B containing the first middle-zone scanning region $A_{Mid\_1}$ and the second middle-zone scanning region $A_{Mid\_2}$ (see FIG. 52A).

The second middle-zone scanning region $A_{Mid\_2}$ preferably overlaps the first middle-zone scanning region $A_{Mid\_1}$ in part at the position shifted from the center of the first middle-zone scanning region $A_{Mid\_1}$ (for example, the position shifted downward in FIG. 52A). This can further facilitate the suppression of the occurrence of the temperature quenching.

In this modified example, the wide-zone light distribution pattern $P_{Wide}$ and the hot-zone light distribution pattern $P_{Hot}$ (first light distribution pattern) formed by the first lighting unit 410A and the first and second middle-zone light distribution patterns $P_{Mid\_1}$ and $P_{Mid\_2}$ (second light distribution pattern) formed by the second lighting unit 420A can overlap each other to form a predetermined light distribution pattern on a virtual vertical screen as illustrated in FIG. 26.

Therefore, the present modified example can exert the same advantageous effects as those by the fourth exemplary embodiment.

A description will now be given of a second modified example.

Figure 52B:
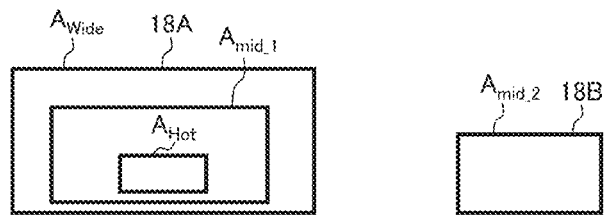

The first lighting unit 410A2 of the second modified example can be configured in the same manner as the vehicle lighting fixture 300 of the above-mentioned first exemplary embodiment illustrated in FIGS. 21 to 25, and can include a first wavelength conversion member 18A containing the wide-zone scanning region $A_{Wide}$, the hot-zone scanning region $A_{Hot}$, and the first middle-zone scanning region $A_{Mid\_1}$ (see FIG. 52B).

At least one of the scanning regions $A_{Wide}$, $A_{Hot}$, and $A_{Mid\_1}$ contained in the first wavelength conversion member 18A preferably overlaps another scanning region in part at the position shifted from the center of the other scanning region contained in the first wavelength conversion member 18A. This can further facilitate the suppression of the occurrence of the temperature quenching.

The second lighting unit 420A2 of the present modified example can be configured in the same manner as the second lighting unit 420 of the above-described fourth exemplary embodiment, and can include the second wavelength conversion member 18B containing the second middle-zone scanning region $A_{Mid\_2}$ (see FIG. 52B).

In this modified example, the wide-zone light distribution pattern $P_{Wide}$, the hot-zone light distribution pattern $P_{Hot}$, and the first middle-zone light distribution pattern $P_{Mid}$ (first light distribution pattern) formed by the first lighting unit 410A2 and the second middle-zone light distribution pattern $P_{Mid\_2}$ (second light distribution pattern) formed by the second lighting unit 420A2 can overlap each other to form a predetermined light distribution pattern on a virtual vertical screen as illustrated in FIG. 26.

Therefore, the present modified example can exert the same advantageous effects as those by the fourth exemplary embodiment.

A description will now be given of a second modified example.

The modified example can include, in addition to the first lighting unit 410A3 and the second lighting unit 420A3, a third lighting unit 430 (not illustrated).

Figure 52C:
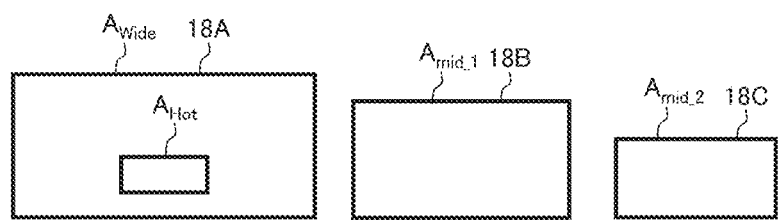

The first lighting unit 410A3 of the third modified example can be configured in the same manner as the first lighting unit 410 of the above-mentioned fourth exemplary embodiment, and can include a first wavelength conversion member 18A containing the wide-zone scanning region $A_{Wide}$ and the hot-zone scanning region $A_{Hot}$ (see FIG. 52C).

The second lighting unit 420A3 of the present modified example can be configured in the same manner as the second lighting unit 420 of the above-described fourth exemplary embodiment, and can include the second wavelength conversion member 18B containing the first middle-zone scanning region $A_{Mid\_1}$ (see FIG. 52C).

The third lighting unit 430 of the present modified example can be configured in the same manner as the second lighting unit 420 of the above-described exemplary embodiment, and can include a third wavelength conversion member 18C containing the second middle-zone scanning region $A_{Mid\_2}$ (see FIG. 52C).

In this modified example, the wide-zone light distribution pattern $P_{Wide}$ and the hot-zone light distribution pattern $P_{Hot}$ (first light distribution pattern) formed by the first lighting unit 410A3, the first middle-zone light distribution pattern $P_{Mid\_1}$ (second light distribution pattern) formed by the second lighting unit 420A3, and the second middle-zone light distribution pattern $P_{Mid\_2}$ (second light distribution pattern) formed by the third lighting unit 430 can overlap each other to form a predetermined light distribution pattern on a virtual vertical screen as illustrated in FIG. 26.

Therefore, the present modified example can exert the same advantageous effects as those by the fourth exemplary embodiment.

In the respective modified examples, at least two of the wide-zone, hot-zone, first middle-zone, and second middle-zone scanning regions $A_{Wide}$, $A_{Wide}$, $A_{Mid\_1}$, and $A_{Mid\_2}$ can have the same size or each of them may have a different size.

Modified examples are not limited to those illustrated in FIGS. 52A to 52C, but may be configured to include various combinations depending on the output of LD and the number of scanning regions.

If the scanning region is to be divided to four, the configuration of the first modified example illustrated in FIG. 52A in consideration of the parts number and heat dissipation properties.

Next, a description will be given of an implementation example where the first wavelength conversion member 18A containing two scanning regions (the wide-zone scanning region $A_{Wide}$ and the hot-zone scanning region $A_{Hot}$) and the second wavelength conversion member 18B containing two scanning regions (the first middle-zone scanning region $A_{Mid\_1}$ and the second middle-zone scanning region $A_{Mid\_2}$) are employed.

When the wide-zone scanning region $A_{Wide}$ (area: 200 mm$^2$) was scanned with laser light from a wide-zone laser light source (LD output: 3 W), the temperature increase was 10° C. and the phosphor efficiency was 230 lm/W.

When the hot-zone scanning region $A_{Hot}$ (area: 5 mm$^2$) was scanned with laser light from a hot-zone laser light source (LD output: 1.5 W), the temperature increase was 100° C. and the phosphor efficiency was 200 lm/W.

When the first middle-zone scanning region $A_{Mid\_1}$ (area: 80 mm$^2$) was scanned with laser light from a first middle-zone laser light source (LD output: 3 W), the temperature increase was 30° C. and the phosphor efficiency was 220 lm/W.

When the second middle-zone scanning region $A_{Mid\_2}$ (area: 20 mm$^2$) was scanned with laser light from a second middle-zone laser light source (LD output: 3 W), the temperature increase was 90° C. and the phosphor efficiency was 210 lm/W.

When the total temperature of the wavelength conversion member exceeds approximately 150° C., the thermal quenching may occur. Thus, when the scanning region is divided to four regions as in the present implementation example, the above combination is the best.

The above implementation example is mere a simple example, and the vehicle lighting fixture of the presently disclosed subject matter can be achieved by taking the efficiency of the wavelength conversion member, temperature increase in the wavelength conversion ember, etc. into consideration, and determining the number of the divided scanning regions, scanning regions, etc. Furthermore, the respective numerical values shown in the respective exemplary embodiments, modified examples, examples, and reference examples are illustrative, and therefore, any suitable numerical value can be adopted for the purpose of the achievement of the vehicle lighting fixture in the presently disclosed subject matter.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting fixture configured to form a predetermined light distribution pattern, comprising:
    at least one first lighting unit and at least one second lighting unit, wherein
    the first lighting unit includes
        a plurality of excitation light sources;
        a plurality of optical deflectors provided to correspond to the plurality of excitation light sources, the optical deflector configured to include a mirror part that can two-dimensionally scan with excitation light from a corresponding one of the excitation light sources in a horizontal direction and a vertical direction;
        a first wavelength conversion member configured to include a plurality of scanning regions provided to correspond to the plurality of optical deflectors such that the plurality of scanning regions can be two-dimensionally scanned by the excitation light in the horizontal direction and the vertical direction to draw a two-dimensional image in a corresponding one among the plurality of scanning regions, thereby forming a light intensity distribution image in each of the plurality of scanning regions; and
        a first optical system configured to project the light intensity distribution images formed in the respective scanning regions to form a first light distribution pattern, at least one scanning region among the plurality of scanning regions configured to overlap another scanning region in part to relatively increase a light intensity of the light intensity distribution formed in the overlapped scanning region,
    the second lighting unit includes
        a single excitation light source;
        a single optical deflector provided to correspond to the single excitation light source, the single optical deflector configured to include a mirror part that can two-dimensionally scan with excitation light from the single excitation light source in a horizontal direction and a vertical direction;
        a second wavelength conversion member configured to include a single scanning region provided to correspond to the single optical deflector such that the single scanning region can be two-dimensionally scanned by the excitation light in the horizontal direction and the vertical direction to draw a two-dimensional image in the single scanning region, thereby forming a light intensity distribution image in the single scanning region; and
        a second optical system configured to project the light intensity distribution image to form a second light distribution pattern, and
    the predetermined light distribution pattern is formed by overlaying the first light distribution pattern and the second light distribution pattern on each other.

2. The vehicle lighting fixture according to claim 1, wherein at least one of the plurality of scanning regions included in the first wavelength conversion member overlaps part of another scanning region included in the first wavelength conversion member at a position shifted from a center portion of the another scanning region.

3. A vehicle lighting fixture configured to form a predetermined light distribution pattern, comprising:
    at least one first lighting unit and at least one second lighting unit, wherein
    the first lighting unit includes
        a plurality of excitation light sources;
        a plurality of optical deflectors provided to correspond to the plurality of excitation light sources, the optical deflector configured to include a mirror part that can two-dimensionally scan with excitation light from a corresponding one of the excitation light sources in a horizontal direction and a vertical direction;
        a first wavelength conversion member configured to include a plurality of scanning regions provided to correspond to the plurality of optical deflectors such that the plurality of scanning regions can be two-dimensionally scanned by the excitation light in the horizontal direction and the vertical direction to draw a two-dimensional image in a corresponding one among the plurality of scanning regions, thereby forming a light intensity distribution image in each of the plurality of scanning regions; and
        a first optical system configured to project the light intensity distribution images formed in the respective scanning regions to form a first light distribution pattern, at least one scanning region among the plurality of scanning regions configured to overlap another scanning region in part to relatively increase a light intensity of the light intensity distribution formed in the overlapped scanning region,
    the second lighting unit includes:
        a plurality of excitation light sources;
        a plurality of optical deflectors provided to correspond to the plurality of excitation light sources, the optical deflector configured to include a mirror part that can two-dimensionally scan with excitation light from a corresponding one of the excitation light sources in a horizontal direction and a vertical direction;
        a second wavelength conversion member configured to include a plurality of scanning regions provided to correspond to the plurality of optical deflectors such that the plurality of scanning regions can be two-dimensionally scanned by the excitation light in the horizontal direction and the vertical direction to draw a two-dimensional image in a corresponding scanning region among the plurality of scanning regions, thereby forming a light intensity distribution image in each of the plurality of scanning regions; and
        a second optical system configured to project the light intensity distribution images formed in the respective scanning regions to form a second light distribution pattern, at least one scanning region among the plurality of scanning regions configured to overlap another scanning region in part to relatively increase a light intensity of the light intensity distribution formed in the overlapped scanning region, and
    the predetermined light distribution pattern is formed by overlaying the first light distribution pattern and the second light distribution pattern on each other.

4. The vehicle lighting fixture according to claim 3, wherein
    at least one of the plurality of scanning regions included in the first wavelength conversion member overlaps part of another scanning region included in the first wavelength conversion member at a position shifted from a center portion of the other scanning region, and at least one of the plurality of scanning regions included in the second wavelength conversion member overlaps part of another scanning region included in the second wavelength conversion member at a position shifted from a center portion of the other scanning region.

5. The vehicle lighting fixture according to claim 1, wherein the excitation light source is a semiconductor light emitting element that can emit excitation light and the excitation light from the semiconductor light emitting element is directly used or indirectly used via an output end face of an optical fiber guiding and outputting excitation light emitted from the semiconductor light emitting element.

6. The vehicle lighting fixture according to claim 2, wherein the excitation light source is a semiconductor light emitting element that can emit excitation light and the excitation light from the semiconductor light emitting element is directly used or indirectly used via an output end face of an optical fiber guiding and outputting excitation light emitted from the semiconductor light emitting element.

7. The vehicle lighting fixture according to claim 3, wherein the excitation light source is a semiconductor light emitting element that can emit excitation light and the excitation light from the semiconductor light emitting element is directly used or indirectly used via an output end face of an optical fiber guiding and outputting excitation light emitted from the semiconductor light emitting element.

8. The vehicle lighting fixture according to claim 4, wherein the excitation light source is a semiconductor light emitting element that can emit excitation light and the excitation light from the semiconductor light emitting element is directly used or indirectly used via an output end face of an optical fiber guiding and outputting excitation light emitted from the semiconductor light emitting element.

9. The vehicle lighting fixture according to claim 1, wherein
the vehicle lighting fixture has a reference axis, and the first optical system, the first wavelength conversion member, and the plurality of optical deflectors of the first lighting unit are disposed along the reference axis in this order,
the plurality of excitation light sources of the first lighting unit are disposed to surround the reference axis while being inclined such that the excitation light emitted therefrom is directed rearward and toward the reference axis, and
the plurality of optical deflectors of the first lighting unit are disposed to surround the reference axis while being closer to the reference axis than the plurality of excitation light sources such that the excitation light from the corresponding excitation light source is incident on the mirror part of the corresponding optical deflector and reflected by the same to a corresponding scanning region among the plurality of scanning regions.

10. The vehicle lighting fixture according to claim 2, wherein
the vehicle lighting fixture has a reference axis, and the first optical system, the first wavelength conversion member, and the plurality of optical deflectors of the first lighting unit are disposed along the reference axis in this order,
the plurality of excitation light sources of the first lighting unit are disposed to surround the reference axis while being inclined such that the excitation light emitted therefrom is directed rearward and toward the reference axis, and
the plurality of optical deflectors of the first lighting unit are disposed to surround the reference axis while being closer to the reference axis than the plurality of excitation light sources such that the excitation light from the corresponding excitation light source is incident on the mirror part of the corresponding optical deflector and reflected by the same to a corresponding scanning region among the plurality of scanning regions.

11. The vehicle lighting fixture according to claim 3, wherein
the vehicle lighting fixture has a reference axis, and the first optical system, the first wavelength conversion member, and the plurality of optical deflectors of the first lighting unit are disposed along the reference axis in this order,
the plurality of excitation light sources of the first lighting unit are disposed to surround the reference axis while being inclined such that the excitation light emitted therefrom is directed rearward and toward the reference axis, and
the plurality of optical deflectors of the first lighting unit are disposed to surround the reference axis while being closer to the reference axis than the plurality of excitation light sources such that the excitation light from the corresponding excitation light source is incident on the mirror part of the corresponding optical deflector and reflected by the same to a corresponding scanning region among the plurality of scanning regions.

12. The vehicle lighting fixture according to claim 4, wherein
the vehicle lighting fixture has a reference axis, and the first optical system, the first wavelength conversion member, and the plurality of optical deflectors of the first lighting unit are disposed along the reference axis in this order,
the plurality of excitation light sources of the first lighting unit are disposed to surround the reference axis while being inclined such that the excitation light emitted therefrom is directed rearward and toward the reference axis, and
the plurality of optical deflectors of the first lighting unit are disposed to surround the reference axis while being closer to the reference axis than the plurality of excitation light sources such that the excitation light from the corresponding excitation light source is incident on the mirror part of the corresponding optical deflector and reflected by the same to a corresponding scanning region among the plurality of scanning regions.

13. The vehicle lighting fixture according to claim 5, wherein
the vehicle lighting fixture has a reference axis, and the first optical system, the first wavelength conversion member, and the plurality of optical deflectors of the first lighting unit are disposed along the reference axis in this order,
the plurality of excitation light sources of the first lighting unit are disposed to surround the reference axis while being inclined such that the excitation light emitted therefrom is directed rearward and toward the reference axis, and
the plurality of optical deflectors of the first lighting unit are disposed to surround the reference axis while being closer to the reference axis than the plurality of excitation light sources such that the excitation light from the corresponding excitation light source is incident on the mirror part of the corresponding optical deflector and reflected by the same to a corresponding scanning region among the plurality of scanning regions.

14. The vehicle lighting fixture according to claim 1, further comprising a plurality of reflection surfaces provided to correspond to the plurality of excitation light sources of the first lighting unit, and wherein the vehicle lighting fixture has a reference axis, and the first optical system, the first wavelength conversion member, and the plurality of optical deflectors of the first lighting unit are disposed along the reference axis in this order, the plurality of excitation light sources of the first lighting unit are disposed to surround the reference axis while being inclined such that the excitation light emitted therefrom is directed rearward and toward the reference axis, the plurality of reflection surfaces are disposed to surround the reference axis while being closer to the reference axis than the plurality of excitation light sources such that the excitation light from the corresponding excitation light source is incident on the reflection surface and reflected by the same while the plurality of reflection surfaces are inclined such that the excitation light reflected therefrom is directed rearward and toward the reference axis, and the plurality of optical deflectors of the first lighting unit are disposed to surround the reference axis while being closer to the reference axis than the plurality of reflection surfaces such that the excitation light from the corresponding reflection surface is incident on the mirror part of the corresponding optical deflector and reflected by the same to a corresponding scanning region among the plurality of scanning regions in the first wavelength conversion member.

15. The vehicle lighting fixture according to claim 2, further comprising a plurality of reflection surfaces provided to correspond to the plurality of excitation light sources of the first lighting unit, and wherein the vehicle lighting fixture has a reference axis, and the first optical system, the first wavelength conversion member, and the plurality of optical deflectors of the first lighting unit are disposed along the reference axis in this order, the plurality of excitation light sources of the first lighting unit are disposed to surround the reference axis while being inclined such that the excitation light emitted therefrom is directed rearward and toward the reference axis, the plurality of reflection surfaces are disposed to surround the reference axis while being closer to the reference axis than the plurality of excitation light sources such that the excitation light from the corresponding excitation light source is incident on the reflection surface and reflected by the same while the plurality of reflection surfaces are inclined such that the excitation light reflected therefrom is directed rearward and toward the reference axis, and the plurality of optical deflectors of the first lighting unit are disposed to surround the reference axis while being closer to the reference axis than the plurality of reflection surfaces such that the excitation light from the corresponding reflection surface is incident on the mirror part of the corresponding optical deflector and reflected by the same to a corresponding scanning region among the plurality of scanning regions in the first wavelength conversion member.

16. The vehicle lighting fixture according to claim 3, further comprising a plurality of reflection surfaces provided to correspond to the plurality of excitation light sources of the first lighting unit, and wherein the vehicle lighting fixture has a reference axis, and the first optical system, the first wavelength conversion member, and the plurality of optical deflectors of the first lighting unit are disposed along the reference axis in this order, the plurality of excitation light sources of the first lighting unit are disposed to surround the reference axis while being inclined such that the excitation light emitted therefrom is directed rearward and toward the reference axis, the plurality of reflection surfaces are disposed to surround the reference axis while being closer to the reference axis than the plurality of excitation light sources such that the excitation light from the corresponding excitation light source is incident on the reflection surface and reflected by the same while the plurality of reflection surfaces are inclined such that the excitation light reflected therefrom is directed rearward and toward the reference axis, and the plurality of optical deflectors of the first lighting unit are disposed to surround the reference axis while being closer to the reference axis than the plurality of reflection surfaces such that the excitation light from the corresponding reflection surface is incident on the mirror part of the corresponding optical deflector and reflected by the same to a corresponding scanning region among the plurality of scanning regions in the first wavelength conversion member.

17. The vehicle lighting fixture according to claim 4, further comprising a plurality of reflection surfaces provided to correspond to the plurality of excitation light sources of the first lighting unit, and wherein the vehicle lighting fixture has a reference axis, and the first optical system, the first wavelength conversion member, and the plurality of optical deflectors of the first lighting unit are disposed along the reference axis in this order, the plurality of excitation light sources of the first lighting unit are disposed to surround the reference axis while being inclined such that the excitation light emitted therefrom is directed rearward and toward the reference axis, the plurality of reflection surfaces are disposed to surround the reference axis while being closer to the reference axis than the plurality of excitation light sources such that the excitation light from the corresponding excitation light source is incident on the reflection surface and reflected by the same while the plurality of reflection surfaces are inclined such that the excitation light reflected therefrom is directed rearward and toward the reference axis, and the plurality of optical deflectors of the first lighting unit are disposed to surround the reference axis while being closer to the reference axis than the plurality of reflection surfaces such that the excitation light from the corresponding reflection surface is incident on the mirror part of the corresponding optical deflector and reflected by the same to a corresponding scanning region among the plurality of scanning regions in the first wavelength conversion member.

18. The vehicle lighting fixture according to claim 5, further comprising a plurality of reflection surfaces provided to correspond to the plurality of excitation light sources of the first lighting unit, and wherein the vehicle lighting fixture has a reference axis, and the first optical system, the first wavelength conversion member, and the plurality of optical deflectors of the first lighting unit are disposed along the reference axis in this order, the plurality of excitation light sources of the first lighting unit are disposed to surround the reference axis while being inclined such that the excitation light emitted therefrom is directed rearward and toward the reference axis, the plurality of reflection surfaces are disposed to surround the reference axis while being closer to the reference axis than the plurality of excitation light sources such that the excitation light from the corresponding excitation light source is incident on the reflection surface and reflected by the same while the plurality of reflection surfaces are inclined such that the excitation light reflected therefrom is directed rearward and toward the reference axis, and the plurality of optical deflectors of the first lighting unit are disposed to surround the reference axis while being closer to the reference axis than the plurality of reflection surfaces such that the excitation light from the corresponding reflection surface is incident on the mirror part of the corresponding optical deflector and reflected by the same to a corresponding scanning region among the plurality of scanning regions in the first wavelength conversion member.

19. The vehicle lighting fixture according to claim 9, further comprising a plurality of reflection surfaces provided to correspond to the plurality of excitation light sources of the first lighting unit, and wherein the vehicle lighting fixture has a reference axis, and the first optical system, the first wavelength conversion member, and the plurality of optical deflectors of the first lighting unit are disposed along the reference axis in this order, the plurality of excitation light sources of the first lighting unit are disposed to surround the reference axis while being inclined such that the excitation light emitted therefrom is directed rearward and toward the reference axis, the plurality of reflection surfaces are disposed to surround the reference axis while being closer to the reference axis than the plurality of excitation light sources such that the excitation light from the corresponding excitation light source is incident on the reflection surface and reflected by the same while the plurality of reflection surfaces are inclined such that the excitation light reflected therefrom is directed rearward and toward the reference axis, and the plurality of optical deflectors of the first lighting unit are disposed to surround the reference axis while being closer to the reference axis than the plurality of reflection surfaces such that the excitation light from the corresponding reflection surface is incident on the mirror part of the corresponding optical deflector and reflected by the same to a corresponding scanning region among the plurality of scanning regions in the first wavelength conversion member.

20. The vehicle lighting fixture according to claim 11, further comprising a plurality of reflection surfaces provided to correspond to the plurality of excitation light sources of the first lighting unit, and wherein the vehicle lighting fixture has a reference axis, and the first optical system, the first wavelength conversion member, and the plurality of optical deflectors of the first lighting unit are disposed along the reference axis in this order, the plurality of excitation light sources of the first lighting unit are disposed to surround the reference axis while being inclined such that the excitation light emitted therefrom is directed rearward and toward the reference axis, the plurality of reflection surfaces are disposed to surround the reference axis while being closer to the reference axis than the plurality of excitation light sources such that the excitation light from the corresponding excitation light source is incident on the reflection surface and reflected by the same while the plurality of reflection surfaces are inclined such that the excitation light reflected therefrom is directed rearward and toward the reference axis, and the plurality of optical deflectors of the first lighting unit are disposed to surround the reference axis while being closer to the reference axis than the plurality of reflection surfaces such that the excitation light from the corresponding reflection surface is incident on the mirror part of the corresponding optical deflector and reflected by the same to a corresponding scanning region among the plurality of scanning regions in the first wavelength conversion member.

21. The vehicle lighting fixture according to claim 1, wherein the first optical system comprises a first projection lens that is constituted by a plurality of lenses such that an aberration is compensated so that an imaging plane is planar, and the first wavelength conversion member is planar and disposed along the imaging plane of the first projection lens.

22. The vehicle lighting fixture according to claim 3, wherein the first optical system comprises a first projection lens that is constituted by a plurality of lenses such that an aberration is compensated so that an imaging plane is planar, and the first wavelength conversion member is planar and disposed along the imaging plane of the first projection lens.

23. The vehicle lighting fixture according to claim 1, wherein the second optical system comprises a second projection lens that is constituted by a plurality of lenses such that an aberration is compensated so that an imaging plane is planar, and the second wavelength conversion member is planar and disposed along the imaging plane of the second projection lens.

24. The vehicle lighting fixture according to claim 3, wherein the second optical system comprises a second projection lens that is constituted by a plurality of lenses such that an aberration is compensated so that an imaging plane is planar, and the second wavelength conversion member is planar and disposed along the imaging plane of the second projection lens.

25. The vehicle lighting fixture according to claim 1, wherein the optical deflector is of a one-dimensional non-resonance/one-dimensional resonance type, including the mirror part;
a movable frame disposed to surround the mirror part while supporting the mirror part so as to allow the mirror part to be reciprocately swung around a first axis;
a base disposed to surround the movable frame while supporting the movable frame so as to allow the movable frame to be reciprocately swung around a second axis perpendicular to the first axis;
a first piezoelectric actuator configured to cause the mirror part to be reciprocally swung around the first axis with respect to the movable frame due to resonance driving; and
a second piezoelectric actuator configured to cause the movable frame and the mirror part supported by the movable frame to be reciprocally swung around the second axis with respect to the base due to nonresonance driving, and wherein
the optical deflector is disposed such that the first axis is contained in a vertical plane and the second axis is contained in a horizontal plane.

26. The vehicle lighting fixture according to claim 3, wherein the optical deflector is of a one-dimensional non-resonance/one-dimensional resonance type, including the mirror part;
a movable frame disposed to surround the mirror part while supporting the mirror part so as to allow the mirror part to be reciprocately swung around a first axis;
a base disposed to surround the movable frame while supporting the movable frame so as to allow the movable frame to be reciprocately swung around a second axis perpendicular to the first axis;
a first piezoelectric actuator configured to cause the mirror part to be reciprocally swung around the first axis with respect to the movable frame due to resonance driving; and
a second piezoelectric actuator configured to cause the movable frame and the mirror part supported by the movable frame to be reciprocally swung around the second axis with respect to the base due to nonresonance driving, and wherein
the optical deflector is disposed such that the first axis is contained in a vertical plane and the second axis is contained in a horizontal plane.

* * * * *